United States Patent
Daniels

(10) Patent No.: US 11,543,155 B2
(45) Date of Patent: Jan. 3, 2023

(54) DEVICES AND SYSTEMS FOR VENTILATION OF SOLAR ROOFS

(71) Applicant: Gregory S. Daniels, Santa Rosa, CA (US)

(72) Inventor: Gregory S. Daniels, Santa Rosa, CA (US)

(*) Notice: Subject to any disclaimer, the term of this patent is extended or adjusted under 35 U.S.C. 154(b) by 0 days.

(21) Appl. No.: 16/789,228

(22) Filed: Feb. 12, 2020

(65) Prior Publication Data

US 2020/0263905 A1 Aug. 20, 2020

Related U.S. Application Data

(60) Provisional application No. 62/852,650, filed on May 24, 2019, provisional application No. 62/806,385, filed on Feb. 15, 2019.

(51) Int. Cl.
*F24S 20/69* (2018.01)

(52) U.S. Cl.
CPC .................................... *F24S 20/69* (2018.05)

(58) Field of Classification Search
CPC ........................................................ F24S 20/69
See application file for complete search history.

(56) References Cited

U.S. PATENT DOCUMENTS

| | | | |
|---|---|---|---|
| 5,274,978 A * | 1/1994 | Perkonigg | F24S 25/60 52/547 |
| 6,129,628 A | 10/2000 | O'Hagin et al. | |
| 7,101,279 B2 | 9/2006 | O'Hagin | |
| 7,297,866 B2 * | 11/2007 | Aschenbrenner | F24S 25/20 136/246 |
| 7,592,537 B1 * | 9/2009 | West | H02S 20/23 136/251 |
| 7,618,310 B2 | 11/2009 | Daniels | |
| 7,774,998 B2 * | 8/2010 | Aschenbrenner | F24S 25/20 52/173.3 |
| 8,276,329 B2 * | 10/2012 | Lenox | H01L 31/04 52/173.3 |
| 8,607,510 B2 * | 12/2013 | Daniels | E04D 1/2918 52/173.3 |
| 8,608,533 B2 | 12/2013 | Daniels | |
| 8,661,753 B2 * | 3/2014 | Lenox | H02S 20/23 454/366 |
| 8,904,717 B2 * | 12/2014 | Lenox | E04D 1/29 52/173.3 |
| 9,011,221 B2 | 4/2015 | Daniels | |
| 9,394,693 B2 | 7/2016 | Daniels | |
| 9,410,325 B2 * | 8/2016 | Koehler | E04D 13/10 |
| 9,945,127 B2 * | 4/2018 | Edwards | E04D 1/24 |
| 10,256,765 B2 * | 4/2019 | Rodrigues | F24S 25/67 |

(Continued)

OTHER PUBLICATIONS

Excerpt from a section of the 2015 International Residential Code, in 3 pages.

*Primary Examiner* — Avinash A Savani
*Assistant Examiner* — Deepak A Deean
(74) *Attorney, Agent, or Firm* — Knobbe, Martens, Olson & Bear LLP

(57) ABSTRACT

This application relates to the ventilation of a solar roof. For example, a solar roof can include a solar roof tile and a spacer, batten or other ventilating components to space the solar roof tile from the roof deck, and provide ventilation to the solar roof tile, for reduced operating temperatures and improved efficiency in electricity generation.

10 Claims, 26 Drawing Sheets

FIG. 5B

(56) References Cited

U.S. PATENT DOCUMENTS

| | | | |
|---|---|---|---|
| 10,693,413 B2* | 6/2020 | Rodrigues | H02S 20/25 |
| 11,012,024 B2* | 5/2021 | Rodrigues | H02S 30/10 |
| 2004/0098932 A1* | 5/2004 | Broatch | F24S 20/69 |
| | | | 52/173.1 |
| 2005/0000172 A1* | 1/2005 | Anderson | E04D 12/004 |
| | | | 52/198 |
| 2005/0199278 A1* | 9/2005 | Aschenbrenner | F24S 25/20 |
| | | | 136/251 |
| 2005/0217716 A1* | 10/2005 | Masuda | F24S 25/65 |
| | | | 136/244 |
| 2006/0266405 A1* | 11/2006 | Lenox | E04D 13/172 |
| | | | 136/244 |
| 2008/0110493 A1* | 5/2008 | Aschenbrenner | F24S 25/20 |
| | | | 136/251 |
| 2009/0044850 A1* | 2/2009 | Kimberley | F24S 25/61 |
| | | | 52/173.3 |
| 2009/0133687 A1* | 5/2009 | Liu | F24S 10/502 |
| | | | 126/664 |
| 2009/0165843 A1* | 7/2009 | Horioka | F24S 40/40 |
| | | | 136/251 |
| 2009/0203308 A1* | 8/2009 | O'Hagin | F24F 11/0001 |
| | | | 454/366 |
| 2010/0330898 A1 | 12/2010 | Daniels | |
| 2011/0113704 A1* | 5/2011 | Lenox | F24S 40/40 |
| | | | 52/173.3 |
| 2012/0312350 A1* | 12/2012 | Buettner | H02S 20/26 |
| | | | 136/246 |
| 2013/0019922 A1* | 1/2013 | Lenox | H02S 20/23 |
| | | | 136/246 |
| 2015/0253021 A1 | 9/2015 | Daniels | |
| 2015/0326172 A1* | 11/2015 | Koehler | F24S 25/40 |
| | | | 52/24 |
| 2017/0163206 A1* | 6/2017 | Rodrigues | F24S 25/61 |
| 2018/0122973 A1 | 5/2018 | Pilliod et al. | |
| 2018/0123504 A1 | 5/2018 | Almy et al. | |
| 2019/0028054 A1 | 1/2019 | Karkheck | |
| 2020/0014327 A1* | 1/2020 | Rodrigues | H02S 20/25 |

* cited by examiner

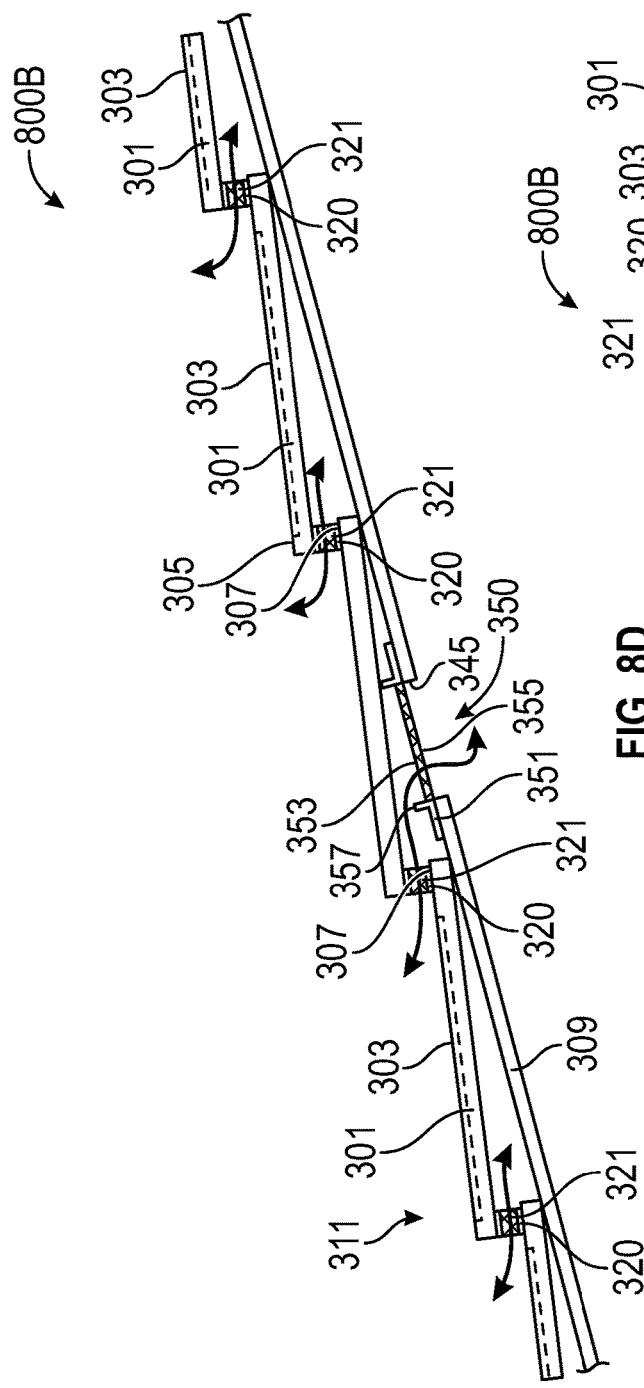
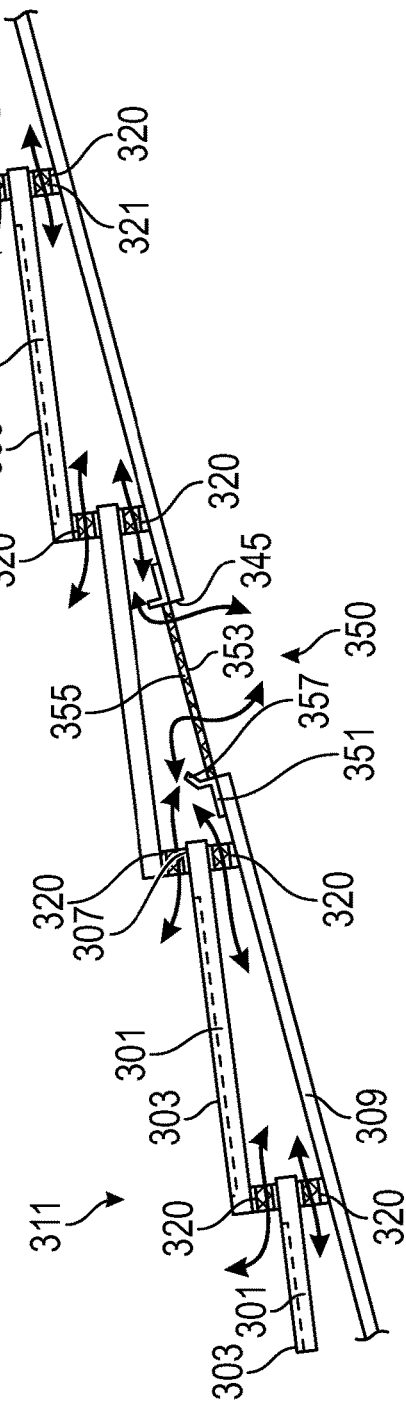

DEVICES AND SYSTEMS FOR VENTILATION OF SOLAR ROOFS

BACKGROUND

Field

This application relates generally to roof ventilation and solar roofs, and in particular, to devices and systems for ventilation of solar roofs.

Description

Proper building ventilation provides numerous benefits for both the building and its occupants. Ventilation of an attic space can prevent the attic's temperature from rising to undesirable levels, which can also reduce the cost of cooling the interior living space of the building. In addition, increased attic ventilation tends to reduce humidity within the attic, which can prolong the life of lumber used in the building's framing and elsewhere by diminishing the incidence of mold and dry-rot. Moreover, ventilation promotes a healthier environment for residents of the building by encouraging the introduction of fresh, outside air. These and other benefits tend to compound as the amount of ventilation increases.

Recently, builders and solar power companies have installed solar panels onto the roofs of buildings. The solar panels absorb solar radiation to produce electricity, advantageously providing an alternative source of power for the building. Such solar panels are generally rigid and flat in shape, and are supported on the roof of the building with a supporting frame or other structure.

SUMMARY

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a solar roof is described. The solar roof can include a solar roof tile and a spacer extending along at least a portion of a lower surface of the solar roof tile, the spacer configured to space a downslope edge of the solar roof tile from a roof deck. The spacer can include an opening configured to provide ventilation between an external region above the solar roof tile to an internal region below the solar roof tile.

In various aspects, the solar roof can include a roofing element positioned vertically adjacent to the solar roof tile.

In some aspects, the solar roof tile can include a first solar roof tile. In some aspect, the roofing element can include a second solar roof tile.

In various aspects, the spacer can be positioned between the downslope edge of the first solar roof tile and an upslope edge of the second solar roof tile.

In some aspects, the solar roof can include a clip extending from an upper portion of the spacer. The clip can form a groove configured to receive the downslope edge of the first solar roof tile, and secure the first solar roof tile to the spacer.

In various aspects, the solar roof can include a pathway extending from the external region, through the opening and between the downslope edge of the first solar roof tile and the upslope edge of the second solar roof tile, to a volume within the internal region between the first solar roof tile and the roof deck.

In some aspects, the solar roof can include a primary vent configured to be installed into a second opening in the roof deck. The primary vent can include a third opening configured to allow airflow through the third opening of the roof deck.

In various aspects, the solar roof can include a first course. The first course can include a first plurality of the solar roof tiles. The solar roof can also include a second course. The second course can include a second plurality of the solar roof tiles. The first course can be positioned vertically adjacent to the second course, with one or more spacers positioned between the first course and the second course, and one or more of the primary vents, wherein a total net flow ventilating area of the one or more primary vents is equal to or greater than the total net flow ventilating area of the one or more spacers.

In some aspects, the primary vent can include a fan assembly.

In various aspects, the volume can include a first volume. The internal region can include a first internal region. In some aspects, the solar roof can include a second volume within a second internal region between the second solar roof tile and the roof deck. The upslope edge of the second solar roof tile can be configured to restrict airflow between the first volume and the second volume.

In some aspects, the spacer can include a first spacer, the opening can include a first opening, the pathway can include a first pathway, and the volume can include a first volume. In various aspects, the solar roof can include a second spacer configured to space the upslope edge of the second solar roof tile from the roof deck. The second spacer can include a second opening. In some aspects, the solar roof can include second pathway extending from the first volume, through the second opening between the upslope edge of the second solar roof tile and the roof deck, to a second volume positioned between the second roof tile and the roof deck.

In various aspects, the at least one of the first pathway and the second pathway can extend through the second opening, between a region above the roof deck and a region below the roof deck.

In another aspect, a ventilation batten for a solar roof is described. The ventilation batten for a solar roof can include a body with an upper surface configured to contact and support a downslope edge of a first roofing element; a recess extending into a front surface of the body, the recess configured to receive and support an upslope edge of a second roofing element, such that the downslope edge of the first roofing element is spaced apart from the upslope edge of the second roofing element; and an opening extending through the body between the upper surface and the recess, the opening configured to provide ventilation between an external region above the first roofing element and the second roofing element, to an internal region below the first roofing element. In some aspects, at least one of the first roofing element and the second roofing element can include a solar roof tile.

In various aspects, the body can include an upper spacer extending a first thickness measured between the upper surface and an upper portion of the recess.

In some aspects, the body can include a lower spacer extending a second thickness from a lower portion of the recess to a bottom of the body.

In some aspects, the opening can include a first opening. In various aspects, the opening can include a second opening extending through the lower spacer, the second opening can include a third thickness.

In various aspects, the lower spacer can include a first foot and a second foot extending along a length of the body, wherein the first foot is horizontally adjacent to the second foot, and the second opening is formed between the first foot and the second foot.

In some aspects, the body can include a support member extending between and attaching the upper and lower spacers to each other, and forming the recess.

In various aspects, the upper spacer can include a first upper leg, a first lower leg, and a first middle leg extending between a portion of the first upper leg and a portion of the first lower leg. The first opening can extend through the first middle leg.

In some aspects, the upper spacer can include a second upper leg, a second lower leg, and a second middle leg extending between a portion of the second upper leg and a portion of the second lower leg. The second opening can extend through the second middle leg.

In various aspects, the support member can extend between an opposing end of each of the first lower leg and the second upper leg to form the recess.

In some aspects, the batten can include sheet metal.

In various aspects, the batten can include a single integral piece of material.

In some aspects, the ventilation batten can include a clip extending from an upper portion of the upper spacer, the clip forming a groove configured to receive the downslope edge of the first roofing element, and secure the first roofing element to the spacer.

In another aspect, a solar roof is described. The solar roof can include a ventilation batten. The solar roof can also include a first roofing element and a second roofing element.

In various aspects, the first roofing element can include a solar roof tile, and the second roofing element can comprise a roofing element different from the first roofing element.

In another aspect, a solar roof is described. The solar roof can include a first solar roof tile and a first means for providing ventilation between an external region above the solar roof tile to an internal region below the solar roof tile, the means for providing ventilation extending along at least a portion of a lower surface of the solar roof tile and configured to space a downslope edge of the solar roof tile from a roof deck.

In some aspects, the means for providing ventilation can extend along the downslope edge between the roof deck and the lower surface.

In various aspects, the solar roof can include a second solar roof tile positioned between the first solar roof tile and the roof deck, wherein the means for providing ventilation extends along an upper surface of an upslope edge of the second solar roof tile.

In some aspects, the solar roof can include a second means for providing ventilation between the internal region below the first solar roof tile, and a second internal region below the second solar roof tile, the second means extending along a lower surface of the upslope edge of the second solar roof tile.

In various aspects, the solar roof can include a means to receive and support at least one of the downslope edge of the first solar roof tile and the upslope edge of the second solar roof tile.

In some aspects, the means to receive and support can include a means to engage and retain the least one of the downslope edge of the first solar roof tile and the upslope edge of the second solar roof tile.

In another aspect, a solar roof is described. The solar roof can include an eave and a ridge; a roof deck extending between the eave and the ridge; a roof cover layer comprising at least a first course of roofing elements and a second course of roofing elements covering and spaced above the roof deck, at least one of the roofing elements comprising at least one solar roof tile; a plurality of ventilation battens configured to space the first course of roofing elements and the second course of roofing elements from the roof deck; and a flow pathway extending through the plurality of ventilation battens in a transverse direction relative to the first and the second course of roofing elements, and within an internal region between the roof deck and the solar roof tile.

In various aspects, the flow pathway extends from the internal region to an external region above the solar roof tile.

In various aspects, the flow pathway extends between the internal region and an attic region below the roof deck.

In some aspects, the solar roof can include a plurality of primary vent members installed on the roof deck and configured to permit airflow between the internal region and the attic region.

In various aspects, at least a first primary vent member in said plurality of vent members can be positioned proximate to the eave of the roof, and a second primary vent member in said plurality of vent members can be positioned proximate to the ridge of the roof, such that the flow pathway extends between the eave and the ridge.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The features and advantages of the devices and systems for ventilation of solar roofs described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

FIGS. 8A-8H show embodiments of solar roofs that includes at least one solar roof tile with various combinations of other roofing elements.

DETAILED DESCRIPTION

The following discussion presents detailed descriptions of the several embodiments of devices and systems for ventilation of solar roofs shown in the figures. These embodiments are not intended to be limiting, and modifications, variations, combinations, etc., are possible and within the scope of this disclosure.

Solar panels may have an optimum operating temperature at which electric generation is most efficient. Solar panels may have an "optimum operating temperature," often 25° C., above which the performance efficiency of the solar panels begins to see decreases in performance related to increasing temperatures. Depending on the environment where they are installed, the resulting temperature in solar panel(s) above the optimum operating temperature can reduce efficiency by about 10-25%. Panel manufacturers may specify a "temperature coefficient (Pmax)" as the maximum power temperature coefficient which determines how much power the panel will lose per degree Celsius the temperature rises above the optimum operating temperature 25° C. For example, the temperature coefficient of certain monocrystalline and polycrystalline PV solar panels might be −0.45% per 1 degree Celsius meaning that for every degree above 25° C., the maximum power of the solar panel falls by 0.45%.

Cooling of solar panels can increase the operating efficiency of the solar panels by bringing heated or high temperature solar panels closer to or below the optimum operating temperature. One aspect of this disclosure relates to cooling solar panels through passive or active ventilation systems and methods, to improve the solar panel efficiency.

Figure 1:
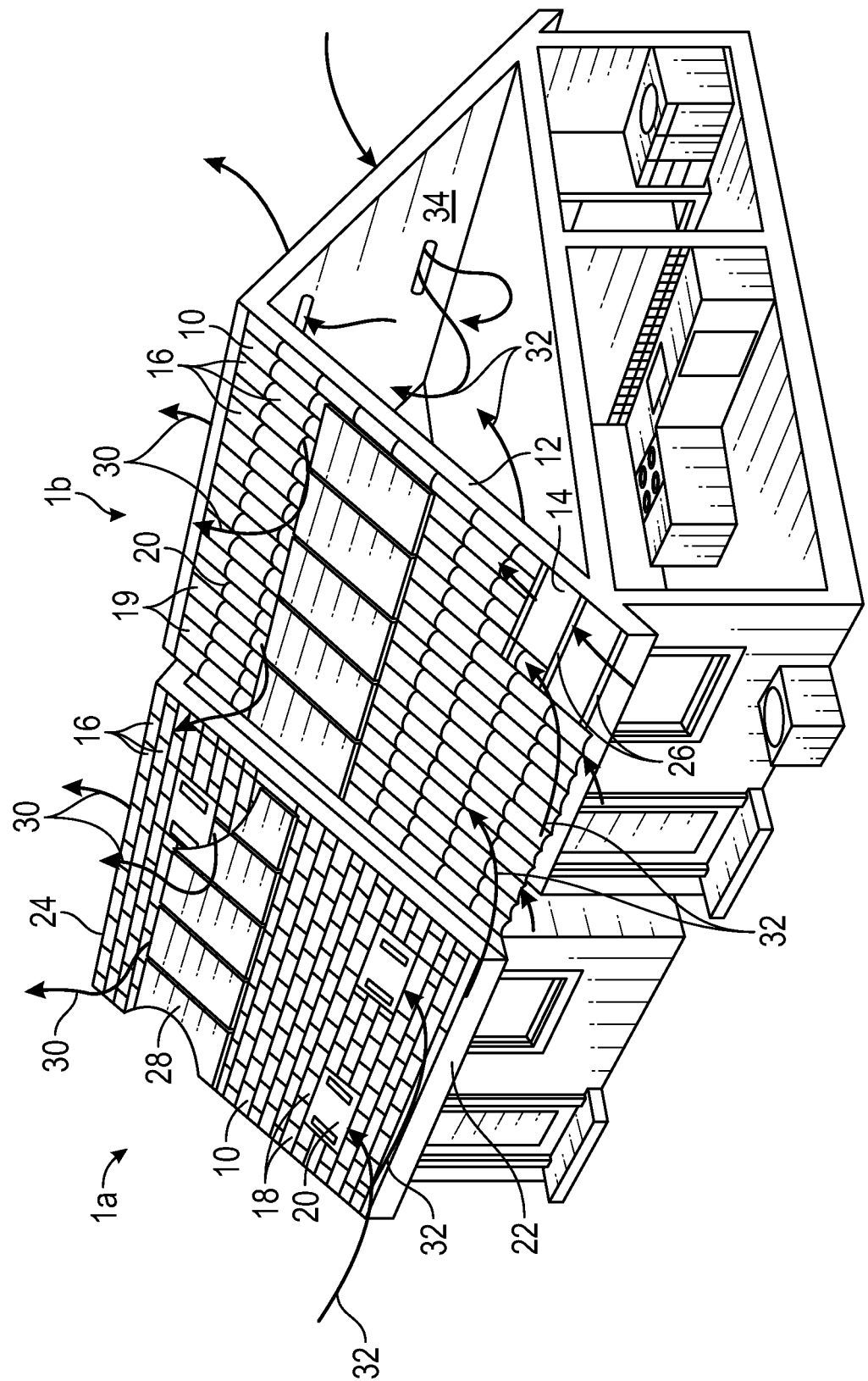
FIG. 1 illustrates two embodiments of buildings including roof-mounted solar panels and roof ventilation systems.

FIG. 1 illustrates two embodiments of buildings 1a, 1b including roof-mounted solar panels 28 and roof ventilation systems. In the illustrated embodiments, the buildings 1a, 1b are residential homes, but the illustrated ventilation systems can be used or adapted for use on many other types of buildings, including both residential and commercial buildings, or other implementations with solar panels that have downslope edges that are adjacent to or overlap with a corresponding upslope edge of a vertically adjacent panel, as described further herein. As illustrated, each of the buildings 1a, 1b includes an exemplary roof 10 comprising a roof frame 12 (illustrated for building 1b), a roof deck 14 supported on the roof frame 12 (illustrated for building 1b), and a layer of roof cover elements 16. The roof deck 14 may typically comprise plywood, metal, or some type of alloy (e.g., steel) sheeting. The layer of roof cover elements 16 may include various types of shingles 18 and/or tiles 19 and various types of vents 20. For example, the roof cover elements (also referred to as "roof elements" or "roofing elements." The shingles can be made of, e.g., steel, metal, composition material, wood, or other materials. The tiles may be made of, e.g., metal, clay, concrete, plastic, or other materials.

As shown, the building 1a includes a roof 10 having a plurality of roof cover elements 16 that comprise shingles 18. The shingles 18 may comprise generally flat and rectangular shapes, although other shapes for the shingles 18 are possible. In general, the shingles 18 are laid in rows from the bottom edge or eave 22 of the roof 10 up towards the apex 24 of the roof 10, with each successive row partially overlapping the row below. In some embodiments, the shingles 18 are made of various materials such as wood, stone, metal, plastic, composite materials (such as asphalt shingles), etc. The shingles 18 can be laid on the roof deck 14. One or more layers of material, such as waterproofing materials and moisture barriers, can be interposed between the shingles 18 and the roof deck 14.

In the illustrated embodiment of the building 1b, the roof 10 includes a plurality of roof cover elements 16 that comprise tiles 19. In this embodiment, the tiles 19 comprise a wavy or undulating shape. In such embodiments, the tiles 19 can comprise so called "S-shaped" or "M-shaped" tiles. Other shapes for the tiles 19, including flat tiles, are also possible. In general, the tiles 19 are laid in rows from the bottom edge or eave 22 of the roof 10 up towards the apex 24 of the roof 10, with each successive row partially overlapping the row below. In some embodiments, the tiles 19 are made of materials such as clay, stone, metal, plastic, composite materials (such as concrete), etc.

In FIG. 1, the roof 10 of the building 1b includes a plurality of purlins or battens 26. The battens 26 can be positioned on the roof deck 14 so as to extend substantially parallel to the eaves 22 and ridge or apex 24 of the roof 10 and substantially perpendicular to rafters 12 that support the roof deck 14. The tiles 19 can be installed over the battens 26, and the battens 26 can space the tiles 19 above the roof deck 14 to create a space between the roof deck 14 and the tiles 19. As illustrated for the building 1b, each batten 26 can directly support an upper edge of a tile 19, which in turn supports a lower edge of an immediately adjacent tile 19. In this arrangement, water tends to flow over each tile's lower edge onto another tile 19. One or more layers of material, such as waterproofing materials and moisture barriers, can be interposed between the tiles 19 and the roof deck 14. In some embodiments, the tiles 19 can be installed on the roof deck 14 without the use of the battens 26.

To provide ventilation for the buildings 1a, 1b, the layer of roof cover elements 16 for each of the buildings 1a, 1b can also include one or more vents 20. In general, the vents 20 are configured to allow airflow therethrough. For example, the vents 20 can be configured to allow airflow from a region above the vents 20 to a region below the vents 20 or vice versa. As illustrated in FIG. 1, the vents 20 can be configured to allow ventilation of air to and from the buildings 1a, 1b. For example, as illustrated by arrows 30, the vents 20 can permit ventilation of air from the buildings 1a, 1b. Additionally, in some embodiments, the vents 20 can allow outside air to flow into the buildings 1a, 1b. For example, as illustrated by arrows 32, the vents 20 can permit air from outside of the buildings 1a, 1b to flow into the interior of the buildings 1a, 1b.

The vents 20 can provide a ventilation system for the buildings 1a, 1b. The ventilation system can provide numerous benefits. For example, the ventilation system can remove hot air from within the buildings 1a, 1b. In many instances, hot air can build up within an attic 34. The vents 20 can allow this hot air to escape. This can cool the buildings 1a, 1b. Additionally, this may conserve energy, as it may reduce or eliminate the need for powered cooling systems, such as air conditioners. Further, the ventilations systems can remove trapped gases from within the buildings 1a, 1b. Proper ventilation facilitates the removal of hot, trapped gasses and fumes, which are a major cause of indoor air pollution, allergies, and other health related problems. The ventilations systems can also reduce moisture buildup within the buildings 1a, 1b, which can reduce the likelihood of mold, mildew, and other health concerns, as well as increase the lifespan of building materials (e.g., lumbar and others) used to construct the home. Finally, proper ventilations systems can extend the life of the roof 10. Other benefits and advantages of ventilation systems are possible.

In some embodiments, the roof vents 20 can be adapted to mimic the appearance of the roof cover elements 16 that surround them. For example, on the building 1a, which includes flat shingles 18, the vents 20 are configured to have flat surfaces. On the building 1b, which includes curved tiles 19, the vents 20 are configured to have a corresponding curved shape. Vents 20 that mimic the appearance of the other roof cover elements 16 (e.g., the shingles 18 or tiles 19) may be aesthetically desirable.

In some embodiments, the ventilation systems can be passive. That is, in some embodiments, the vents 20 are not powered. In other embodiments, the ventilation systems can be active, for example, including one or more powered fans or other components for driving airflow.

As shown in FIG. 1, the roofs 10 can optionally include one or more solar panels 28. The solar panels 28, which can also be referred to as photovoltaic panels, typically include photovoltaic cells that convert solar energy into electrical energy. Solar panels 28 are often installed on roofs 10 in arrays. The solar panels 28 of the arrays can be electrically coupled together to produce a combined output. The electricity generated by the solar panels 28 can be provided to the buildings 1a, 1b so as to reduce or eliminate reliance on the traditional electrical grid. Further, the electricity can be stored in one or more batteries for later use. In some municipalities, the solar panels 28 can even deliver electricity back to the electrical grid, often in exchange for reduced electrical bills.

FIG. 1 illustrates a typical installation of solar panels 28. As shown, the solar panels 28 are mounted to the roofs 10 as separate components positioned above the layer of roof cover elements 16. For example, the solar panels 28 are installed above the shingles 18, tiles 19, and/or vents 20. Often, the solar panels 28 are mounted to the roof deck 14 with brackets that extend through the layer of roof cover elements 16 to position the solar panels 28 above roof 10. In some embodiments, the roof vents 20 may be configured to support the solar panels, for example, as described in U.S. patent application Ser. No. 14/549,290, filed Nov. 20, 2014, and which issued as U.S. Pat. No. 9,394,693, which is incorporated herein by reference. As illustrated in FIG. 1, for example, on the building 1a, in some embodiments, the vents 20 can be installed below or partially below the solar panels 28, with a gap therebetween. Although such gaps and the conventional solar panels which separate from and mounted above the remaining roof cover elements was aesthetically displeasing, it was previously understood that such gaps were necessary, to facilitate cooling of the solar panels 28. For example, as described above, solar panels can absorb a portion of the incident solar energy onto the panel, which can result in heating up the solar panel above an optimum operating temperature. This heating of solar panels can lead to reduced efficiency of solar panels (e.g., in converting the received energy into electricity) that in turn decreases the electrical energy output from the solar panels.

While installation of solar panels may advantageously reduce reliance on the traditional electrical grid and provide a clean, renewable source of electricity, some consumers may not wish to install arrays of solar panels on their roofs in the manner illustrated in FIG. 1 because they may not like the appearance of the solar panels. For example, many buildings are designed with attractive or aesthetically pleasing roofs that complement the appearance and architecture of the buildings. Consumers often purchase particular shapes and colors of tiles that provide a pleasing appearance. As such, many consumers may not want to install an array of solar panels, which generally comprise large, dark, rectangular shapes on their roofs.

A new type of solar system that comprises solar roof tiles with embedded solar panels has recently been developed. For example, U.S. patent application Ser. No. 15/796,683, filed Oct. 27, 2017, and published as U.S. Patent Application Publication No. 2018/0122973, and U.S. patent application Ser. No. 15/662,241, filed Jul. 27, 2017, and published as U.S. Patent Application Publication No. 2018/0123504, each of which are incorporated by reference herein, describe solar roof tiles with embedded solar panels that offer improved aesthetics. Solar roof tiles provide a dual purpose of conventional roofing elements (such as shingles or tiles) and solar panels, and thus are not spaced above other roofing elements and are more aesthetically pleasing, but have not recognized or addressed the overheating and efficiency problems which are exacerbated within such a context.

Roofing elements that comprise roof tiles with embedded solar panels can be used to replace at least some of the conventional roofing element shingles 18 and/or tiles 19 on the roofs 10 of FIG. 1, such that the use of roofing elements with separately-mounted, additional solar panels 28 can be avoided. Because the roof tiles with embedded solar panels can have the appearance of traditional roof tiles (or an otherwise pleasing aesthetic appearance), consumers who have avoided installing traditional solar arrays for aesthetic reasons may find them desirable. Additionally, use of roof tiles with embedded solar panels can allow for an increased surface area of the roof to be devoted to the production of solar power. For example, as shown in FIG. 1, traditional solar panels 28 are generally installed over a relatively small portion of the roof 10. However, roof tiles with embedded solar panels can, if desired, be installed over all, substantially all, or a large portion (e.g., greater than 75%, greater than 80%, greater than 85%, or greater than 90% of the surface area of the roof), allowing for an increased production of solar power.

Figure 2A:
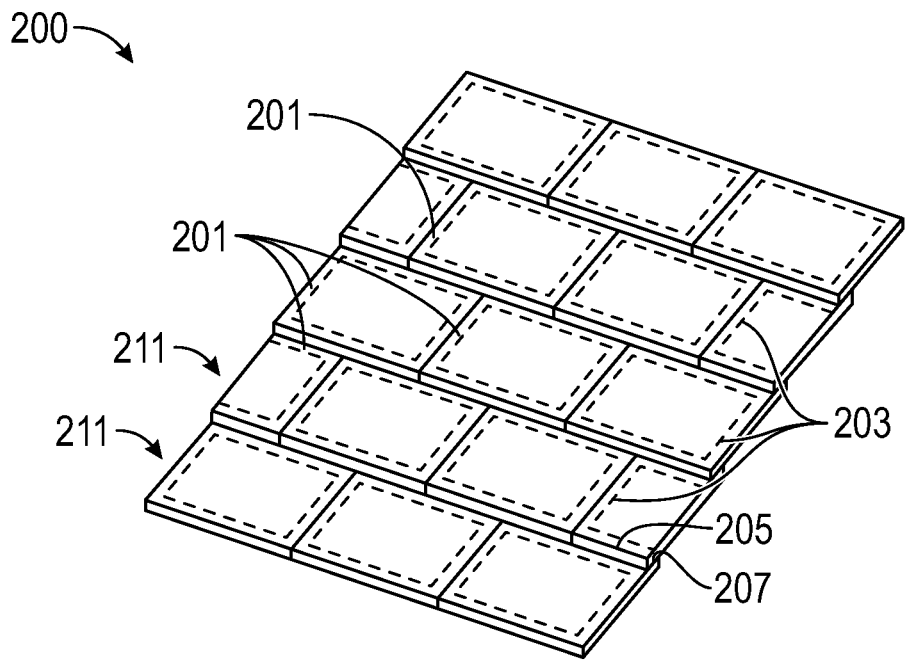
FIG. 2A illustrates a section of an embodiment of a solar roof that comprises roof tiles with embedded solar panels.
Figure 2B:
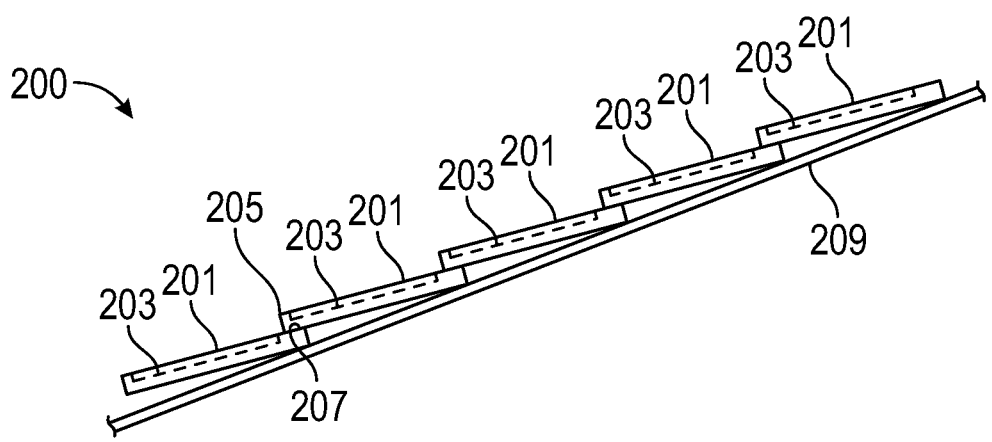
FIG. 2B is a cross-sectional side view of the solar roof section of FIG. 2A.

FIG. 2A illustrates a section of an embodiment of a solar roof 200 that comprises solar roof tiles 201, which comprise embedded solar panels 203. FIG. 2B is a cross-sectional side view of solar roof 200 illustrating the roof tiles 201 and roof deck 209. As shown in FIGS. 2A and 2B, each solar roof tile 201 of the solar roof 200 includes an embedded solar panel 203. The embedded solar panel 203 for each roof tile 201 is illustrated with dashed lines in FIGS. 2A and 2B. The embedded solar panel 203 may include photovoltaic cells embedded within or positioned on a top surface of the roof tile 201, for example, directly on a top surface, without any gap or intervening support structure between the solar panel and the upper surface of the remainder of the roof tile. In some embodiments, the embedded solar panel 203 is integrally formed with the roof tile 201.

In the illustrated embodiment, each roof tile 201 includes an embedded solar panel 203. This, however, need not be the case in all embodiments. For example, the solar roof 200 may comprise a plurality of roof tiles 201 with embedded solar panels 203 as well as a plurality of additional roof tiles that do not include solar panels. For ease of description, this application refers "solar roof tile" to indicate a roof cover element (e.g., a tile, shingle, vent, etc.) with embedded solar panels. Thus, reference to solar roof tiles 201 is intended to refer to roof tiles 201 with embedded solar panels 203.

The solar roof tiles 201 of the solar roof 200 may be arranged in rows (known in the art as "courses") 211 as shown in FIGS. 2A and 2B. For example, as illustrated, an upslope edge 207 of a lower course 211 of solar roof tiles 201 may be vertically adjacent to (e.g., overlapped by) a downslope edge 205 of an upper course 211 of solar roof tiles 201. This arrangement may advantageously shed water in a manner similar to a non-solar roof (such as the roofs 10 of FIG. 1, without battens).

The embedded solar panels 203 of the solar roof tiles 201 may occupy a large portion of the exposed surface of the solar roof tiles 201. As used herein, an "exposed surface" is one that is within the surface area of the installation perimeter of the solar roof tile, but not covered when the solar roof tiles 201 are installed. In some embodiments, an embedded solar panel 203 may occupy at least 50%, at least 60%, at least 70%, at least 75%, at least 80%, at least 85%, at least 90%, or at least 95% of the exposed surface of a solar tile 201. Increasing the size of the embedded solar panel 203 allows for a greater number of photovoltaic cells to be included, increasing the amount of electricity that can be generated.

"Solar roof" as defined herein, and used, for example, with respect to the solar roof 200, refers to a roof that implements at least one roofing element comprising an embedded solar panel, such as a solar roof tile with an embedded solar panel (e.g., 203). Generally a solar roof includes a solar roof tile positioned vertically adjacent to a second roofing element, such as a second embedded solar panel 203 or another roofing element, such as a non-solar tile or shingle, with a corresponding adjacent or overlapping edge therebetween. "Vertically adjacent" is defined as downslope/upslope adjacency between two roofing elements or two courses of roofing elements at different elevations, as distinguished from "horizontal adjacency" between two roofing elements at substantially the same elevation (such as two roofing elements within a single course). In some embodiments, a "solar roof" can be configured to generate electricity from sunlight without requiring additional, separate solar panels to be installed over the roofing elements (e.g., as shown in FIG. 1). For example, the solar roof 200 of FIGS. 2A and 2B comprises solar roof tiles 201 with embedded solar panels 203 that generate electricity, while maintaining the appearance of a traditional roof. It will be understood that embodiments of the solar roof 200 can include one or more traditional, non-solar roofing elements (such as roofing tiles or shingles without an embedded solar panel or vents), in combination with at least one of the solar roof tiles 201. Such non-solar roofing elements may have a similar appearance as the solar roof tiles 201. In contrast, as used herein, a "non-solar roof," such as the non-solar roofs 10 of FIG. 1, comprise non-solar, conventional roofing elements, such as shingles 18 and tiles 19, without any solar roof tiles 201. A non-solar roof thus requires additional separate solar panels 28 to be installed over the non-solar shingles 18 and tiles 19 in order to generate solar electricity. In some embodiments, the solar roof 200 may have the appearance of the roofs 10 of FIG. 1 prior to installation of the separate solar panels 28. It will be understood that some embodiments of the apparatus herein, such as the spacers and battens, that are described within the context of improved installation and support for two vertically adjacent solar roof tiles, can be implemented similarly to help install and support a vertically adjacent single solar roof tile and conventional (non-solar) roofing element, such as a shingle or tile without an embedded solar panel, or two vertically adjacent conventional roofing elements.

The embedded solar panels 203 of the solar roof tiles 201 may be configured so as to obscure or camouflage the solar panels 203 such that the solar roof tiles 201 have an appearance that mimics the appearance of a traditional, non-solar roof tile. For example, the solar roof tiles described herein can be substantially flat (to mimic the appearance of a flat roofing element, such as flat concrete tiles, flat shingles, etc.), or can have a curvilinear profile, for example, to mimic the profile of a curved roofing tile (such as a curved clay tile). U.S. patent application Ser. Nos. 15/796,683 and 15/662,241, previously incorporated by reference herein, describe methods and systems by which the embedded solar panels 203 can be obscured or camouflaged, and can further define "solar roof tile" as used herein.

Considering the solar roof 200 of FIGS. 2A and 2B and the roofs 10 of FIG. 1, many consumers may prefer the appearance of the solar roof 200 because the solar roof 200 may have the appearance of a traditional, non-solar roof. In some embodiments, an additional advantage of the solar roof 200 may be that the solar roof 200 may be able to generate more electricity than the roofs 10 of FIG. 1. This can be because, for the solar roof 200, all, substantially all, or a large portion of the surface area of the roof may comprise solar roof tiles 201 with embedded solar panels 203. In contrast, the roofs 10 of FIG. 1 comprise arrays of solar panels 28 that cover only a smaller portion of the roofs 10.

While the solar roof 200 may be advantageous in some respects, the solar roof 200 may also pose challenges in terms of ventilation. As noted above, there are numerous benefits associated with building ventilation. However, as shown in FIGS. 2A and 2B, the solar roof 200 does not include any system of ventilation. Thus, a building that includes the solar roof 200 may suffer from insufficient ventilation. In addition to lacking the benefits of ventilating the building itself, the efficiency of the solar roof tiles 201 themselves may be decreased if the solar roof tiles 201 are not adequately cooled. Traditional solar panels 28 (as shown in FIG. 1) are spaced above the roofs 10 in a manner that allows for ventilation and cooling of the solar panels 28. For example, air can flow between the bottom side of the solar panels 28 and the roofs 10 in order to cool the solar panels. For the solar roof 200 illustrated in FIGS. 2A and 2B, however, this is not possible. The solar roof 200 does not include any mechanism for venting and cooling the solar roof tiles 201.

U.S. patent application Ser. No. 15/653,493, filed Jul. 18, 2017, and published as U.S. Pub. No 2019/0028054, on Jan. 24, 2019, is incorporated by reference. This application further defines solar roof tiles (as "photovoltaic roof tiles"), and describes batten brackets that are mountable to battens positioned on the roof deck and that can be used to install solar roof tiles. These batten brackets include a channel into which an upslope portion of a solar roof tile can be received. A connector is insertable into the channel so as to secure the solar roof tiles in place. In some embodiments, the batten bracket and/or connector also provide electrical connections between horizontally adjacent solar roof tiles. The system described in U.S. patent application Ser. No. 15/653,493 may allow for simplified installation of solar roof tiles; however, the batten brackets described therein do not provide for ventilation of the solar roof tiles. That is, when installed using the batten brackets of U.S. patent application Ser. No. 15/653,493, the solar roof tiles are arranged generally in the configuration shown in FIGS. 2A and 2B, which as described above may provide insufficient ventilation for the solar roof tiles.

For these reasons, the remainder of this application describes devices and systems for ventilation of solar roofs. As will be described below, these devices and systems can provide for building ventilation through a solar roof so that the benefits attributed to ventilation described above can be achieved while using a solar roof. Additionally or alternatively, the devices and systems for ventilation of solar roofs described herein can facilitate venting and cooling of solar roof tiles that include embedded solar panels. This can increase the lifespan of the solar roof tiles and help ensure that the solar roof tiles produce electricity without suffering a decrease in efficiency that can be caused by overheating.

Figure 3A:
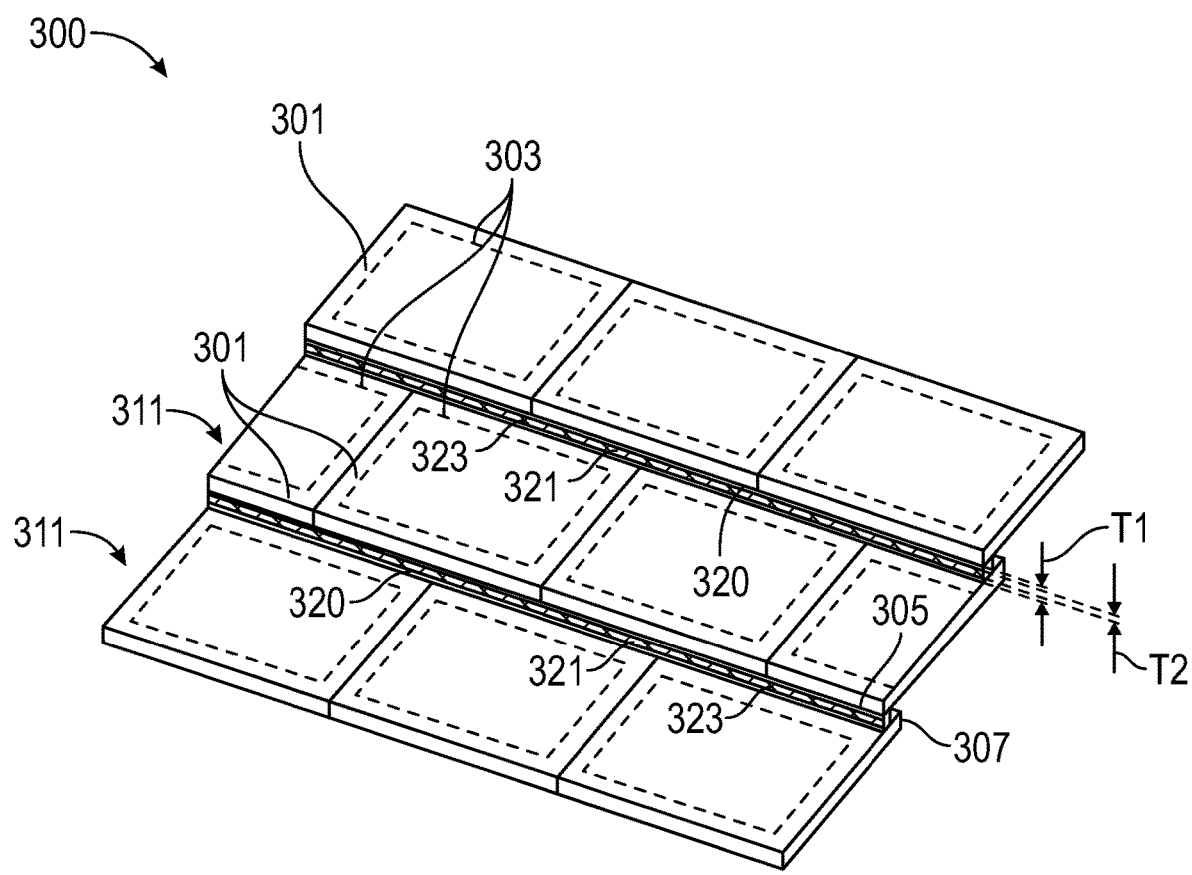
FIG. 3A illustrates a section of an embodiment of a solar roof that comprises roof tiles with embedded solar panels and an example ventilation system.

FIG. 3A illustrates a section of an embodiment of a solar roof 300 that comprises one or more solar roof tiles 301 with embedded solar panels 303 and an example ventilation system. As will be discussed in more detail below, the example ventilation system can allow for building ventilation through the solar roof 300 and provide cooling and venting for the solar roof tiles 301 themselves. In some respects, the solar roof 300 of FIG. 3A may be similar to the solar roof 200 of FIGS. 2A and 2B. For example, the solar roof 300 can comprise one or more solar roof tiles 301 that each include one or more embedded solar panels 303 (illustrated with dashed lines). The solar roof tiles 301 of the solar roof 300 may be arranged in rows or courses 311 in a manner similar to non-solar roof tiles. Further, as illustrated, an upslope edge 307 of a lower solar roof tile 301, or a lower course 311 of solar roof tiles 301 may be vertically adjacent to (e.g., overlapped by) a downslope edge 305 of an upper solar roof tile 301, or an upper course 311 of solar roof tiles 301. This arrangement may advantageously shed water as discussed above.

In contrast with the solar roof 200 of FIGS. 2A and 2B, however, the solar roof 300 comprises spacers 320 that provide ventilation for the solar roof 300 and the solar roof tiles 301. For example, the spacers can be configured to space a portion of one or more of the solar roof tiles or other roofing elements, from the roof deck, while providing ventilation to the solar roof 300. In the illustrated embodiment, the spacers 320 (which may also be considered a batten or lift, and vice versa) are positioned between the upslope edge 307 of each lower course 311 of solar roof tiles 301 and the downslope edge 305 of each vertically adjacent upper course 311 of solar roof tiles 301. The spacers 320 may thus serve to space the downslope edge 305 of each solar roof tile 301 above the upslope edge 307 of the corresponding vertically adjacent (e.g., overlapped) solar roof tile 301. In some embodiments, the spacers 320 can be implemented to space a solar roof tile from a corresponding vertically adjacent roofing element. In some embodiments, the spacers 320 can space the upslope edge of a solar roof tile, and/or a roofing element, from a roof deck (not shown in FIG. 3A, but described further below with respect to FIG. 3C).

The spacers 320 may comprise a thickness T1 as shown. The thickness T1 of the spacer 320 may dictate how far above the upslope edge 307 of a lower solar roof tile 301 the downslope edge 305 is spaced. In some embodiments, the thickness T1 of the spacer 320 can be about 0.25 inches, 0.5 inches, 0.75 inches, 1.0 inches, 1.25 inches, or 1.5 inches.

The spacers 320 may comprise one or more openings 321 formed therethrough. The openings 321 (or any other openings or channels that permit flow as described herein) can be covered or filled with an intrusion-resistant structure 323, such as a screen, baffle, or mesh. The openings 321 and/or mesh 323 may be configured to prevent dust, leaves, or other debris from being blown through the openings 321. In some embodiments, the mesh 323 may be omitted and the openings 321 may remain uncovered.

In some embodiments, the intrusion resistant structure 323 may be configured to prevent embers from being blown through the openings 321, which may increase the fire resistibility of the solar roof 300. For example, the structure 323 can comprise a baffle or mesh structure, such as those described in U.S. Pat. No. 9,011,221, the entirety of which is incorporated by reference herein. The mesh can comprise, consist essentially of, or consist of: a fire-resistant mesh material, a wool, such as stainless steel wool, such as AISI 434 stainless steel, or a fire-resistant fibrous interwoven material. The mesh can provide a net free ventilating area with greater than about 70%, 75%, 80%, 85%, 90%, 95%, or 97% open area. The mesh material can provide a net free ventilating area of greater than 80, 85, 90, 95, 100, 105, 110, 115, 120, or 125 inches per square foot.

The openings 321 through the spacers 320 can be configured to allow airflow therethrough so as to provide ventilation. Airflow through the spacers 320 will be described more fully below with reference to FIGS. 3B and 3C, which illustrate cross-sectional views of different embodiments of the solar roof 300. The openings 321 may comprise a thickness T2 as shown. In some embodiments, the thickness T2 of the opening 321 can be about 0.125, 0.25 inches, 0.5 inches, 0.75 inches, 1.0 inches, or 1.25 inches. The openings 321 can be any suitable shape or size to allow a desired airflow through the spacers 320, and can be the same or different size relative to each other. The thickness T2 can comprise a diameter of a circular opening 321.

In some embodiments, the thickness T2 of the opening 321 can be related to the thickness T1 of the spacer 320. For example, the thickness T2 of the opening 321 can be about 0.125, 0.25 inches, 0.5 inches, 0.75 inches, or 1.0 inches less than the thickness T1 of the spacer 320. As another example, in some embodiments, the thickness T2 of the opening 321 can be about 50%, 60%, 70%, 75%, 80%, or 90% the thickness T1 of the spacer 320.

In the illustrated embodiment, each spacer 320 extends entirely across the illustrated section of the solar roof 300. In some embodiments, the length of each spacer 320 may be, for example, 3 feet, 6 feet, 9 feet, 12 feet, or more. The spacers 320 can be cut to desired lengths when installed. In some embodiments, the spacer 320 may comprise a length that corresponds with the length of the solar roof tile 301 with which the spacer 320 will be used. Other lengths for the spacers 320 are possible. Also as shown in the illustrated embodiment, the openings 321 of the spacer 320 extend all or substantially all the length of the spacer 320. This need not be the case in all embodiments. For example, in some embodiments, one or more of the openings 321 can extend only a portion of the length of the spacer 320. In some embodiments, the spacer 320 includes a plurality of openings 321 distributed along its length.

Figure 3B:
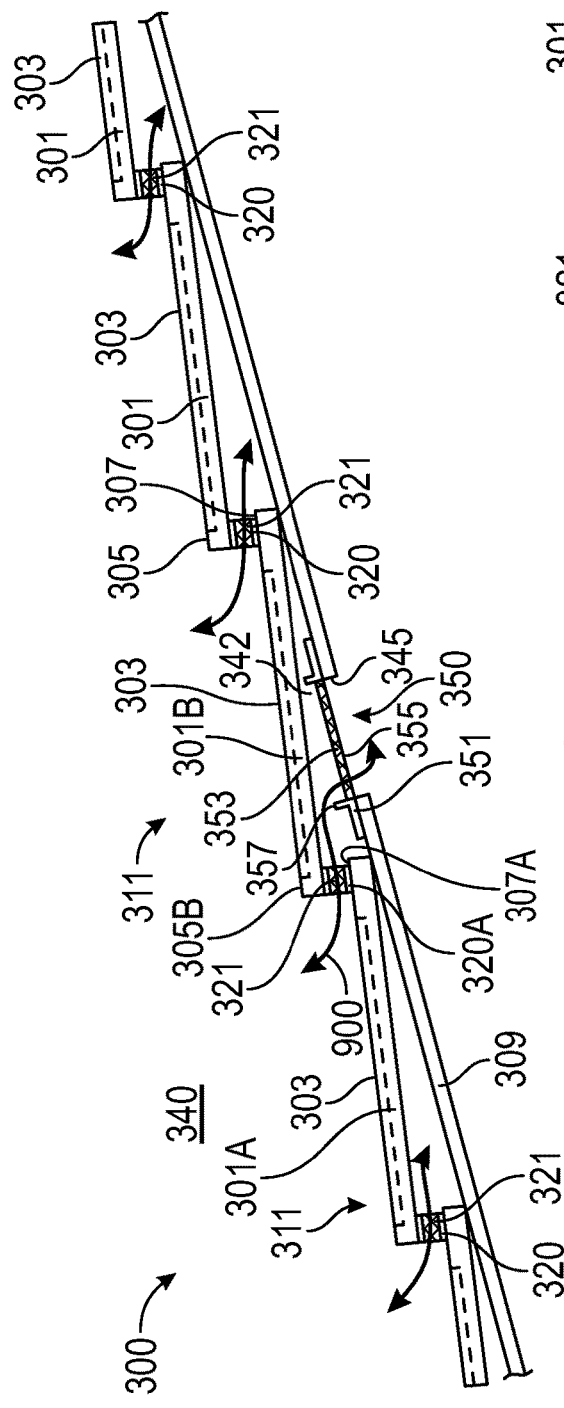
FIG. 3B is a cross-sectional side view of a first embodiment of the solar roof section of FIG. 3A that includes spacers that elevate a downslope edge of the roof tiles with embedded solar panels to provide ventilation.

FIG. 3B is a cross-sectional side view of a first embodiment of the section of solar roof 300 of FIG. 3A. As shown in FIG. 3B, the spacers 320 are positioned between the downslope edge 305 of an upper solar tile 301 and a corresponding upslope edge 307 of a vertically adjacent lower solar tile 301. The spacers 320 thus elevate the downslope edge 305 of each solar tile 301 to provide a space between the downslope edge 305 and a corresponding upslope edge 307 of a vertically adjacent solar tile 301 through which air can flow to provide ventilation. As such, the spacers space the downslope edge 305 from the roof deck 309.

Arrows in FIG. 3B illustrate example air flow through the spacers 320. In particular, air can flow through the openings 321 in the spacer 320A from an external region 340 above the solar roof tiles 301 to an internal region below the solar roof tiles 301. Thus a ventilation pathway 900 can be formed extending from an external region 340 above a first solar roof tile 301A, between the upslope edge 307A of the first solar roof tile 301A and the downslope edge 305B of the second, vertically adjacent roofing element (e.g., second solar roof tile 301B, e.g., through the spacer 320), and to a volume 342 within the internal region formed between the second vertically adjacent roof tile 301B and the roof deck 309. Such airflow, which allows air to flow above and below the solar roof tiles 301 may serve to vent or cool the solar roof tiles 301 such that decreases in efficiency of the embedded solar panels 303 can be reduced or eliminated, as well as improving ventilation along an upper surface of the roof deck 309.

FIG. 3B also illustrates that, in some embodiments, one or more primary vents 350 can be included to provide further ventilation. In FIG. 3B, one primary vent 350 is illustrated, although, as discussed below, more than one primary vent 350 can be included in some examples. The primary vent 350 can be configured to be installed into an opening 345 in the roof deck 309. The primary vent 350 can be configured to allow airflow between a region above the roof deck 309 and a region below the roof deck 309. Thus, ventilation pathway 900 can further extend from the volume 342 formed between the second vertically adjacent roof tile 301B and the roof deck 309, through the roof deck 309 (via the opening 345), and to the region below the roof deck 309. Example airflow through the primary vent 350 is illustrated with arrows in FIG. 3B.

Figure 6A:
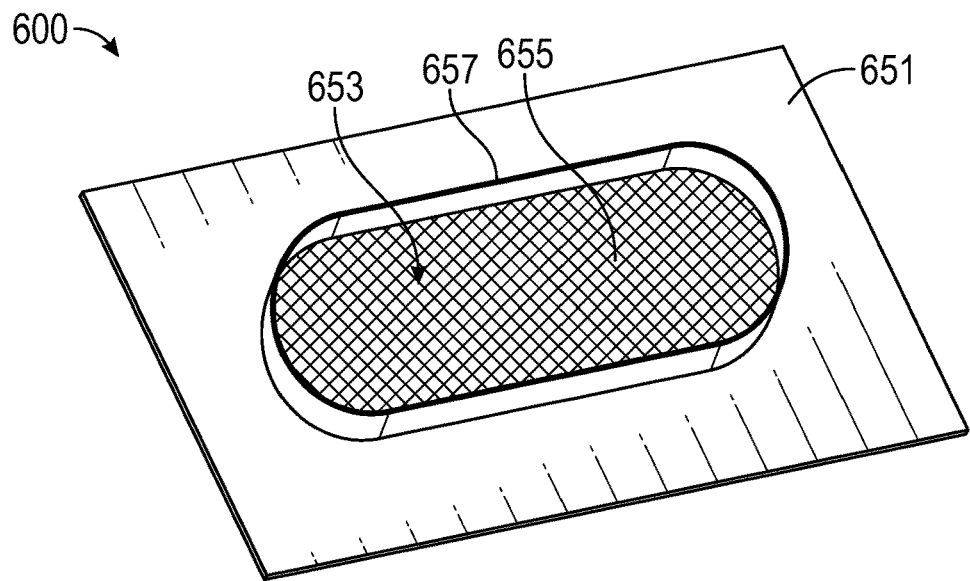
FIG. 6A is an isometric view illustrating an embodiment of a primary vent member configured to be installed in and provide ventilation through a roof deck.
Figure 6B:
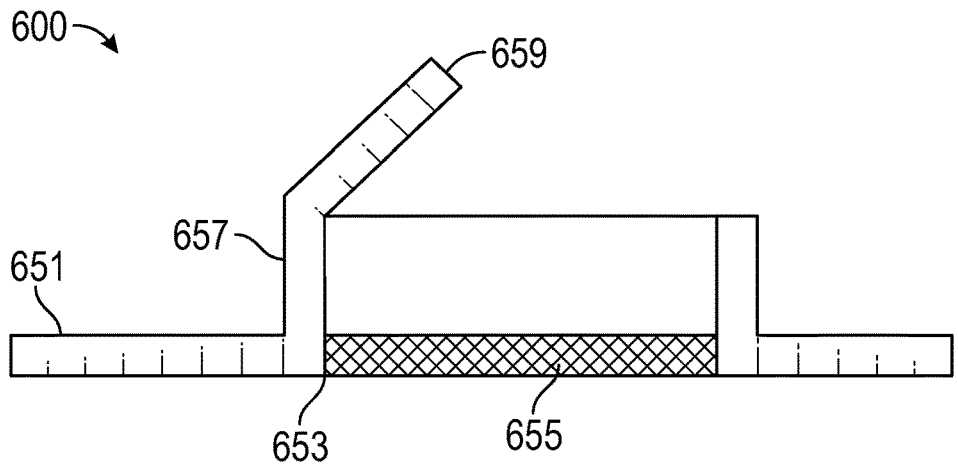
FIG. 6B is a cross-sectional side view of the primary vent member of FIG. 6A and illustrates a first embodiment of a baffle of the primary vent member.
Figure 6C:
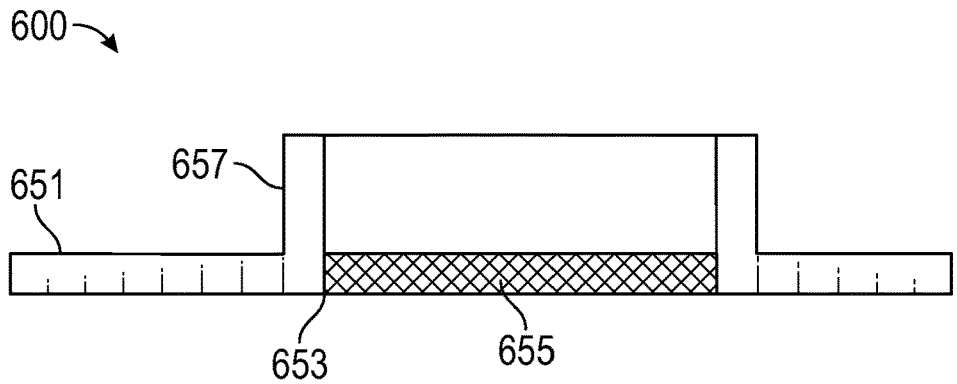
FIG. 6C is a cross-sectional side view of the primary vent member of FIG. 6A and illustrates a second embodiment of a baffle of the primary vent member.

In the illustrated embodiment of FIG. 3B, the primary vent 350 comprises a subflashing body 351 defining an opening 353. The opening 353 can be configured to allow airflow therethrough. The opening 353 may be covered with a mesh or screen 355 that allows airflow therethrough. The screen 355 may be configured to prevent dust, leaves, or other debris from being blown through the opening 353 of the primary vent 350. In some embodiments, the screen 355 may be configured to prevent embers from being blown through the opening 353, which may increase the fire resistibility of the solar roof 300. In some embodiments, no mesh or screen 355 is included. In some embodiments, the subflashing body 351 is configured to include a baffle 357. The baffle 357 may be configured to surround the opening 353. The baffle 353 may be configured to prevent, dust, leaves, other debris, and/or embers from passing through the opening 353. Example primary vents are shown in FIGS. 6A-6C which are described in more detail below.

In combination, the primary vent 350 and the spacers 320 can provide airflow through the solar roof 300. For example, the primary vent 350 and the spacers 320 can allow airflow and ventilation from a region below the roof deck 309 to a region above the solar roof tiles 301. Example airflow is illustrated with arrows in FIG. 3B. Such ventilation can be used to provide building ventilation through the solar roof 300 to achieve the benefits of ventilation discussed above with reference to FIG. 1.

As noted previously, in some embodiments, more than one primary vent 350 can be included. For example, in some embodiments, at least one primary vent 350 is included under each course 311 (see FIG. 3A). In some embodiments, more than one primary vent 350 is included under each course 311 of tiles. For example, one, two, three, four, five, six or more primary vents 350 can be included below each course 311. In some embodiments, the number of primary vents 350 included below each course 311 is selected to relate to the net free vent area of the opening 321 of the spacer 320 associated with that course. For example, in some embodiments, the number of primary vents 350 included below a course 311 is selected such that the total net free vent area of the primary vents 350 for the course 311 is equal to or greater than the net free vent area of the spacer 320 associated with the course 311. Balancing the primary vents 350 and spacers 320 in this way may provide a balanced airflow through the solar roof 300. In some embodiments, not every course 311 of solar roof tiles 301 includes a primary vent 350.

In the embodiment of FIG. 3B, the upslope edges 307 of each solar roof tile 301 can be positioned on or attached to the roof deck 309 in a way that may restrict airflow between the volumes below two vertically adjacent solar roof tiles 301. For example, the upslope edge 307 of each solar roof tile 301 may be directly attached to the roof deck 309, limiting any significant airflow between this upslope edge 307 and the roof deck 309. Such embodiments may restrict airflow between two adjacent volumes below each of two corresponding vertically adjacent solar roof tiles 301. Such airflow may thus be restricted between two vertically adjacent courses of solar roof tiles 301.

Figure 3C:
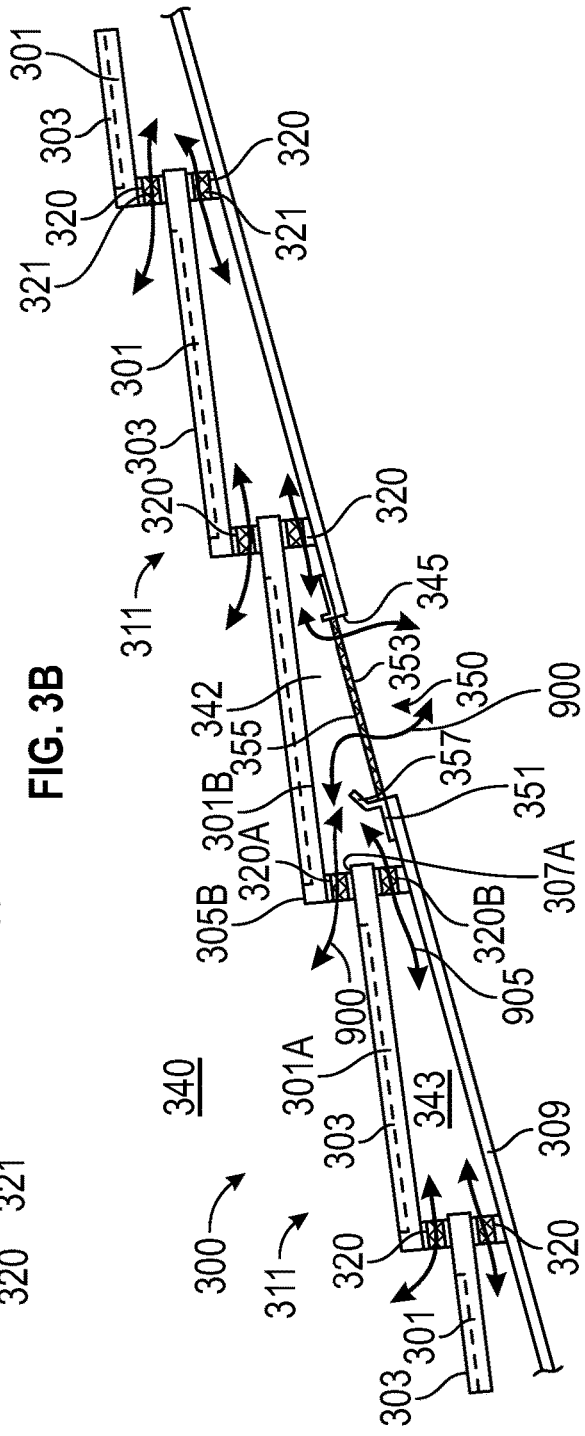
FIG. 3C is a cross-sectional side view of a second embodiment of the solar roof section of FIG. 3A that includes spacers that elevate downslope and upslope edges of the roof tiles with embedded solar panels to provide ventilation.

FIG. 3C is a cross-sectional side view of a second embodiment of the solar roof 300 of FIG. 3A. FIG. 3C illustrates an additional embodiment that is further configured to allow airflow between a volume formed below a first solar roof tile 301, and a volume formed below a second, vertically adjacent roofing element, such as a second solar roof tile. Such an embodiment can allow or increase airflow between two vertically adjacent courses of roofing elements. To provide such additional airflow, the roof 300 of FIG. 3C can include additional spacers 320 that elevate both downslope and upslope edges of the solar roof tiles 301 to provide additional ventilation. In many respects, the embodiment of the solar roof 300 of FIG. 3C is similar to the embodiment of the solar roof 300 of FIG. 3B, except that in the embodiment of the solar roof 300 of FIG. 3C, additional spacers 320 (e.g., 320B) can be positioned between upslope edges 307 (e.g., 307A) of solar roof tile 301 (e.g., 301A) and the roof deck 309, and so forth. The use of these additional spacers 320 further elevates the upslope edge of solar roof tiles 301 above the roof deck creating additional space in the region or volume formed below each of the solar roof tiles 301 and above the roof deck 309. The additional spacers 320 can allow for upslope or downslope airflow between the corresponding volumes below each of two vertically adjacent solar roof tiles 301. Such airflow can allow for ventilation of the spaces below two vertically adjacent courses of roofing elements, such as courses 311 of solar roof tiles 301. For example, in addition to the ventilation pathway 900 described above with respect to FIG. 3B, the embodiments in FIG. 3C can include an additional ventilation pathway 905 extending from the first volume 342 formed between the second vertically adjacent roof tile 301B and the roof deck 309, through the spacer 320B, and to a second volume 343 formed between the first roof tile 301A and the roof deck 309. In this way, pathway 905 can allow airflow that is transverse relative to a course of roofing elements positioned over the roof deck 309. For example, pathway 905 can allow airflow between the roof deck 309 and a roof cover layer in an upslope and downslope direction, to cool the roof deck or the roofing elements that form the roof cover layer, such as one or more solar roof tiles.

Pathway 905 can also extend from the volume 342, and through the roof deck 309 via opening 345, and to the region below the roof deck 309. Thus, pathway 905 and 900 can merge, to follow as similar path of airflow. In some embodiments, the additional spacers 320 also permit water to flow therethrough to allow the roof to drain. It will be understood that pathways 900, 905 can be bidirectional, even if described herein as unidirectional.

In some embodiments, the lower spacers 320 (i.e., the spacers 320 positioned between the roof deck 309 and the upslope edges 307 of the solar roof tiles 301) may be the same or substantially similar to the upper spacers 320 (i.e., the spacers 320 positioned between the upslope edges 307 of a lower solar roof tile 301 and the downslope edges 305 of an upper solar roof tile 301). For example, as illustrated, the lower spacers 320 may comprise openings 321 covered with or formed within mesh 323. In other embodiments, however, the lower spacers 320 may be different than the upper spacers. For example, in some embodiments, the lower spacers 320 are configured as flow through battens. In some embodiments, flow through battens comprise openings that are positioned along the bottom edges of the battens. The openings can be positioned directly on the surface of the roof deck 309, or one or more intermediate structures, such as a waterproof roofing membrane. The openings can have an open side, to reduce the restriction of flow under the spacers 320, along the roof deck 309. An example of a lower spacer with an open side is described further below, with reference to FIGS. 4A and 4B. These openings can allow air to pass therethrough (for ventilation) but can also allow water to flow therethrough (for drainage). Example flow through the lower spacers 320 is illustrated with arrows in FIG. 3C, such as pathway 905.

As shown in FIG. 3C, this embodiment of the solar roof 300 can also include one or more primary vents 350. The primary vents 350 can be similar to the primary vents 350 described with reference to FIG. 3B (above) or the primary vents shown in FIGS. 6A-6C (described below). In some embodiments, for example, as illustrated in FIG. 3C, the additional space between the solar roof tiles 301 and the roof deck 309 can allow for larger baffles 357 to be included on the subflashing body 351 of the primary vent. For example, as illustrated in FIG. 3C (see also FIG. 6B) a downslope portion of the baffle 357 can include a larger flange than the upslope portion of the baffle 357. In some embodiments, a portion of the larger flange is to partially cover the opening 353 of the primary vent. In some embodiments, this may decrease the likelihood that debris or embers can be driven through the primary vent 350.

Different numbers of primary vents 350 can be used in different embodiments of the solar roof 300 of FIG. 3C. For example, in some embodiments, more than one primary vent 350 is included under each course 311 of tiles. For example, one, two, three, four, five, six or more primary vents 350 can be included below each course 311. In some embodiments, the number of primary vents 350 included below each course 311 is selected to relate to the net free vent area of the opening 321 of the spacers 320 associated with that course 311 (i.e., the upper and lower spacers 320 associated with the course 311). For example, in some embodiments, the number of primary vents 350 included below a course 311 is selected such that the total net free vent area of the primary vents 350 for the course 311 is equal to or greater than the net free vent area of the spacers 320 associated with the course 311. Further, in the embodiment of FIG. 3C, because the lower spacers 320 permit airflow between the courses 311, in some embodiments, the number of primary vents 350 included below each course 311 is selected to relate to the net free vent area of the opening 321 of the spacer 320 associated with a plurality of courses 311. For example, in some embodiments, the number of primary vents 350 included below a course 311 is selected such that the total net free vent area of the primary vents 350 for the course 311 is equal to or greater than the net free vent area associated with the spacers 320 associated with one, two, three, courses, for example. As before, balancing the primary vents 350 and spacers 320 in this way may provide a balanced airflow through the solar roof 300. In some embodiments, not every course 311 of solar roof tiles 301 includes a primary vent 350. The number of spacers, the number of primary vents, and/or the net free vent area of the spacers and vents can be selected to maintain one or more solar roof tile (or its solar panel) at or below an optimum operating temperature. The optimum operating temperature can be 40° C., 35° C., 30° C., 25° C., 20° C., or 15° C.

It will be understood that although the solar roof tiles and spacers herein may be shown in an approximately flat and/or straight configuration (i.e., flat and/or straight extending along the length of the spacers (for the tiles), across the width of the roofing elements (for the spacers) and across the width of a roof (for both)) in some embodiments, the spacers (or portions thereof) may be curvilinear, to conform with or otherwise mimic the appearance of corresponding curvilinear solar roof tiles (or portions thereof). Thus, for example, a spacer can have a curvilinear shape along its length, to conform with a corresponding S-shaped or M-shaped roofing element along which the spacer extends. For example, it will be understood that those embodiments shown in FIGS. 3B-3C can be modified from the configurations shown, such that solar roof tiles 301A and 301B can comprise S- or M-shaped solar roof tiles, with a curvilinear profile (corresponding with S- or M-shaped roof tiles) along the corresponding upslope edge 307A of the first solar roof tile 301A, and the downslope edge 305B of the second solar roof tile 301B. In such an embodiment, both the upper and lower surfaces of first spacer 320A can have a curvilinear profile extending along the length of spacer 320A, to conform with the solar roof tiles 301A and 301B. For example, the upper surface of spacer 320A can be curved to conform with the profile of the downslope edge 305B of the second solar roof tile 301B, and the lower surface of spacer 320A can be curved to conform with the profile of the upslope edge 307A of the first solar roof tile 301A. In some embodiments, the second spacer 320B can include a curvilinear profile on one of its surfaces, and a straight profile on a second surface, extending along its length. For example, the upper surface of spacer 320B can be curved along its length to conform with the profile of the upslope edge 307A of spacer 320A, and can be flat along its length to correspond with a flat roof deck 309.

Figure 3D:
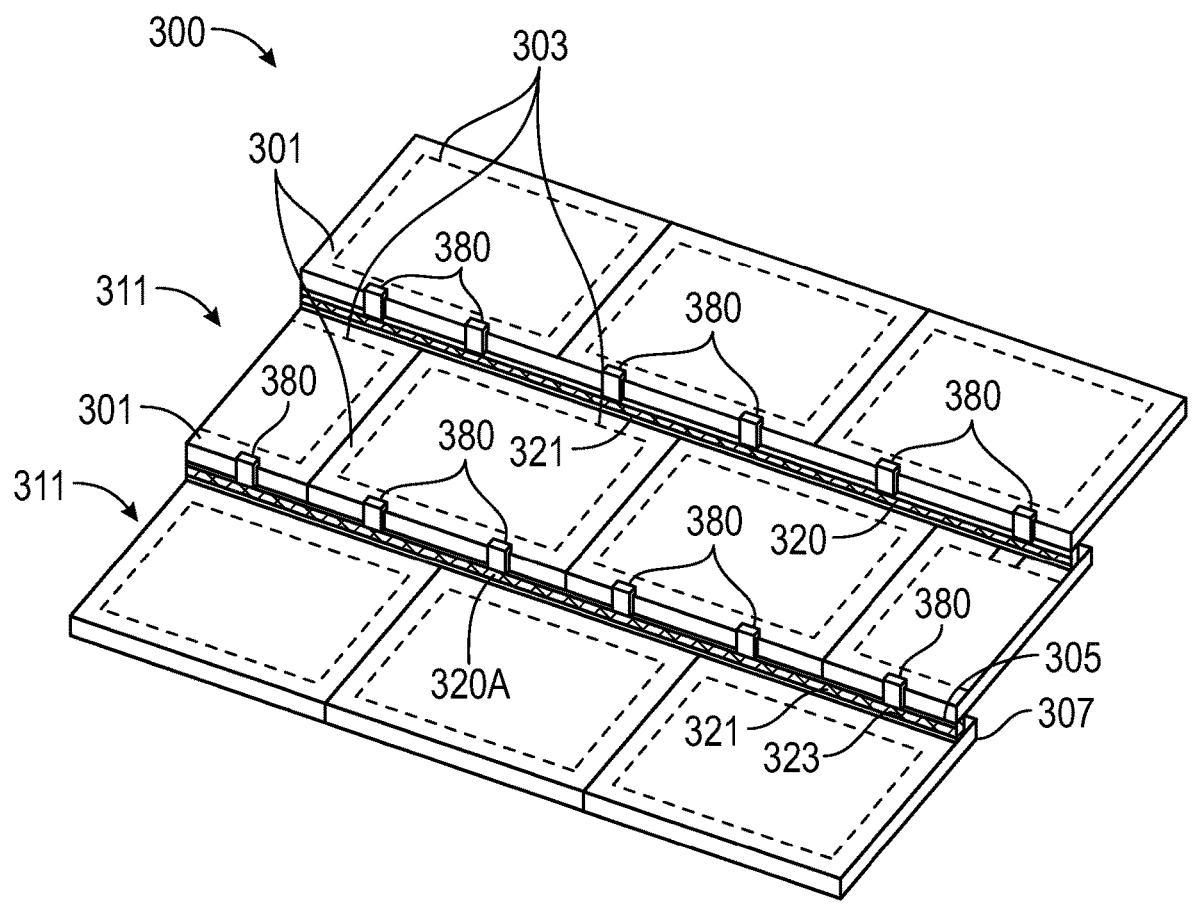
FIG. 3D illustrates another embodiment of a solar roof section that includes an embodiment of a spacer having clips for securing a downslope edge of roofing elements.

FIG. 3D illustrates another embodiment of the section of solar roof 300. As discussed above, the solar roof 300 comprises one or more solar roof tiles 301 with embedded solar panels 303 and an example ventilation system. In the illustrated embodiment, the ventilation system comprises a plurality of spacers 320A that provide ventilation for the solar roof 300 and the solar roof tiles 301. In the illustrated embodiment, the spacers 320A (which may also be considered a batten or lift, and vice versa) are similar to the spacers 320 previously described, except that the spacers 320A also include one or more clips 380 as shown. The clips 380 can be configured to secure a downslope edge of the roofing elements overlaying the spacers 320A, such as the downslope edge of the solar roof tiles 301. In some embodiments, the clips 380 comprise wind clips that are configured to prevent wind from lifting the downslope edges of the solar roof tiles 301. Thus, the clips 380 can be configured to provide a more secure installation of the solar roof tiles 301.

In some instances, state, national, and/or international building codes may specify necessary standards for connecting and securing roofing elements, such as solar roof tiles and others, to the roof. The International Residential Code provides such standards, the entirety of which is incorporated by reference herein. Inclusion of the clips 380 can help in meeting these standards by, for example, increasing the numbers of points at which the roofing elements are secured to the roof.

As shown in FIG. 3D, the clips 380 can be spaced evenly along the length of the spacer 320A. Even spacing, however, is not required. The clips 380 can be arranged so that at least one clip 380 is positioned so as to secure a downslope edge of every roofing element. In the illustrated embodiment, two clips 380 are positioned so as to secure each roofing element. In some embodiments, one, two, three, four, five, or more clips 380 can be used to secure each roofing element.

Figure 3E:
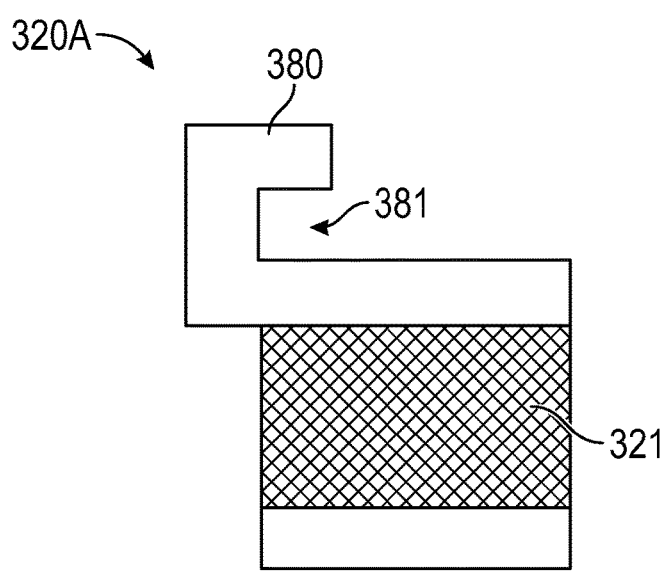
FIG. 3E is a side view of the spacer of FIG. 3D.

In some embodiments, the clips 380 can be integrally formed with the spacer 320A. FIG. 3E illustrates a side view of a spacer 320A with an integrally formed clip 380. As shown, the clip 380 extends from an upper portion of the spacer 320A and creates a recess or groove 381 that can be configured to receive a downslope edge of a roofing element, such as a downslope edge of a solar roof tile 301. The clips 380 need not be integrally formed with spacer 320A.

Figure 4A:
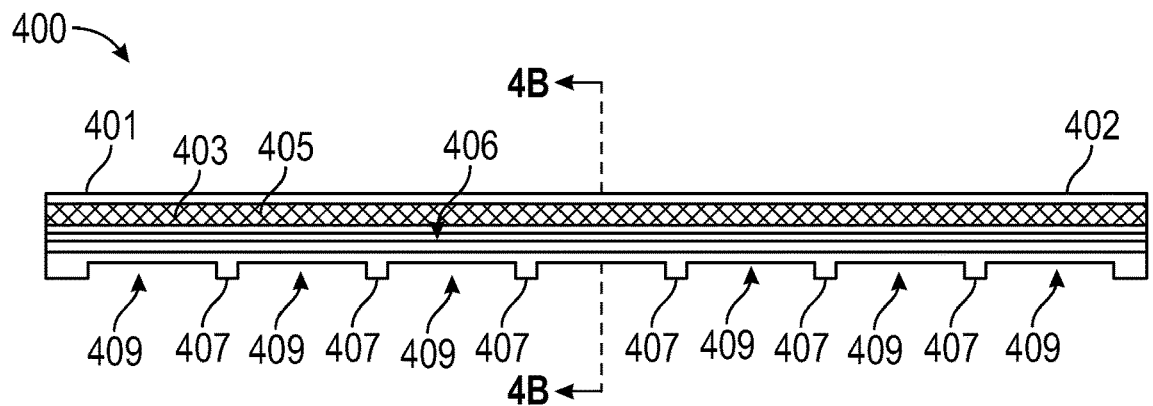
FIG. 4A illustrates a front view of an embodiment of a ventilation batten configured for use with solar roofs that include roof tiles with embedded solar panels.
Figure 4B:
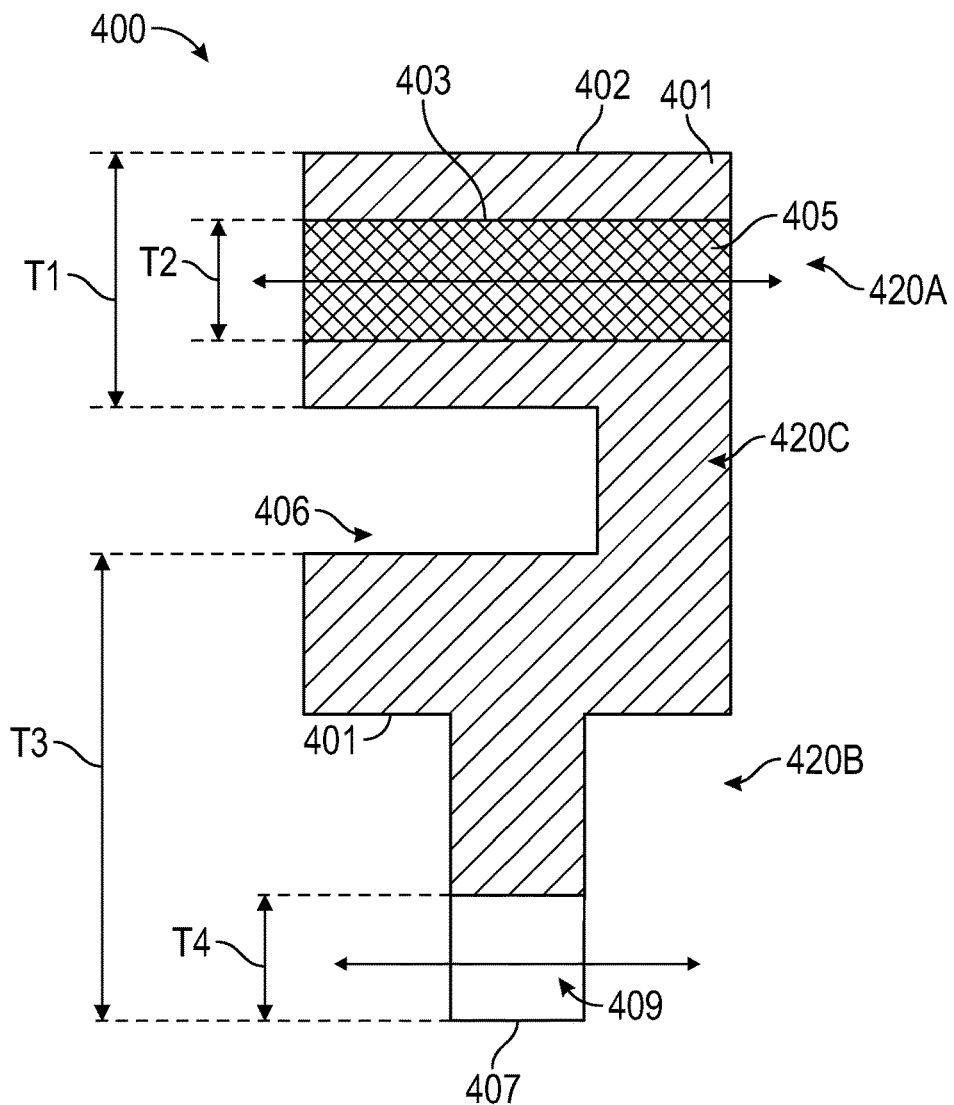
FIG. 4B is a cross-sectional side view of the ventilation batten of FIG. 4A.

FIG. 4A illustrates a front view of an embodiment of a ventilation batten 400 configured for use with solar roofs that include roof tiles with embedded solar panels. FIG. 4B is a cross-sectional view of the ventilation batten 400. As illustrated, the ventilation batten 400 comprises a body 401. As will be described below with reference to FIGS. 5A and 5B, the body 401 is configured to engage with solar roof tiles in a manner that provides ventilation for a solar roof.

An upper surface 402 of the ventilation batten 400 may be configured to contact and support a downslope edge of a solar roof tile, as will be described below with reference to FIGS. 5A and 5B. As illustrated, in some embodiments, the upper surface 402 comprises a flat surface, although other shapes and profiles for the upper surface 402 are also possible.

As best seen in the cross-sectional view of FIG. 4B, the body 401 comprises an opening 403 formed therethrough. The opening 403 can be configured to allow airflow therethrough. FIG. 4B includes arrows illustrating example airflow through the opening 403. In some embodiments, the opening 403 is covered with a screen 405 or mesh as illustrated. The screen 405 can be configured to prevent debris or embers from being driven through the opening 403 as described above, while still permitting airflow through the opening 403. In some embodiments, the screen 405 may be omitted.

The body 401 of the ventilation batten 400 also includes a recess 406 formed in a front surface thereof. As will be described below, the recess 406 can be configured to receive and support an upslope edge of a solar roof tile (see FIG. 5B). Thus, as will be described in more detail below with reference to FIGS. 5A and 5B, the body 401 of the ventilation batten 400 is configured to space a downslope edge of an upper solar tile (supported on the upper surface 402) apart from an upslope edge of a lower solar roof tile. Recess 406 can provide an advantage in that it can receive and support the upslope edge of a lower solar roof tile, and provide overall improved support and stability between two vertically adjacent roofing elements, and a roof deck. In some embodiments, the recess 406 may also be configured to receive one or more connectors, such as the connectors 20 described in U.S. patent application Ser. No. 15/653,493. The connectors can be configured to provide, for example, electrical connections between horizontally adjacent solar roof tiles. The connectors can also be configured to secure the solar roof tiles into the recess 406. For example, recess 406 can include coupling features, such as grooves, that engage and retain the connector within the recess 406. The connector can in turn comprise coupling features that engage and retain the solar roof tiles. In some embodiments, the connector can be omitted, and the coupling features can be directly integrated within the recess 406. For example, the recess 406 can include coupling features that engage and retain the solar roof tiles. The body 401 positions the opening 403 between the downslope edge of the upper solar tile and the upslope edge of a lower solar roof tile so that airflow can pass between the two solar roof tiles.

The body 401 may comprise a thickness T1 as shown measured between the upper surface 402 and the upper portion of the recess 406. The thickness T1 may dictate how far above the upslope edge of the lower solar roof tile the downslope edge of the upper solar roof tile is spaced. Body 401 can comprise an upper spacer 420A (e.g., extending between thickness T1 as shown). Spacer 420A and opening 403 can provide a similar function as spacer 320A and opening 321 in FIGS. 3A-3C.

In some embodiments, the thickness T1 can be about 0.25 inches, 0.5 inches, 0.75 inches, 1.0 inches, 1.25 inches, or 1.5 inches. The opening 403 may comprise a thickness T2 as shown. In some embodiments, the thickness T2 of the opening 403 can be about 0.125, 0.25 inches, 0.5 inches, 0.75 inches, 1.0 inches, or 1.25 inches. In some embodiments, the thickness T2 of the opening 403 can be related to the thickness T1 of the ventilation batten 400. For example, the thickness T2 of the opening 403 can be about 0.125, 0.25 inches, 0.5 inches, 0.75 inches, or 1.0 inches less than the thickness T1. As another example, in some embodiments, the thickness T2 of the opening 403 can be about 50%, 60%, 70%, 75%, 80%, or 90% the thickness T1 of the ventilation batten 400.

The body 401 may also include feet 407. The feet 407 can be configured to contact a roof deck when the ventilation batten 400 is installed. In some embodiments, the feet 407 provide fix points or attachment points at which the ventilation batten 400 can be attached to the roof deck (see FIG. 5B). As shown in the cross-sectional view of FIG. 4B, the recess 406 may be sufficiently deep, such that it overlaps the feet 407. This may allow a fastener to be inserted through the ventilation batten 400, recess 406 and foot 407, and into the roof deck as described below with reference to FIG. 5B. In some embodiments, the foot 407 is narrower than the remainder of the body 401 (see FIG. 4B). This, however, need not be the case in all embodiments.

Below the recess 406, the body 401 may include a thickness T3 as shown. The thickness T3 can be measured between a lower portion of the recess 406 and bottom of the foot 407. Body 401 can include a lower spacer 420B (e.g., extending the thickness T3 from the lower portion of the recess 406 to the bottom of body 401). Spacer 420B can provide a similar function as spacer 320B and its opening 321 in FIG. 3C. In some embodiments, body 401 includes a support member 420C extending between and attaching spacers 420A and 420B to each other, and forming the opening 406 therebetween.

The thickness T3 can dictate how far above the roof deck the upslope edge of the solar roof tile positioned within the recess 406 is spaced. This may dictate how much space is below the solar roof tiles and above the roof deck. In some embodiments, the thickness T3 can be about 0.25 inches, 0.5 inches, 0.75 inches, 1.0 inches, 1.25 inches, or 1.5 inches.

As shown in FIG. 4A, the ventilation batten 400 can include a plurality of feet 407 distributed along the length of the ventilation batten 400. For example, in some embodiments, the feet 407 are positioned at intervals of about every 3 inches, 6 inches, 9 inches, 12 inches, 15 inches, 18 inches, 21 inches, 24 inches or more. In some embodiments, the feet 407 are positioned at intervals of about 1 foot, about 2 feet, about 3 feet, about 4 feet, about 5 feet, about 6 feet, or more. Other spacing of the feet 407 is also possible.

Flow-through openings 409 can be positioned between each of the feet 407. As described further herein, the openings 409 can be configured to allow air and/or water to flow therethrough. The openings can have an open side as shown, to reduce the restriction of flow under the spacer 420B and through the batten 400. In FIG. 4B, an arrow illustrates example flow through the opening 409. The openings 409 may comprise a thickness T4 that defines the height of the openings 409. In some embodiments, the thickness T4 can be about 0.125, 0.25 inches, 0.5 inches, 0.75 inches, 1.0 inches, or 1.25 inches. In some embodiments, the thickness T4 can be selected to correspond with the thickness T2 that defines the opening 403, such that the sizes of the opening 403 and the opening 409 are similar. Other sizes for the opening 409 are also possible.

In some embodiments, the length of the ventilation batten 400 may be, for example, 3 feet, 6 feet, 9 feet, 12 feet, or more. The ventilation batten 400 can be cut to desired lengths when installed. In some embodiments, the ventilation batten 400 may comprise a length that corresponds with the length of the solar roof tile with which the ventilation batten 400 will be used. Other lengths for the ventilation batten 400 are possible.

Figure 4C:
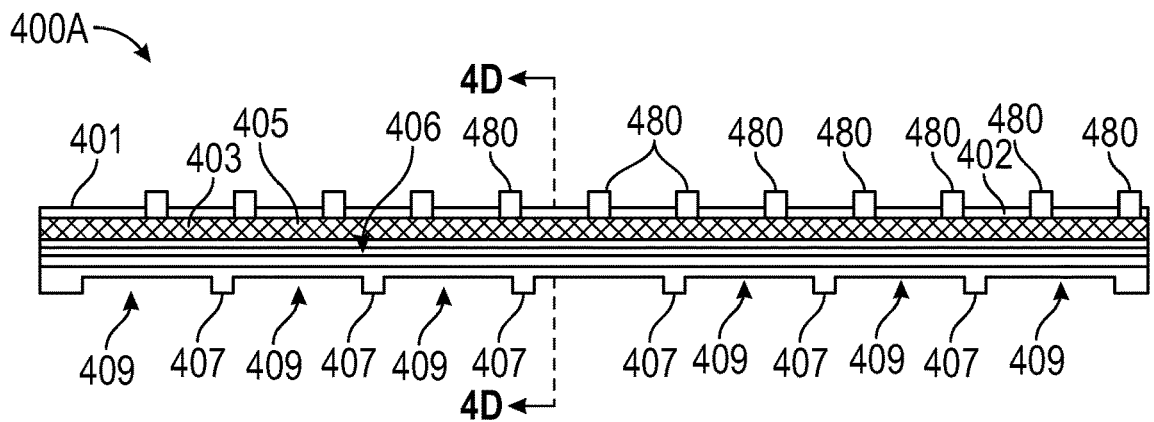
FIG. 4C illustrates a front view of an embodiment of a ventilation batten configured for use with solar roofs that include roof tiles with embedded solar panels having wind clips for securing a downslope edge of roofing elements.
Figure 4D:
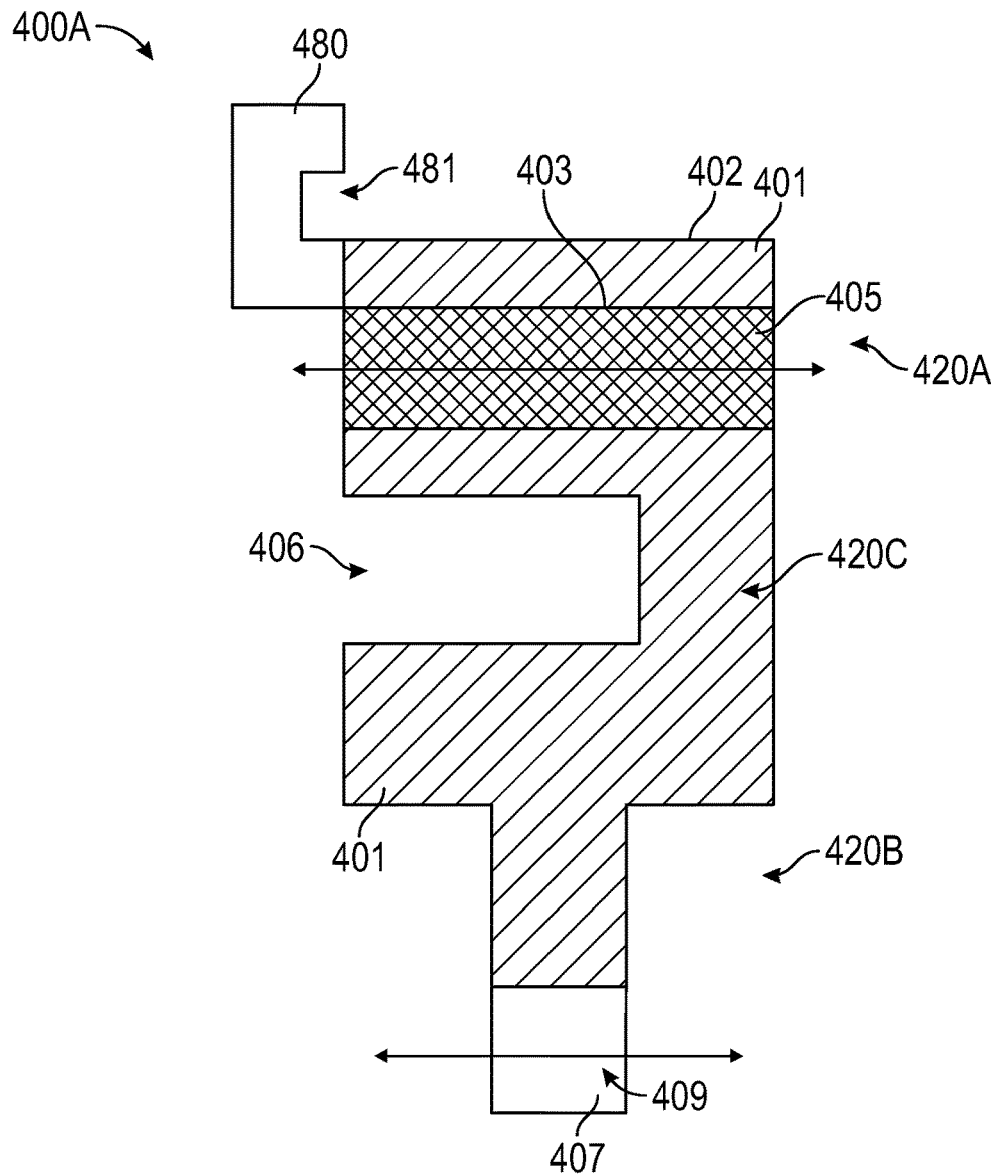
FIG. 4D is a cross-sectional side view of the ventilation batten of FIG. 4C.

FIGS. 4C and 4D illustrate another embodiment of the ventilation batten 400A. The ventilation batten 400A can be similar to the ventilation batter 400 described above with respect to FIGS. 4A and 4B. As shown in FIGS. 4C and 4D, the ventilation batten 400A also includes one more clips 480. The clips 480 can be configured to secure downslope edges of roofing elements, such as solar roof tiles, similar to the clips 380 described above with reference to FIGS. 3D and 3E.

Figure 4E:
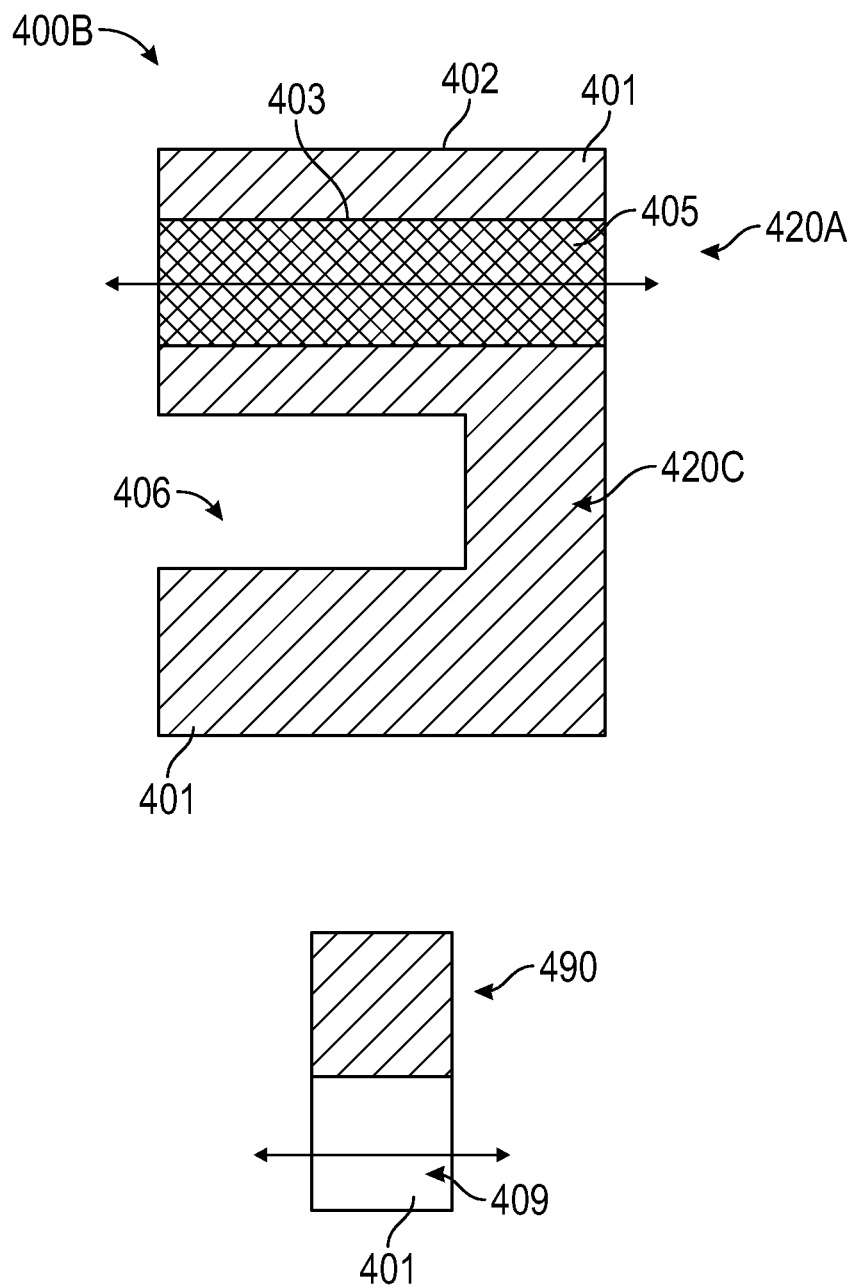
FIG. 4E illustrates another embodiment of a ventilation batten configured for use with solar roofs that include roof tiles with embedded solar panels. The ventilation batten can be configured to be installed with an existing or separate roof batten.

FIG. 4E illustrates another embodiment of a ventilation batten 400B. In many respects, the ventilation batten 400B can be similar to the ventilation batten 400 described above. However, in the illustrated embodiment, the ventilation batten 400B is configured to be installed with a separate batten 490, rather than having an integrated lower spacer 420B as described above. The separate batten 490 can be, for example, an existing roof batten. The batten 490 can be configured with feet 407 and openings 409 to provide flow therethrough. The flow may allow airflow (e.g., for ventilation) and/or water flow (e.g., for drainage). Thus, the batten 490 can be configured as a flow-through batten. In some respects, the batten 490 can be configured to provide the same functionality as the lower spacers 320B, 420B described above.

The ventilation batten 400B can be similar to the upper portion (e.g. the upper space 420A and support member 420C of the ventilation batten 400 described above. For example, the ventilation batten 400B can include a body 401 having an opening 403 (which can include a screen 405) and a recess 406 as described above. The opening 403 may advantageously provide ventilation, while the recess 406 is configured to receive an upslope edge of a roofing element, such as a solar tile.

Figure 5A:
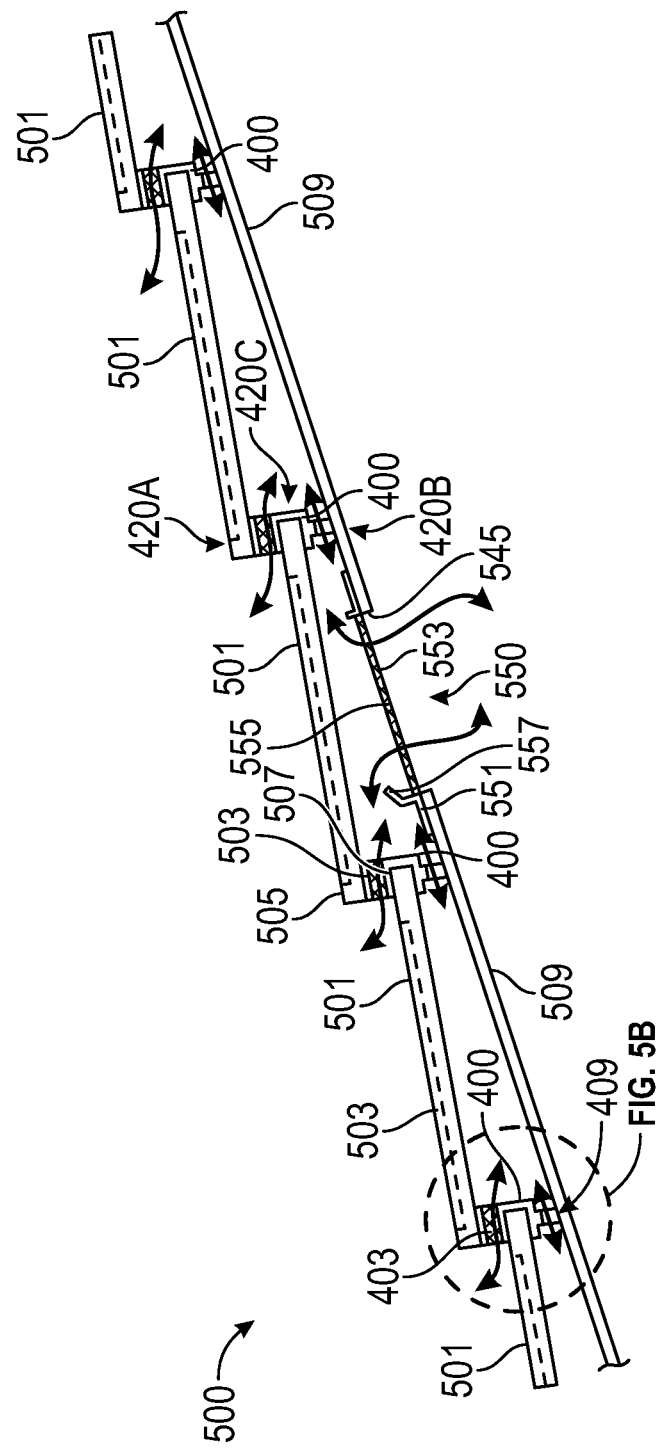
FIG. 5A illustrates a cross-sectional side view of an embodiment of a section of a solar roof that comprises solar tiles with embedded solar panels and a ventilation system that uses the ventilation battens of FIGS. 4A and 4B.

FIG. 5A illustrates a cross-sectional side view of an embodiment of a section of a solar roof 500 that comprises solar tiles 501 with embedded solar panels 503 and a ventilation system that uses the ventilation battens 400 of FIGS. 4A-4E. As illustrated, FIG. 5A shows the ventilation batten 400 of FIGS. 4A and 4B; however, the solar roof may similarly include the ventilation battens 400A, 400B of FIGS. 4C-4E. The example ventilation system can allow for building ventilation through the solar roof 500 and provide cooling and venting for the solar roof tiles 501 themselves. The solar roof 500 of FIG. 5A may be similar to and provide similar functionality as the solar roof 300 of FIGS. 3A-3C. For example, the solar roof 500 comprises a plurality of solar roof tiles 501 that include embedded solar panels 503 (illustrated with dashed lines). The solar roof tiles 501 of the solar roof 500 may be arranged in rows or courses 511 in a manner similar to non-solar roof tiles. Further, as illustrated, an upslope edge 507 of a lower course 511 of solar roof tiles 501 may be vertically adjacent to (e.g., overlapped by) a downslope edge 505 of an upper course 511 of solar roof tiles 501. This arrangement may advantageously shed water as discussed above.

As noted above, the solar roof 500 uses the ventilation battens 400 of FIGS. 4A and 4B to provide ventilation for the solar roof 500 and the solar roof tiles 501, similar to the upper and lower spacers 320A, 320B in FIG. 3C. In the illustrated embodiment, a ventilation batten 400 is positioned between each course 511 of solar roof tiles 501. The ventilation batten 400 supports the downslope edge 505 of an upper solar roof tile 501 and the upslope edge 507 of a lower solar roof tile 501. The ventilation batten 400 may thus serve to space the downslope edge 505 of each solar roof tile 501 above the upslope edge 507 of the corresponding vertically adjacent solar roof tile 501.

As illustrated, the opening 503 is positioned between the downslope edge 505 of each solar roof tile 501 and the upslope edge 507 of the corresponding overlapped solar roof tile 501 so as to allow airflow therethrough. Arrows in FIG. 5A illustrate example airflow through the openings 503. As illustrated, through the openings 503, air can flow from a region above the solar roof tiles 501 to a region below the solar roof tiles 501. Such airflow, which allows air to flow above and below the solar roof tiles 501 may serve to vent or cool the solar roof tiles 501 such that the decreases in efficiency of the embedded solar panels 501 can be reduced or eliminated.

Figure 5B:
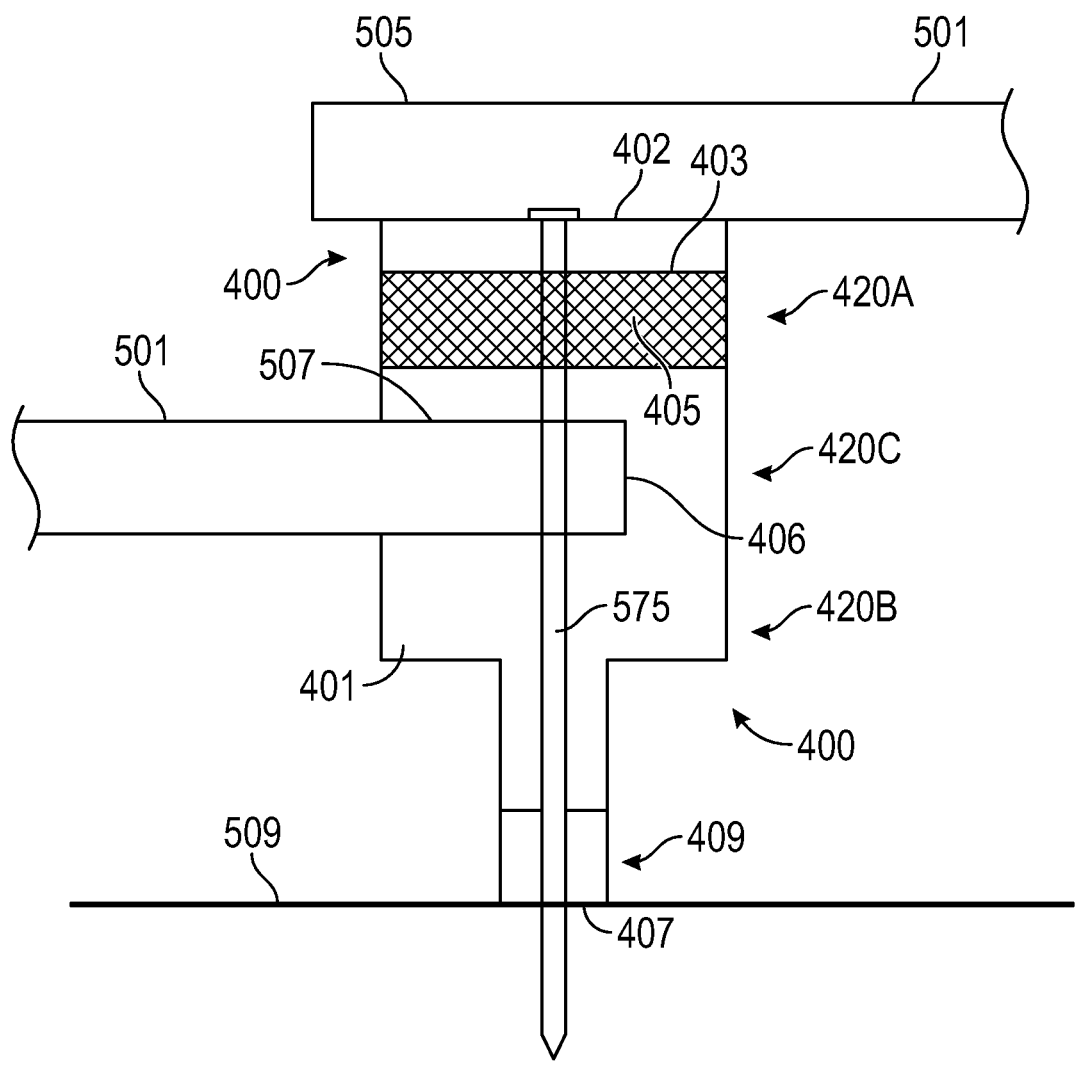
FIG. 5B is a detail view that illustrates example installation of one of the ventilation battens of FIG. 5A.

Further, as illustrated in FIG. 5B, the ventilation batten 400 further elevates downslope and upslope edges of the solar roof tiles 501 to provide additional ventilation. Specifically, the feet 407 space the solar roof tiles 501 above the roof deck creating additional space in the region below the solar roof tiles 501 and above the roof deck 509. The additional space created by the feet 407 also allows for airflow between the spaces below each course 511 of solar roof tiles 501 (similar to the function of the lower spacers 320B described above with reference to FIG. 3C). The openings 409 between the feet 407 can allow flow of air and water therethrough. In FIG. 5B, arrows illustrate example flow through the openings 409. As shown, the openings 409 can be positioned directly on the surface of the roof deck 309 (or one or more intermediate structures, such as a waterproof roofing membrane). These openings 509 can allow air to pass therethrough (for ventilation) but can also allow water to flow therethrough (for drainage).

FIG. 5A further illustrates that, in some embodiments, the solar roof 500 can include one or more primary vents 550. The primary vents 550 can be similar to the primary vents 350 described above with reference to FIGS. 3B and 3C. Example primary vents are also described below with reference to FIGS. 6A-6C. As previously described, the primary vents 550 are configured to allow ventilation through an opening 545 in the roof deck 509 between a region below the roof deck 509 and a region above the roof deck 509. The primary vents 550 can include a subflashing body 551, an opening 553, which may include a screen or mesh 555, and a baffle 557 similar to features previously described. Different numbers of primary vents 550 can be used in different embodiments of the solar roof 500 as described above.

As shown in FIG. 5A and described above, ventilation batten 400 can provide support for two corresponding adjacent roof elements. For example, recess 406 can receive and support the upslope edge of a lower solar roof tile, such that batten 400 provides overall improved support and stability between two vertically adjacent roofing elements and a roof deck. Batten 400 can also provide ease of installation of two vertically adjacent roofing elements onto a roof deck, as follows.

FIG. 5B is a detail view that illustrates example installation of one of the ventilation battens 400 of FIG. 5A. As shown, an upslope edge 507 of a lower solar roof tile 501 is received within the recess 406 of the ventilation batten 400. This positions the lower solar roof tile 501 above the roof deck 509 to create or enlarge the space between the lower solar roof tile 501 and the roof deck 509. A downslope edge 505 of an upper solar roof tile 501 is positioned on top of the body 401 of the ventilation batter 400. In particular, in the illustrated example, the downslope edge 505 of the upper solar roof tile 501 is positioned on the upper surface 402 of the body 401 of the ventilation batten 400. This spaces the upper solar roof tile 501 above the lower solar roof tile 501 and positions the opening 403 of the ventilation batten 400 between the upper solar roof tile 501 above the lower solar roof tile 501 to allow ventilation therebetween as described above. The foot 407 of ventilation batten 400 is positioned on the roof deck 509.

In some embodiments, a fastener 575 can be used to secure the components. For example, the fastener 575 extends through the ventilation batten 400 and into the roof deck 509. Further, in some embodiments, the fastener 575 extends through the upslope edge 507 of the lower solar roof tile 501 that is positioned within the recess 406 of the ventilation batten 400. Thus, the fastener 575 can be used to secure the lower solar roof tile 501 to the ventilation batten 400. In some embodiments, the fastener 575 can be a roofing nail, although other types of fasteners can also be used.

FIG. 6A is an isometric view illustrating an embodiment of a primary vent 600 configured to be installed in and provide ventilation through a roof deck. In the illustrated embodiment, the primary vent 600 includes a subflashing body 651. The subflashing body 651 can comprise a flat sheet configured to be mounted to the roof deck. An opening 653 can be formed in the subflashing body 651. When the primary vent 600 is installed on the roof deck, the opening 653 can be aligned with an opening through the roof deck. Thus, the opening 653 allows ventilation through the roof deck. The opening 653 may be covered with a screen 655 or mesh. The screen 655 can be configured to prevent debris and embers from passing through the opening, as described above. As illustrated, a baffle 657 can surround the opening 653. The baffle 657 can be configured to prevent water or other debris from entering the opening 653.

FIGS. 6B and 6C show two different embodiments of the primary vent 600. As shown in FIG. 6B, the baffle 657 on one side of the opening 653 includes an angled flange 659 that extends partially over the opening 653. In some embodiments, the angled flange 659 can be positioned on the downslope side of the opening 657 (see, for example, FIGS. 3C and 5A). The primary vent 600 of FIG. 6C includes a baffle 657 that is of uniform height.

Figure 7:
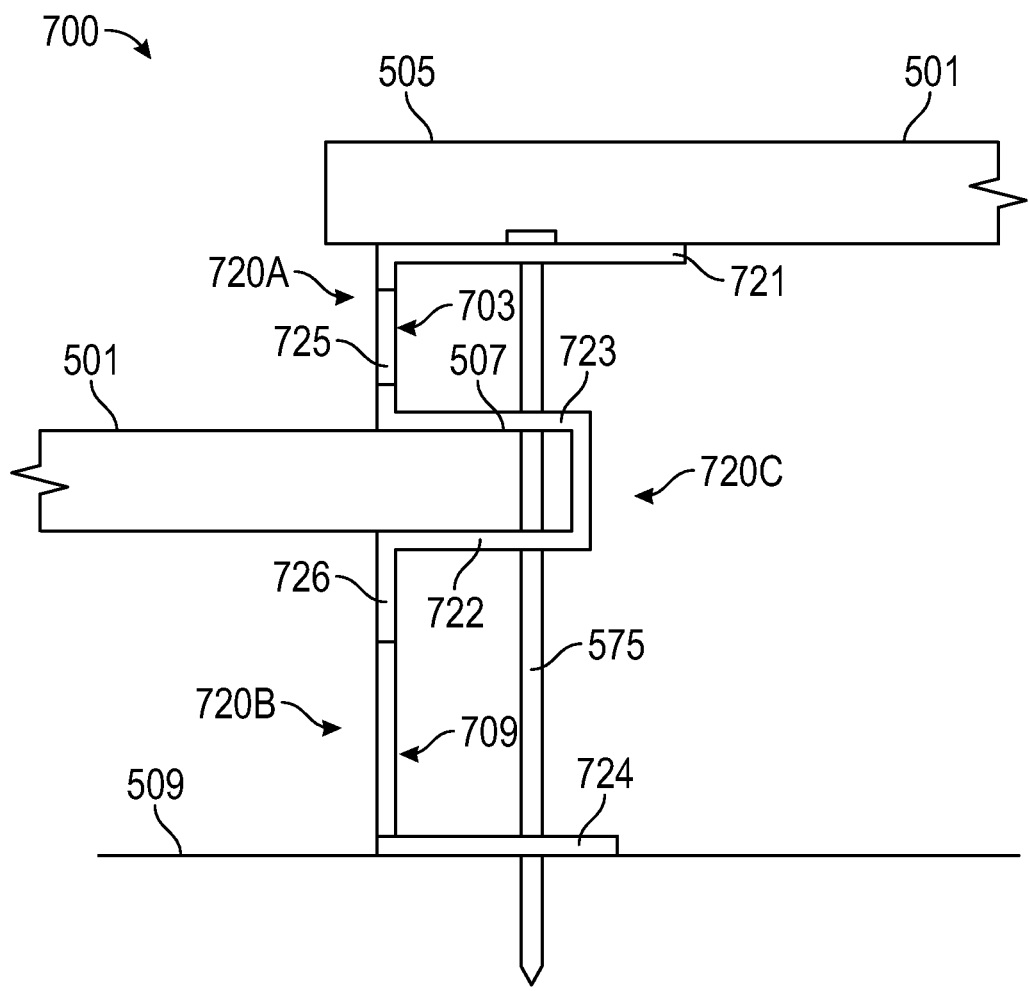
FIG. 7 is a cross-sectional side view of a ventilation batten.

FIG. 7 is a cross-sectional side view of a batten 700, installed between two vertically adjacent roof elements. Batten 700 can include an upper spacer 720A (with an opening 703), lower spacer 720B (with an opening 709), and a support member 720C that form a recess 706, any or all of which can be similar to spacer 420A, opening 403, spacer 420B, opening 409, support member 420C, and recess 406, described with reference to FIG. 4A-5B.

The upper spacer 720A can include an upper leg 721 and a lower leg 723, with a middle leg 725 extending therebetween. The middle leg 725 of the upper spacer 720A can extend between a first end of each of the upper and lower legs 721, 723. The opening 703 can extend through the middle leg 725.

The lower spacer 720B can include an upper leg 722 and a lower leg 724, with a middle leg 726 extending therebetween. The middle leg 726 of the lower spacer 720B can extend between a first end of each of the upper and lower legs 722, 724. The opening 709 can extend through the middle leg 726.

The support member 720C can extend between an opposing end of each of the lower leg 723 of the upper spacer 720A and the upper leg 722 of the lower spacer 720B, to form the recess 706. In some embodiments, the batten 700 can comprise a generally thinner material, such as sheet metal. In some embodiments, the batten 700 can comprise a single integral piece of material. Batten 700 can be configured such that the recess 706 is biased against a roofing element, when a roofing element is received within the recess 706.

As discussed above, the systems described above provide ventilation for solar roofs. In some embodiments, the systems may be configured to provide increases ventilation when compared to ventilation systems for non-solar roofs. For example, many building codes specify a ratio of 300:1 or 150:1 for square feet of roof to square feet of ventilation. The ventilations systems for solar roofs described above, may provide even more ventilation. for example, in some embodiments, the systems can be employed with a ratio of less than 150:1, such as 125:1, 100:1, 75:1, or 50:1. This additional ventilation may facilitate cooling of a solar roof that comprises solar roof tiles.

FIGS. 8A-8H show embodiments of solar roofs that includes at least one solar roof tile with various combinations of other roofing elements.

Figure 8A:
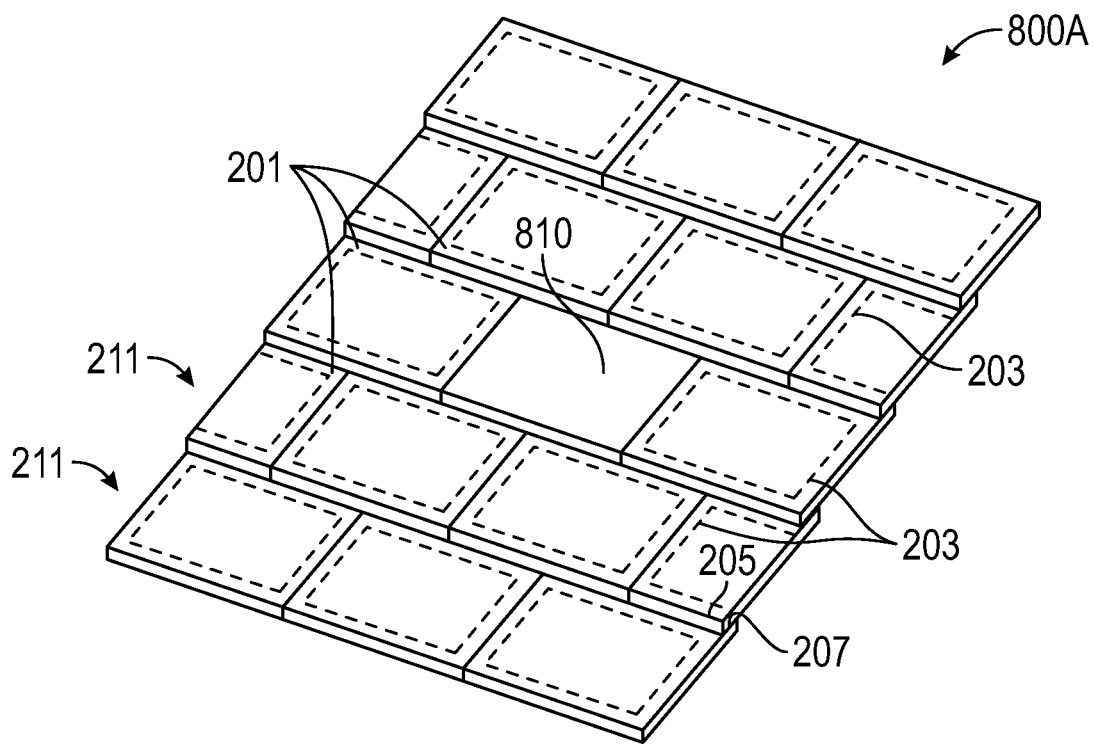
Figure 8B:
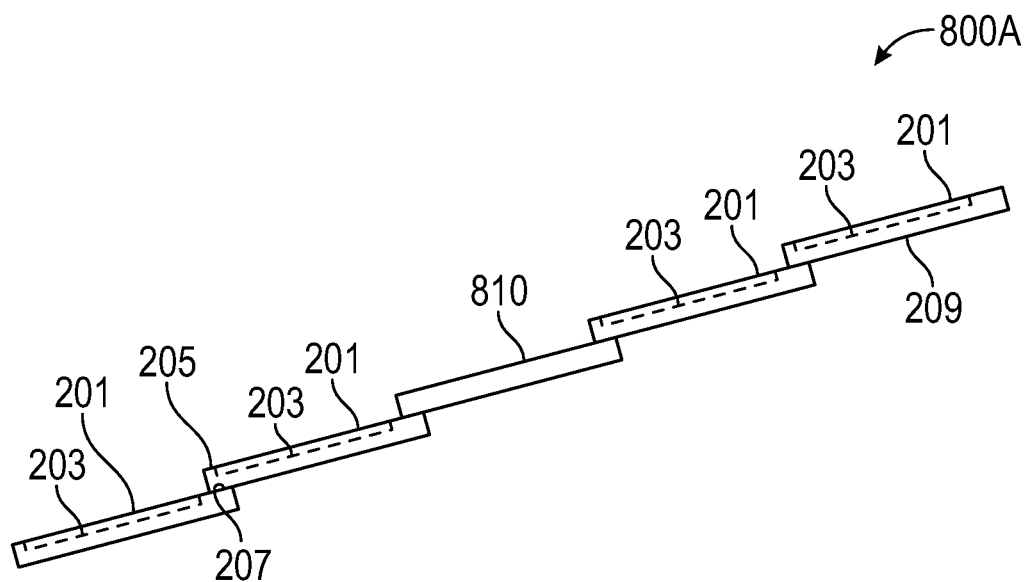

FIGS. 8A-8B show a solar roof 800A that includes at least one solar roof tile 201 with embedded solar panels 203, that is vertically adjacent to at least one other roofing element 810, wherein roofing element 810 is not a solar roof tile. Roofing element 810 can comprise a standard tile (flat as shown, or curved, not shown), shingle, roof vent, etc.

Figure 8C:
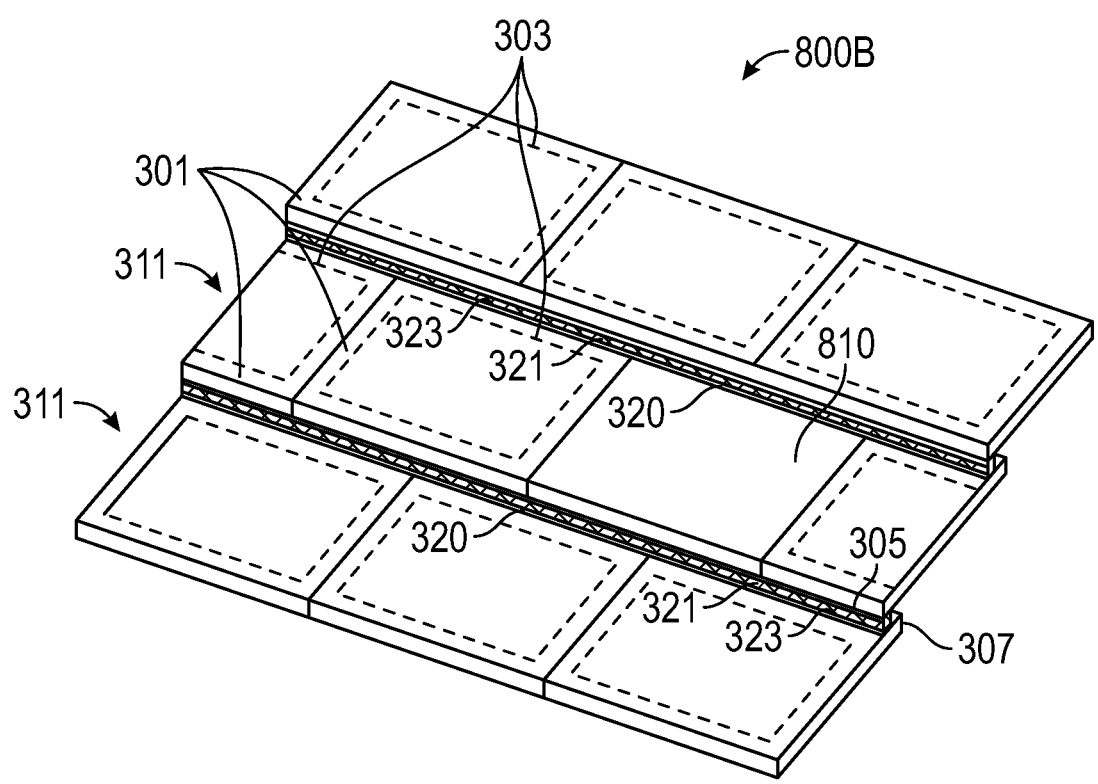

FIGS. 8C-8E shown a solar roof 800B, which is similar to that of 800A, but which further includes embodiments of the ventilation spacers described herein, for example, with respect to FIGS. 3A-3C. Roof 800B can be modified to include the battens described herein, for example, with respect to FIGS. 4A-7.

Figure 8F:
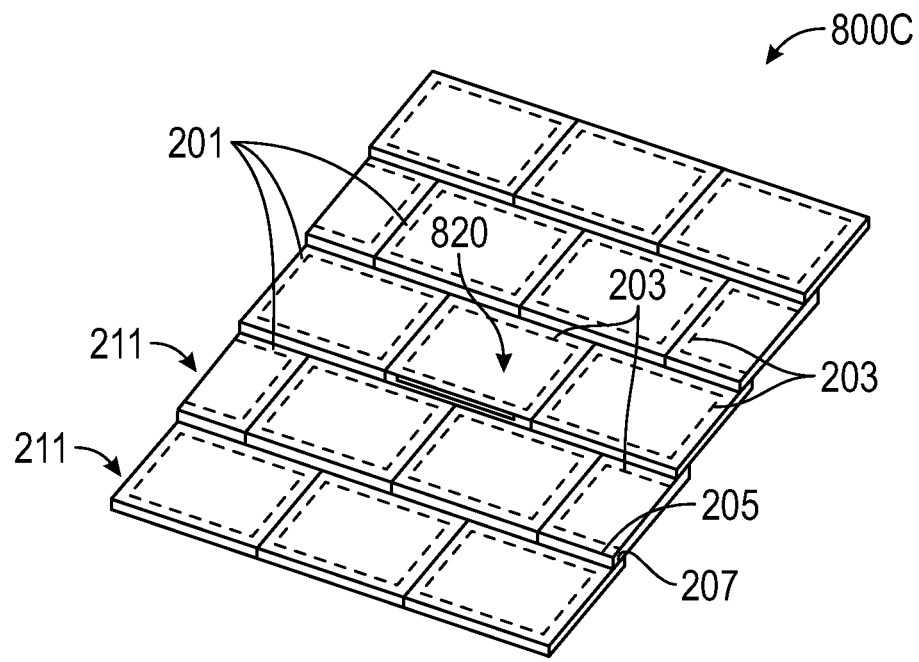
Figure 8G:
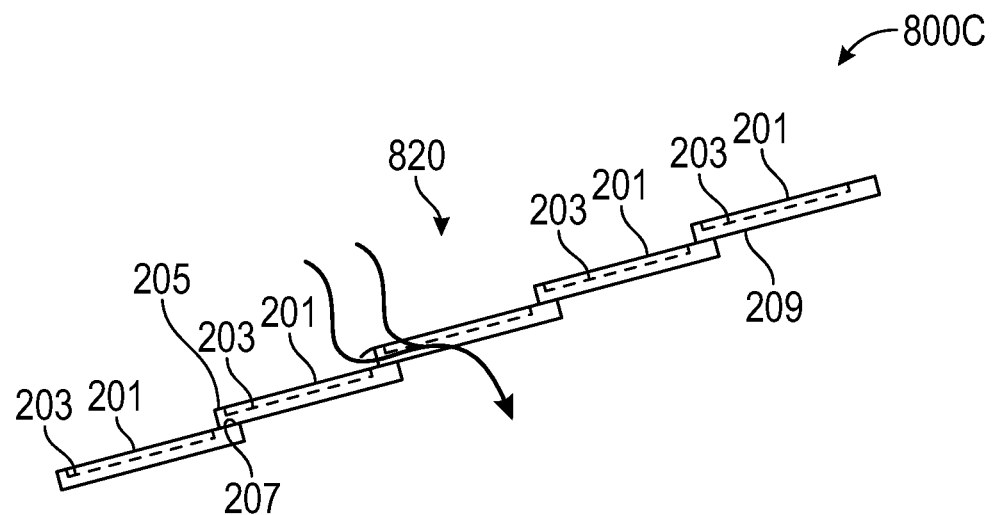

FIGS. 8F-8G shown a solar roof 800C, which is similar to that of 800A and 800B. Here, the roof 800C can comprise a roofing element that comprises a roof vent with an embedded solar panel 203 in its upper facing surface, to form a solar roof vent 820. The solar roof vent 820 can comprise any of a different number of different vent types and configurations. The roof vent 820 can comprise a flat vent as shown. One or more roof vents 820 can replace one or more corresponding roofing elements and/or solar roof tiles described herein, such as roofing elements 810 or solar roof tiles 201 (FIGS. 8A-8E).

Figure 8H:
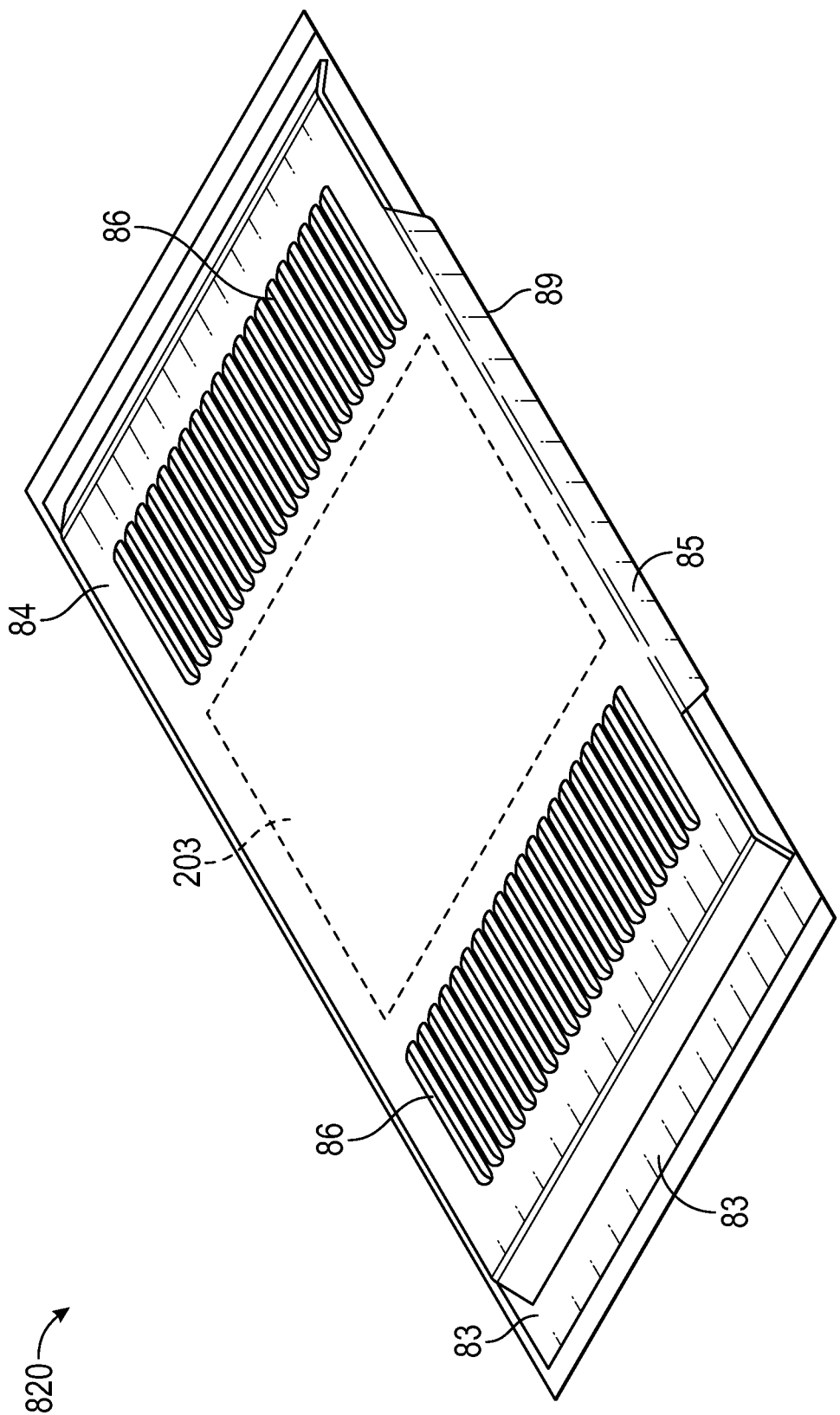

A variety of different types of flat tile vents can be employed. For example, the tile vent may be substantially as shown and described in U.S. patent application Ser. Nos. 16/229,633 and 14/515,938, and U.S. Pat. No. 6,129,628, or 9,394,693, incorporated herein by reference in their entireties. With reference to FIG. 8H, the flat vent 820 can comprise a lower substantially flat base 83 and a substantially flat cover member 84. Cover member 84 can included an embedded solar panel 203. The base 83 has an opening 88 in fluid communication with an aperture (not shown) in the roof deck. The cover member can have one or more openings 86, such as louvers as shown. In some embodiments, the cover member does not have louvers (FIGS. 8F and 8G). In use, attic air travels through the roof deck aperture, the base opening 88, and through the openings 86 and/or through a front opening 89 between the base 83 and a front edge or flange 85 of the cover member 84. The vent 82 is preferably configured to blend in with and mimic the appearance of any corresponding surrounding roof elements, such as solar roof tiles 201.

It will be understood that the solar roof vent 820 shown in FIGS. 8F-8H can be implemented within similar embodiments as described herein with FIGS. 8C-8E, to include embodiments of the ventilation spacers and battens. The solar roof vent 820 can be implemented in combination with a primary vent, as described herein. Additionally, the embodiments described herein with solar roof vent 820 can be employed with other types of roof vents, such as an S-shaped vent, M-shaped vent, or a tapered vent, as described, for example, in U.S. patent application Ser. No. 16/229,633, and U.S. Pat. No. 6,129,628, or 9,394,693. The solar roof vent 820 can comprise an active vent (e.g., include a fan), such as that described in U.S. patent application Ser. No. 14/515,938, or can comprise a passive vent. In some embodiments, a vent with a separately mounted solar panel on it (e.g., without an embedded solar panel) can be implemented within the other embodiments described herein.

Figure 9A:
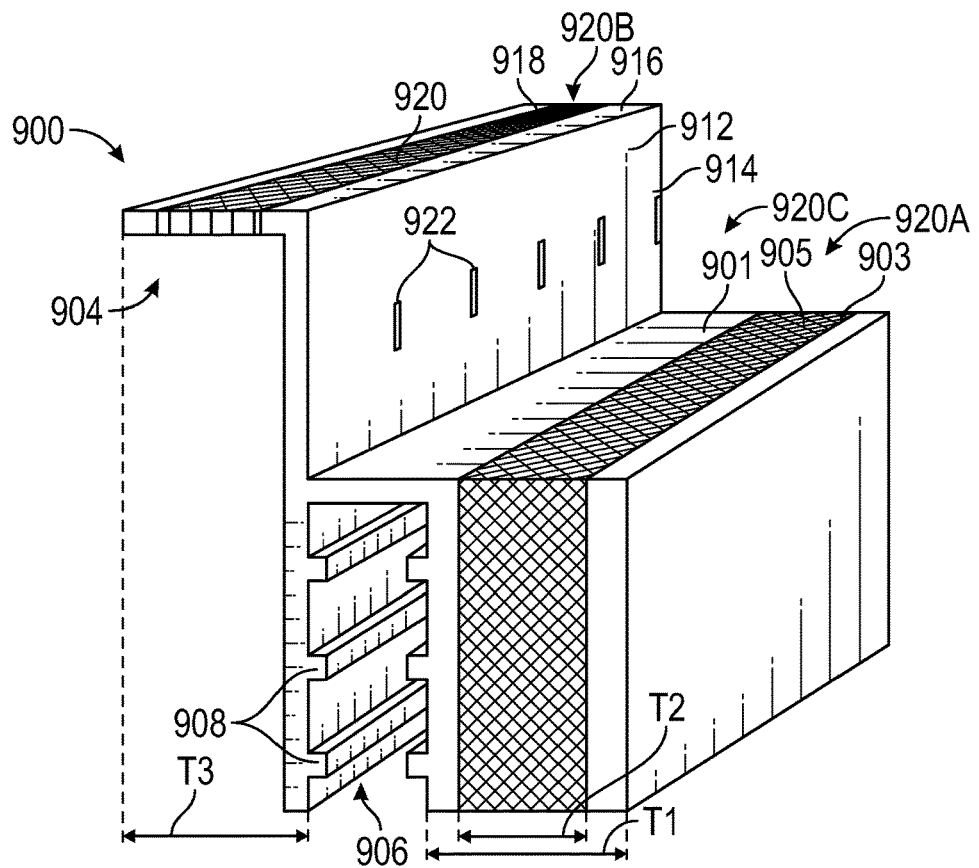
FIG. 9A is a perspective view of an embodiment of a batten bracket configured for use with solar roofs that include roof tiles with embedded solar panels. The batten bracket is configured to provide ventilation therethrough.

FIG. 9A is a perspective view of an embodiment of a batten bracket 900 configured for use with solar roofs that include roof tiles with embedded solar panels. The batten bracket is configured to provide ventilation therethrough. In some respects, the batten bracket 900 is similar to the spacers 300 and ventilation brackets 500 described above. The batten bracket 900 can advantageously provide ventilation through non-ventilating batten brackets, such as batten bracket 20 described in U.S. application Ser. No. 15/653,493.

As shown in FIG. 9A, the batten bracket 900 comprises a body 901. The body 901 may comprise a unitary construction or multiple separate components that can be fastened together. In the illustrated embodiment, the body 901 comprises three portions, including an upper spacer 920A, a lower spacer 920B, and a support member 920C. In some respects, the upper spacer 920A, the lower spacer 920B, and the support member 920C may be configured similarly to corresponding portions 420A, 420B, and 420C described above.

Figure 10:
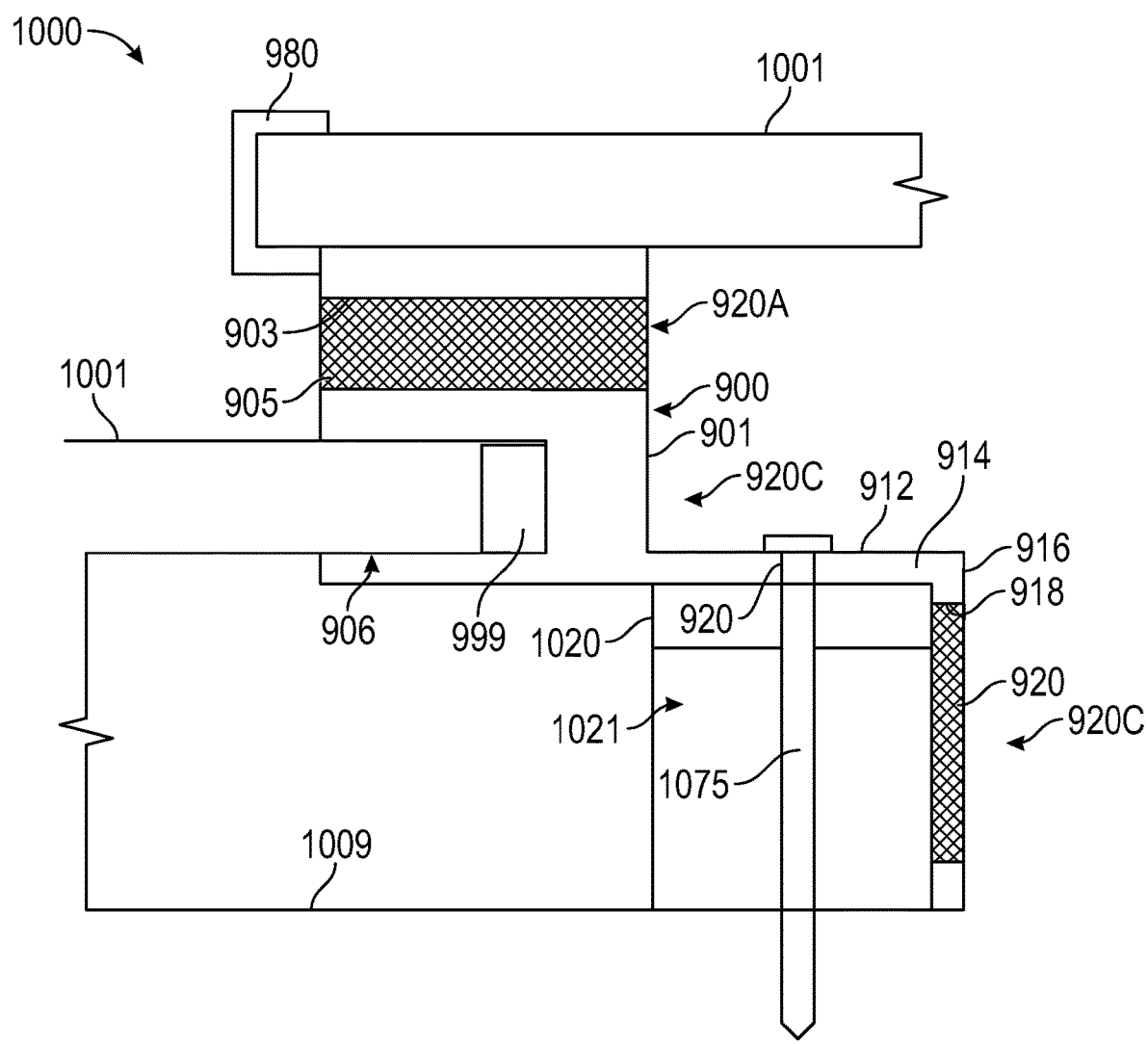
FIG. 10 is a cross-sectional view of a section of a solar roof including the batten bracket of FIG. 9A and illustrates a ventilation system thereof.

In the illustrated embodiment, the upper portion 920A of the batten bracket 900 comprises an opening 903 formed therethrough. The opening may be configured to allow airflow through the upper portion 920A of the batten bracket 900. As shown in FIG. 10, when installed on a solar roof, the opening 903 may allow airflow between individual solar roof tiles 1001. This airflow may cool the solar roof tiles 1001, improving the efficiency thereof. In some embodiments, the airflow may continue through the roof deck to facilitate ventilation of the building on which the solar roof is installed. As shown in FIG. 9A, in some embodiments, the opening 903 may be configured with a mesh or screen 905, which can be similar to the mesh or screen 405 described above.

The lower spacer 920B of the batten bracket 900 may comprise a flange 912 as illustrated. The flange 912 may be configured to be installed over a roof batten as shown, for example, in FIG. 10. In the illustrated embodiment, the flange 912 comprises a first extension portion 914 and a second extension portion 916. The first extension portion may extend in a first direction from the upper spacer 920A and the support member 920C. The first direction may be a direction that is substantially aligned with the upslope/downslope direction of the roof when the batten bracket 900 is installed. Stated another way, in some embodiments, the first extension portion 914 extends over the top of the roof batten when installed (see FIG. 10).

As shown in FIG. 9A, the first extension portion 914 can include one or more mounting holes 922. The mounting holes 922 can be configured to receive fasteners (such as roofing nails, for example) to install the batten bracket 900. In some embodiments, the fasteners extend through the first extension portion 914 of the flange 912 of the batten bracket 900, through the roof batten, and into the roof deck/rafters to secure the batten bracket 900 to the roof. As shown in the illustrated embodiment, the lower spacer 920B cah be configured such that it is offset with respect to the upper spacer 920A and the support member 920C. This can allow the upper surface of the first extension portion 914 to be exposed such that the mounting holes 922 can be accessed without needing to extend through the upper spacer 920A or the support member 920C. As the solar roof tiles can be received within the groove 906 of the support member 920B, this offset can advantageously allow the batten bracket 900 to be secured to the roof without the requiring the fastener to extend through the solar roof tile (see FIG. 10).

In some embodiments, the first extension portion 914 can be mounted onto an upper surface of a batten as described above, without including the second extension portion 916. In other embodiments, the flange 912 can include the second extension portion 916, which can extend in a second direction from the distal end of the first extension portion 914. The second direction can be, for example, a direction that is substantially perpendicular to the plane of the roof deck when the batten bracket is installed. The second extension portion 916 can extend from the first extension portion 914 at a substantially 90 degree angle, although other angles are possible. The first extension portion 914 and the second extension portion 916 partially define a space 904 that can be configured to receive (e.g., be installed over) the roof batten. When installed over the batten, the second extension portion 916 can contact an upslope side of the batten, to provide stability and ease of installation.

In some embodiments, the roof batten can be a flow-through batten (see FIG. 10). Such a batten can allow air and/or water to flow therethrough for ventilation and/or drainage. As the second extension portion 916 can be installed over the upslope edge of the batten, the second extension portion 914 can include one or more openings 918 formed therethrough. The one or more openings 918 can allow air and/or water to flow therethrough, such that flow through the batten can be maintained, even when the batten bracket 900 is installed. The one or more openings 918 can be configured with a mesh or screen 920, which can be similar to the mesh or screens previously described.

The support member 920C of the batten bracket 900 can be positioned between the upper spacer 920A and the lower spacer 920B. The support member 920C can be configured to support a portion of one or more roof cover elements, such as solar roof tiles, roof tiles, vents, etc. In the illustrated embodiment, the support member 920C includes a recess 906. The recess 906 can be configured similarly to the recess 406 described above. For example, the recess 406 can be configured to receive and support an upslope edge of a roof cover element. In some embodiments, the recess 906 may also be configured to receive one or more connectors, such as the connectors 20 described in U.S. patent application Ser. No. 15/653,493. The connectors can be configured to provide, for example, electrical connections between horizontally adjacent solar roof tiles. The connectors can also be configured to secure the solar roof tiles into the recess 906. For example, the recess 906 can include coupling features, such as ridges 908 that engage and retain the connector within the recess 906. The connector can in turn comprise coupling features that engage and retain the solar roof tiles. In some embodiments, the connector can be omitted, and the coupling features can be directly integrated within the recess 906. For example, the recess 906 can include coupling features that engage and retain the solar roof tiles.

The batten bracket 900 can include dimensions $T_1$, $T_2$, and $T_3$ as shown. These dimensions can be similar to the dimensions previously described.

Figure 9B:
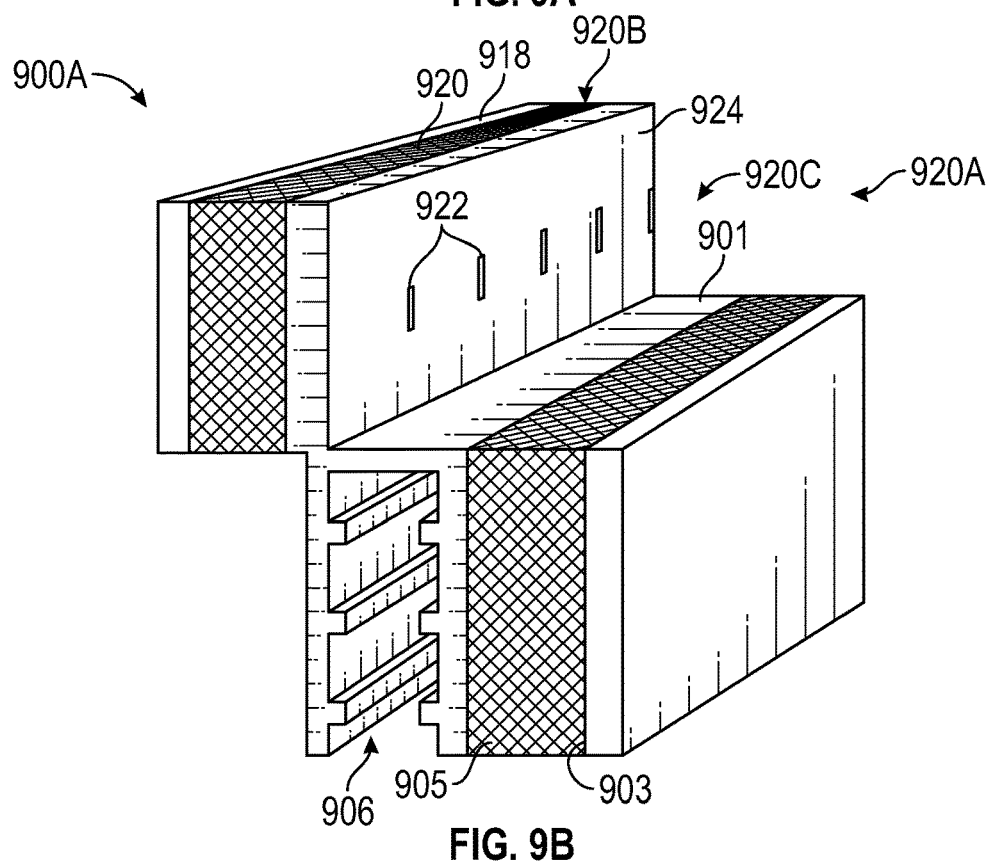
FIG. 9B is another embodiment of the batten bracket of FIG. 9A that includes an integrated batten having a screened opening.

FIG. 9B is another embodiment of the batten bracket 900A of FIG. 9A that includes an integrated batten 924. This embodiment can be similar to the batten bracket 900 of FIG. 9A, except that, in place of flange 912 (that is configured to be installed over a roof batten), the batten bracket 900A of FIG. 9A includes an integrated batten 924. Thus, the batten bracket 900 can be installed without a separate roof batten. In the illustrated embodiment, the integrated batten 924 includes an opening 918 formed therethrough. The opening 918 can be configured for air and/or water flow to allow for ventilation and/or drainage. The opening 918 may be configured with a screen as previously described.

As shown in FIG. 9B, the integrated batten 924 can be offset with respect to the upper spacer 920A and the support member 920C, similar to the offset of the flange 912 of the batten bracket of FIG. 9A. As illustrated, this allows for mounting holes 922 to be positioned on an upper surface of the integrated batten 924 so that fasteners can be inserted therethrough without extending through the upper spacer 920A and support member 920B.

Figure 9C:
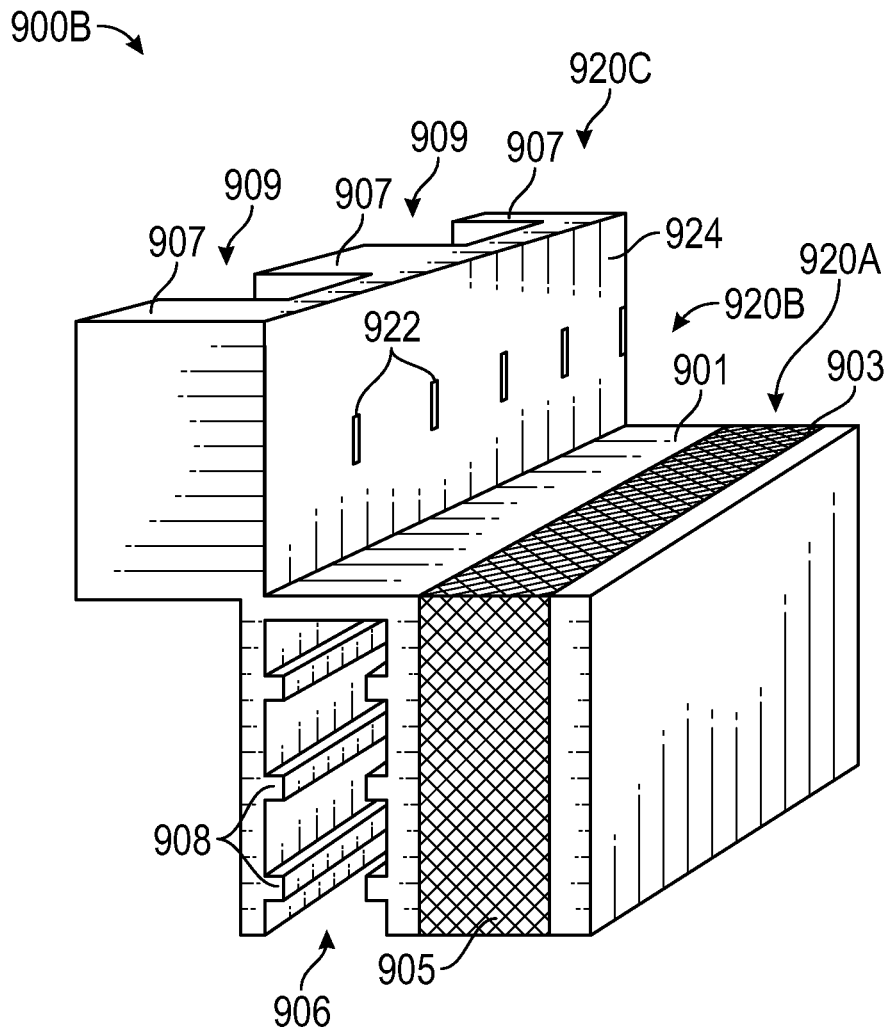
FIG. 9C is another embodiment of the batten bracket of FIG. 9A that includes an integrated flow through batten.

FIG. 9C is another embodiment of the batten bracket 900B that includes an integrated flow through batten 924. The batten bracket 900B includes features similar to those of the batten bracket 900A, described above. For example, the batten bracket 900B includes an integrated batten 924, which can be offset as described above. In the illustrated embodiment, the integrated batten 924 includes a plurality of feet 907 with openings 909 positioned in between. The feet 907 can contact the roof deck when the batten bracket 900B is installed, while the openings 909 can be configured to allow for flow of air and or water. The feet 907 and the openings 909 can be similar to the feet 407 and openings 409 described above.

Any of the batten brackets 900 can include clips similar to those previously described.

FIG. 10 is a cross-sectional view of a section of a solar roof 1000 including the batten bracket 900 of FIG. 9A and illustrates a ventilation system thereof. As illustrated, the flange 912 is installed over a batten 1020. A fastener 1075 extends through the flange 912 and the batten 1020 and into the roof deck 1009 to secure the ventilation batten 900. Because the flange 912 is offset from the remainder of the batten bracket 900, the fastener need not extend through the other portions of the batten bracket 900 or any of the solar roof tiles 1001. As illustrated the batten 1020 includes an opening 1021 to allow flow therethrough. The opening 1021 is aligned with the opening 918 of the second extension portion 916 of the flange 914 such that flow can continue through both the batten 1020 and the batten bracket 900.

A downslope solar roof tile 1001 is received partially within the recess 906 of the batten bracket 900. Optionally, a connector 999 can be used to secure the upslope edge of the solar roof tile 1001 within the recess. The connector 999 can be similar to the connector 20 described in U.S. patent application Ser. No. 15/653,493. The upper spacer 920A spaces an upslope solar roof tile 1001 above the downslope solar roof tile 1001 and the opening 903 allows ventilation between the two tiles. A clip 980 can be included to secure the downslope edge of the upslope solar roof tile 1001.

Although FIG. 10 illustrate the batten bracket 900, similar systems may include the bracket 900A (FIG. 9B) and/or the bracket 900B (FIG. 9C).

Figure 11A:
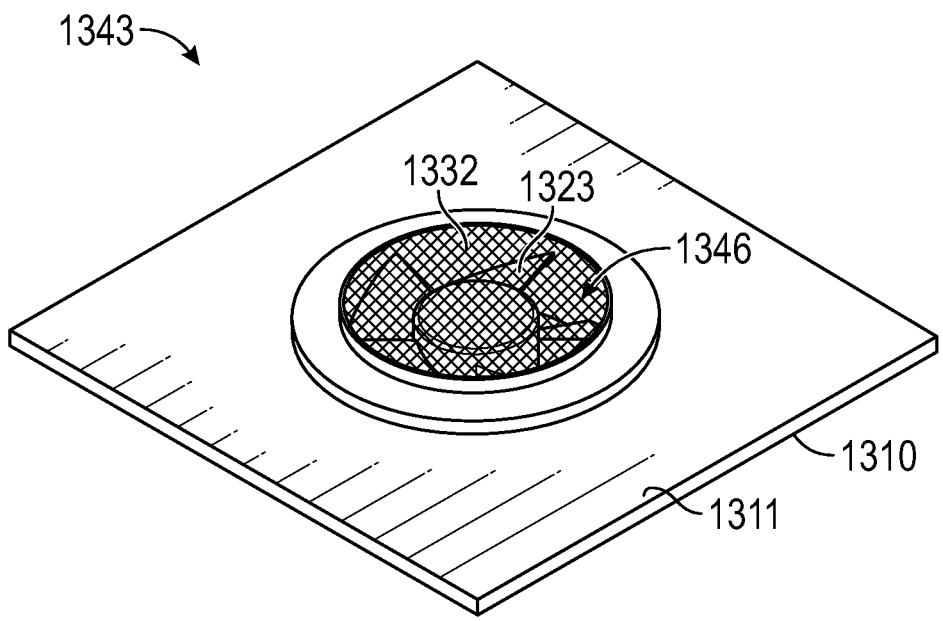
FIG. 11A is a top perspective view of an embodiment of a roof vent member.
Figure 11B:
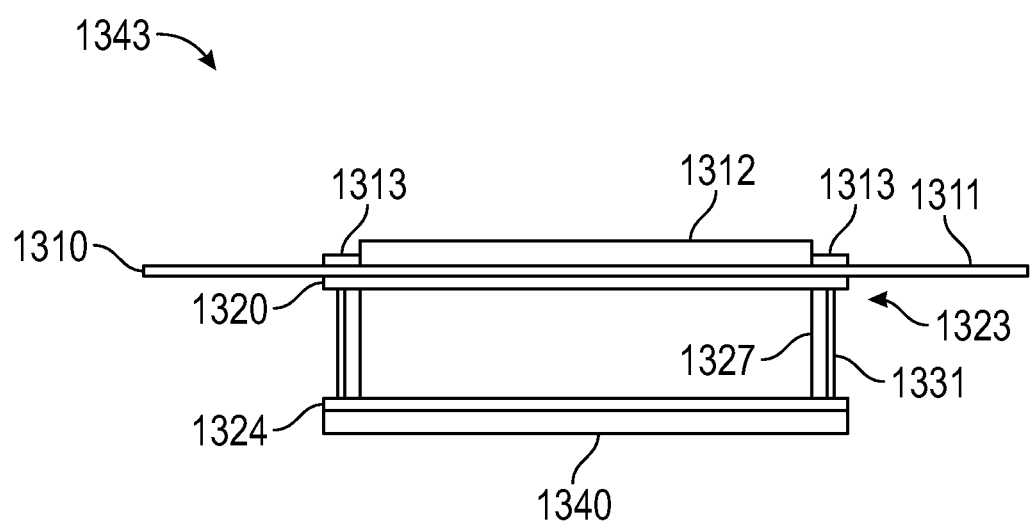
FIG. 11B is a side view of the roof vent member of FIG. 11A.
Figure 11C:
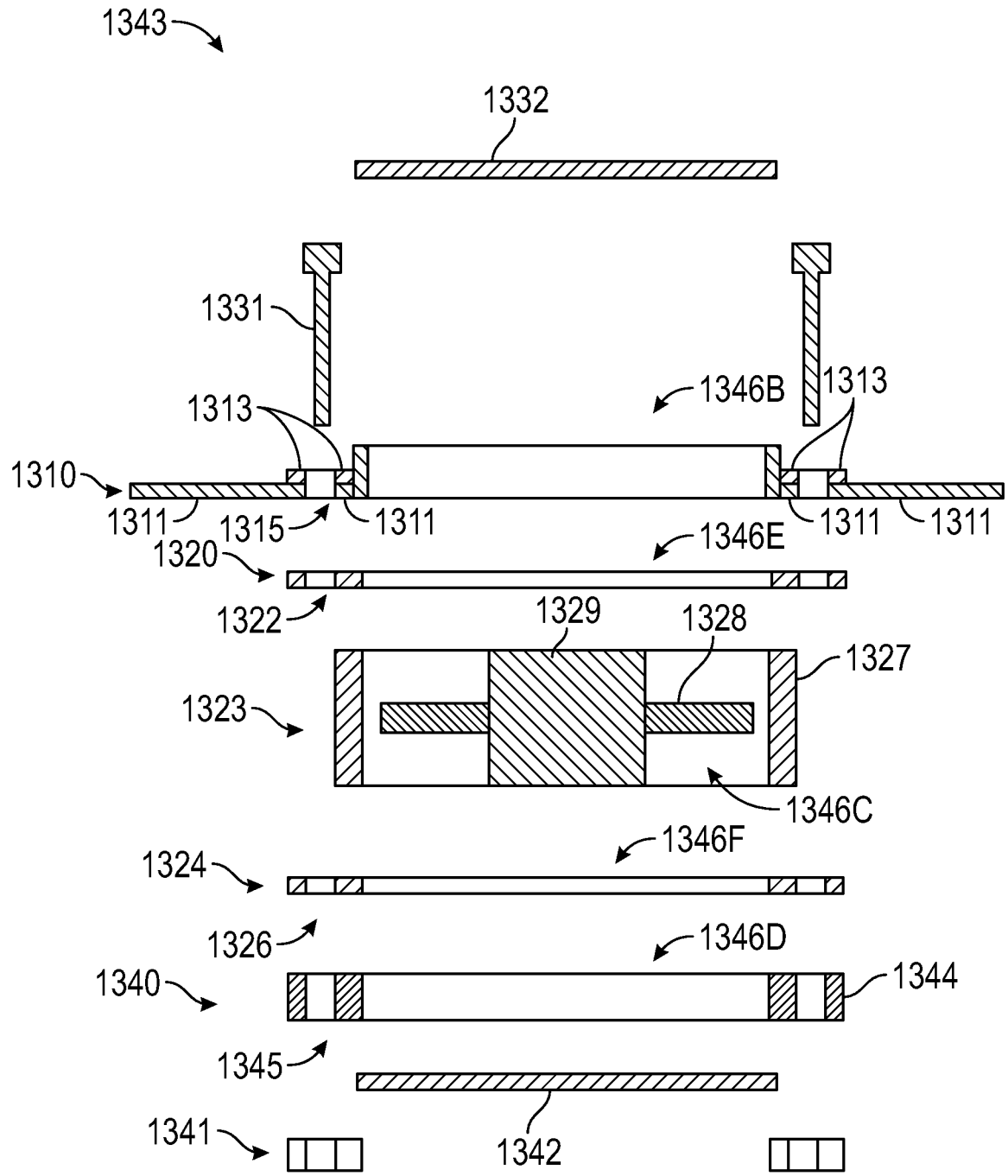
FIG. 11C is a cross-sectional exploded view of the roof vent member of FIG. 11A.
Figure 11D:
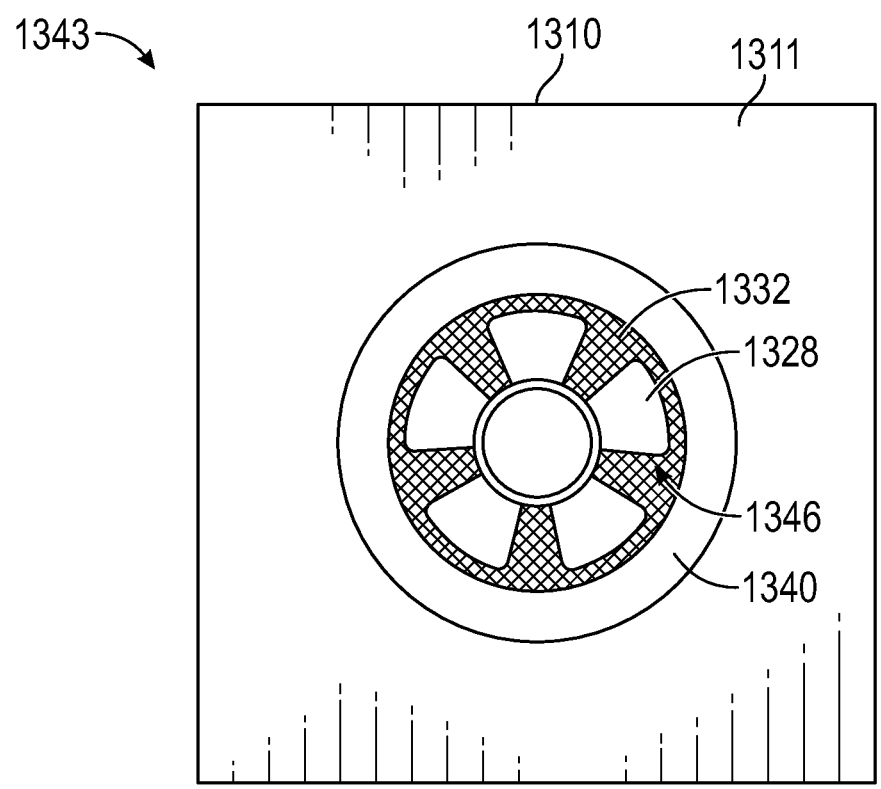
FIG. 11D is a bottom view of the roof vent member of FIG. 11D.

FIG. 11A is a top perspective view of an embodiment of a roof vent member 1343. Roof vent member 1343 can be implement as a "primary vent" or "primary vent member" with the solar roof ventilation embodiments described herein, such as primary vent 350 (e.g., FIG. 3B, 3C), or other embodiments. FIG. 11B is a side view of the roof vent member 1343. FIG. 11C is a side cross-sectional exploded view of the roof vent member 1343 installed with a roof deck. FIG. 11D is a bottom view of the roof vent member 1343.

Referring to FIGS. 11A-11D, the roof vent member 1343 can include a channel 1346 (FIG. 11A) formed from one or more openings extending through its various components, to allow airflow through the corresponding roof deck aperture.

The roof vent member 1343 can include a subflashing 1310 configured to be installed on the surface of a roof deck. The subflashing 1310 can include a body 1311 that may have side members, such as flanges, extending out from an opening 1346B extending through the subflashing body 1311. The subflashing 1310 may be coupled with the upper surface of the roof deck 14 around the roof deck opening, to allow ventilation through the roof deck opening. The subflashing 1310 can include a lip 1312 (shown in FIG. 11C) extending upwardly from and around the opening 1346B, to prevent debris and/or water from flowing down the roof deck and into the opening 1346B. The lip 1312 may be coupled with and project generally upward from the subflashing body 1311. In some embodiments, the lip 1312 can be coupled with a plate 1313 and project generally upward from the plate 1313. The plate 1313 may form a perimeter around the opening 1346B and may be positioned between the opening 1346B and one or more access holes 1315. The access holes 1315 may be smaller openings extending through the subflashing body 1311 that allow the subflashing 1310 to be coupled with other components, such as other components of the vent member 1343. In some embodiments, the access holes 1315 can extend through the plate 1313 and subflashing body 1311. The access holes 315 may be any shape suitable to receive one or more fasteners 1331. For example, the access holes described herein can comprise an open or closed shape, such as an open slot or enclosed channel, respectively, or other shape that can receive a fastener to allow coupling between two adjacent components.

The roof vent member 1343 can include an integrated fan assembly 1323. The fan assembly 1323 can include a fan housing 1327, which can contain a fan 1328 having one or more fan blades driven by a motor 1329. The fan assembly 1323 is configured to engage with one or more parts of the roof vent member 1343, such as a lower surface of the subflashing 1310. In some embodiments, a first upper portion of the fan assembly 1323 is laterally surrounded by the roof deck 14, and a second lower portion of the fan assembly 1323 extends below the lower surface of the roof deck 14. The fan assembly 1323 is configured to generate airflow through an opening 1346C of the fan, through the remainder of the vent member 1343, and through an opening of a roof deck.

The fan housing 1327 may include one or more access holes 1325. The access holes 1325 may be formed or otherwise defined by, and extend through, the fan housing 1327. In some embodiments, the access holes 1325 are formed by and in the structure of the fan housing 1327 and extend from an upper surface of the housing 1327 to a lower surface thereof. In some embodiments, the access holes 1325 are formed in the upper and lower surface of the fan housing 1327. The access holes 325 may be arranged around or near an outer perimeter of the fan housing 1327. The access holes 1325 may extend around the opening 1346C. The holes 1325 may have a similar shape and/or locations as other holes of the vent member 1343, such as the holes 1315 of the subflashing 1310, such that the various holes of the various components align when the vent member 1343 is configured for installation with the roof deck 14. The access holes 1325 may have a variety of shapes, including circular or other shapes. In some embodiments, the access holes 1325 have a shape that complements the shape of the fasteners 1331, discussed below, such that lateral play of the fasteners 1331 inside the access holes 1325 is reduced or removed. In some embodiments, the access holes 1325 are shaped and/or sized to provide an interference fit with the fasteners 1331.

The fan assembly 1323 can be attached to or otherwise coupled with the subflashing 1310 or other parts of the roof vent member 1343 in various ways. The fan can be powered by a solar panel, battery, or other power supply, and or can include a control system and other electronic features, as described in U.S. Pat. No. 8,608,533, issued on Dec. 17, 2013, the entire contents of which are herein incorporated by reference. The roof vent member 1343 can include fasteners 1331 configured to couple the fan assembly 1323 with the subflashing 1310. The fasteners 1331 can be configured to provide increased support to the fan assembly 1323 relative to the support provided by the subflashing alone without the fasteners 1331. Such support can be important due to the vibrations over time caused by the fan operation, which can loosen the components of the vent member 1343, causing roof leakage or vent failure. The roof vent member 1343 can include a lower plate 340 to provide additional support between the fan assembly 1323 and other components of vent member 1343. The lower plates 1340 can include an openings 1346D to allow ventilating air flow therethrough. Thus, one or more of openings 1346B-1346D, which can be similar or different shapes with respect to each other, can collectively form the channel 1346 through vent member 1343, when two or more of the fasteners 1331, fan assembly 1323, lower plate 1340, and subflashing 1310, and/or other vent components, are stacked together.

The fasteners 1331 can be configured to engage with complementary fastening elements 1341, to couple the subflashing 1310 to the fan assembly 1323. The fasteners 1331 may engage with the complementary fastening elements 1341 when the fasteners 1331 are extended into, or in some embodiments, completely through corresponding access holes of other components of the vent member 1343, such as access holes 1345, 1325, and 1315 in the lower plate 1340, the housing 1327 of the fan assembly 1323, and the subflashing 1310, respectively. The fasteners 1331 can be configured to allow the fan assembly 1323 to be removed from a position below the roof deck 14. Such lower removal of the fan assembly can allow it to be replaced from, for instance, an attic space, and without needing to walk on the roof and risk damaging the roof cover elements or otherwise disturbing the building envelope. Additionally, the roof vent member 1343 with the integrated fan assembly 1323 can be installed by a roof professional, for example, during the initial roof installation, without disturbing the roofing envelope, or making other modifications (other than the hole in the roof deck), and without requiring a professional from another trade, such as an electrician.

The fasteners 1331 can be any structural components with features configured for coupling the plate 1313, subflashing 1310, and fan assembly 1323, to each other, or to additional components. The fasteners 1331 can comprise an elongated member, such as a rod, screw, pin, or other similar structure. The fasteners 1331 can have a circular, square, or other cross-sectional shape. The fasteners can be configured to couple to additional components, such as the complementary fastening elements 1341. The fasteners 1331 can be located on the plate 1313 in various positions around the opening 346B. In some embodiments, the fasteners 1331 can be located along a perimeter (e.g., generally circular) or other shaped arrangement around the opening 1346B. The fasteners 1331 may be located near or adjacent to the opening 346B, or in other locations. In some embodiments, the fasteners 1331 can comprise cylindrical projections extending downward from the plate 1313. The fasteners 1331 can have engaging features, such as external or internal threads thereon or therein, to engage with another corresponding structure, such as an internal or external threaded structure, respectively. The threads or other engaging features may extend along some, most, or substantially the entire length of the fasteners 1331, or they may only be on portions thereof. For instance, the fasteners 1331 may have threads only near the tips or distal ends of the fasteners 1331. The "distal end" is the end of the fasteners 1331 opposed from the plate 1313. As discussed in further detail below, in some embodiments, the fasteners 1331 may have a bore or other blind hole or passageway that opens at the distal end. For instance, the fasteners 1331 may have an internally-threaded hole on the distal ends of the fasteners 1331 into which complementary fastening elements 1341, for example externally-threaded bolts, may engage.

The plate 1313, the subflashing 1310, and the fan assembly 1323 are configured to allow the fasteners 1331 to extend through the holes 1315 of the subflashing 1310 and through the holes 1325 of the fan housing 1327. For instance, the plate 1313, the subflashing 1310, and the fan assembly 1323 may be aligned such that their respective holes align and provide a passageway for the fasteners 1331. This allows the plate 1313 and the fan assembly 1323 to couple with the subflashing 1310. The subflashing 1310 can be positioned between the plate 1313 and the fan assembly 1323 with at least a portion of the fan assembly 1323 extending below a bottom surface of the roof deck 14 when the subflashing 1310 is mounted on an upper surface of the roof deck 14. The fasteners 1331, by extending downward from the plate 1313 and into the space under the roof deck 14, allow the fan assembly 1323 to be accessed from under the roof deck 14. This allows for easy installation and/or removal of the fan housing 1323 from inside the house or other building structure. Thus, the plate 1313, the subflashing 1310, and the fan assembly 1323 are configured to allow the fan assembly 1323 to be removed and replaced from under the roof deck 14 when the subflashing 1310 is mounted on the upper surface of the roof deck 14.

The engagements shown and described herein, either above or below, between the various components of the roof vent member 1343 are for illustrative purposes, and it will be understood that other engagement means for attaching these components are possible. For example, the subflashing 1310 may be attached to the plate 1313 using attachment means that are separate from those that attach the fan assembly 1323 to the subflashing 1310, e.g. to allow removal of the fan assembly 1323 without disengaging the plate 1313 from the subflashing 1310.

As mentioned, the roof vent member 1343 can include a lower plate 1340. The lower plate 1340 can include a lower plate body 1344. The lower plate body 1344 may be a generally flat, planar structure configured to couple with the fan assembly 1323, such as the fan housing 1327, and/or other components of the roof vent member 1343. The lower plate body 1344 may be formed from a variety of materials, such as metal or other suitable materials. In some embodiments, the lower plate body 1344 can comprise a rigid material configured to support the weight of various components, such as the fan assembly 1323. The lower plate body 1344 may have a variety of shapes, i.e. plan forms, as viewed from the top or bottom. In some embodiments, the lower plate body 1344 has a generally rounded shape, but it may also have a more polygonal plan form, and/or combinations thereof. For instance, the lower plate body 1344 may have a plan form that is square, rectangular, circular, hexagonal, a shape with partially straight and partially rounded sides, etc. The lower plate body 1344 may have a shape that matches or otherwise complements the shape of the fan housing 1327.

The lower plate body 1344 can include an opening 1346D. The opening 1346D can extend through the lower plate body 1344. In some embodiments, the opening 1346D is defined by one or more edges or surfaces of the lower plate body 1344. For instance, the opening 1346D may be formed or otherwise defined by a continuous inner edge at or near the center of the lower plate body 1344. The opening 1346D may have a variety of shapes. In some embodiments, the opening 1346D is circular. It may also be any other shape, such as elliptical, oval, square, rectangular, other straight-sided shapes, or combinations thereof. The opening 1346D may match the shape of the other openings in the roof vent member 1343, such as the opening1 1346B, opening 1346C, the subflashing 1310, and the fan housing 1327.

The opening 1346D, and/or the openings 346B and 346C, may be configured to form ventilation channel 1346 (FIG. 11A) when the components of the member 1343 are stacked together, and, for example, when the openings are aligned together. The ventilation channel can have a substantially non-frustoconical shape, to increase the uniformity of the air flow velocity through vent member 1343. The ventilation channel may also have an approximately uniform cross-sectional size, shape, or both, along its length. In some embodiments, the openings 1346B, 1346C, and/or 1346D may be configured to form a ventilation channel that has a generally uniform shape along its length, such as a generally cylindrical shape. Other shapes for the ventilation channel may be implemented as well.

The lower plate body 1344 can include upper and lower surfaces configured to couple with various features of the roof vent member 1343. The lower surface may be one or more surfaces of the lower plate body 344 that are on an underside of the body 1344. In some embodiments, complementary fastening elements 1341 attach to portions of the fasteners 1331 that extend through access holes 1345 and which butt up against the lower surface of the lower plate body 1344. The access holes 1345 may be formed or otherwise defined by, and extend through, the lower plate body 1344. In some embodiments, the access holes 1345 are formed by and in the structure of the lower plate body 1344 and extend from the upper surface of the lower plate body 1344 to the lower surface thereof. The access holes 1345 may be arranged around or near an outer perimeter of the lower plate body 1344. The holes 1345 may have a similar shape and/or locations as other holes of the vent member 3143, such as the holes 1315 of the subflashing 1310 and fan housing 1327, such that the various holes of the various components align when the vent member 1343 is configured for installation with the roof deck 14. The holes 1345 may have a variety of shapes, including circular or other shapes. In some embodiments, the holes 1345 have a shape that complements the shape of the fasteners 1331, such that lateral play of the fasteners 1331 inside the holes 1345 is reduced or removed. In some embodiments, the holes 1345 are shaped and/or sized to provide an interference fit with the fasteners 1331. The lower plate 1340, the plate 1313, the subflashing 1310, and the fan assembly 1327 are configured to allow the fasteners 1331 to extend through the access holes 1345, to couple the lower plate 1340 with the subflashing 1310, with the lower plate 1340 positioned under the fan assembly 1323.

As mentioned, the complementary fastening elements 1341 may couple with the fasteners 1331. In some embodiments, the complementary fastening elements 1341 are configured to removeably attach to portions of the fasteners 1331 extending downward beyond the various components of the roof vent member 1343. In some embodiments, the complementary fastening elements 1341 are configured to removeably attach to portions of the fasteners 1331 extending downward beyond the fan assembly 1323 to couple the plate 1313, the subflashing 1310 and the fan housing 1327. In some embodiments, the complementary fastening elements 1341 are configured to removeably attach to portions of the fasteners 1331 extending downward beyond the lower plate 1340 to couple the plate 1313, the subflashing 1310, the fan housing 1327 and the lower plate 1340. The complementary fastening elements 1341 may engage with the distal ends of the fasteners 1331, as defined above.

In some embodiments, the fastening elements 1341 can be configured to removably attach to portions of the fasteners 1331 that extend into, but not completely through or beyond another component of vent member 1343. For example, the fastening elements 1341 can be recessed below an upper surface of another component of vent member 1343, such as the lower plate 1340, to allow the fasteners 1331 to extend into the upper surface and engage with the fastening elements 1341, without extending the fasteners through the lower plate 1340. In some embodiments, the various components of the vent member 1343 may include recesses around their respective access holes that receive the complementary fastening elements 1341. For instance, the fan housing 1327 or the lower plate 1340 may include recesses around the access holes 1325 or 1345, respectively, into which complementary fastening elements, such as nuts or bolts, extend when tightened to couple the vent member 1343 components together. The fastening elements 1341 can be configured to allow a snap fit, and/or interference fit, between the fastening elements 1341 and fasteners 1331.

The complementary fastening elements 1341 may be nuts or other structures with internal threads that mate with corresponding external threads of the fasteners 1331. Fastening elements 1341 can be an insert that is positioned within an opening extending into or through one or more components of member 1343, such as within access holes 1325 or 1345. Fastening elements 1341 can have an outer perimeter (e.g., diameter) that is greater than a corresponding outer perimeter (e.g., diameter) of any access holes on a corresponding part of vent member 1343. The elements 1341 may be tightened onto the fasteners 1331 to compress together the various components of the roof vent member 1343, such as the plate 1313, the subflashing 1310, the fan housing 1327 and the lower plate 1340. The elements 1341 may be of various types, such as locking, nonlocking, crimped, etc. The elements 1341 may be of formed from various materials, such as steel, titanium, aluminum, other materials besides metal, or combinations thereof. The complementary fastening elements 1341 may be a variety of other fastening elements besides nuts, such as clamps, brackets, etc.

In some embodiments, the fasteners 1331 provide internal coupling features and the complementary fastening elements 1341 include complementary external coupling features. For instance, the fasteners 1331 may be elongated projections that include an internally threaded bore into which the complementary fastening elements 1341 are screwed. In some embodiments, the fasteners 1331 have internal threads with which external threads of the complementary fastening elements 1341 attach by rotating the elements 1341 into the fasteners 1331. Further, the fasteners 1331 may include combinations of internal and/or external coupling features. For instance, some of the fasteners 1331 may be externally-coupling fasteners while others may be internally-coupling. Similarly, the complementary fastening elements 1341 may include combinations of internal and/or external coupling features, such as internally threaded nuts and externally threaded bolts.

These are just some of the various configurations that may be implemented with the fasteners 1331 and the complementary fastening elements 1341 that allow for access to the fan assembly 1323 from under the roof. By attaching the complementary fastening elements 1341 to or otherwise with the portions of the fasteners 1331 extending through an underside of the roof vent member 1343, such as with the distal ends of the fasteners 1331, the elements 1341 may be removed from under the roof, and thus the fan assembly 1323 or portions thereof may also be easily removed from under the roof by sliding the assembly 1323 down and away from the fasteners 1331. To reinstall or replace the fan assembly 1323, for instance with a second or replacement fan assembly 1323, the second fan assembly 1323 can slide over the fasteners 1331, with the fasteners extending through the holes 1325 in the fan housing 1327, and the complementary fastening elements 1341 can then be secured to the distal tips or portions of the fasteners 1331 extending downward beyond the fan assembly 1323. If the roof vent member 1343 includes the lower plate 1340 or other components, they can be removed and/or installed in a similar fashion.

The roof vent member 1343 can further include screens 1332, 1342 to cover and prevent damage to fan assembly 1323, and/or prevent injury caused by fan assembly 1323, through openings 1346B and 1346D. The screens 1332, 1342 can be separate components that are separately attached to the lip 1312 or lower plate 1340, or they can be integrally formed components thereof, or combinations of separate and integral. It will be understand that either or both screens 1332, 1342, or additional screens, can be employed with roof vent member 1343.

The roof vent member 1343 can further include one or more sealing elements. In some embodiments, the roof vent member 1343 can include one or both of an upper sealing element 1320 and/or a lower sealing element 1324. The sealing element 1320 can be configured to be positioned and form a seal between the subflashing 1310 and the fan assembly 1323. The sealing element 1324 can be configured to be positioned between and form a seal between the fan assembly 1323 and the lower plate 1340. The sealing elements 1320, 1324 can include openings 1346E, 1346F, respectively, that can further form the ventilation channel 1346 when configured with the other components of the roof vent member 1343. The sealing elements 1320, 1324 can also include access holes 1322, 1326, respectively, that allow the sealing elements 1320, 1324 to be coupled with the other components. In some embodiments, the upper sealing element 1320 can be positioned in between the subflashing 1310 and the fan assembly 1323, with the opening 1346E aligned with the openings 1346B and 1346C, respectively, and the access holes 1322 aligned with the access holes 1315 and 1325, respectively. In some embodiments, the lower sealing element 1324 is positioned in between the fan assembly 1323 and the lower plate 1340, with the opening 1346F aligned with the openings 1346C and 1346D, respectively, and the access holes 1322 aligned with the access holes 1325 and 1345, respectively. Another sealing element (not shown) can be positioned and form a seal between the subflashing 1310 and the plate 1313. The sealing elements described herein can comprise a rubber, plastic, or other material suitable for sealing the aforementioned vent member components. The sealing elements can reduce the likelihood of leakage between components of the vent member 1343 and from channel 1346. Such leakage can overwork, and thus cause premature failure of fan assembly 1323, and/or increase the number of vent members 1343 needed to provide a certain amount of ventilation within a roof structure.

FIG. 11D is a bottom view of the roof vent member 1343. FIG. 11D shows the roof vent member 1343 but without the lower screen 1342 such that the upper screen 1332 is shown coupled on an upper side of the roof vent member 1343. The subflashing 1310 and the lower plate 1340 each have a generally circular plan form shape and the vent opening 1346 has a generally circular cross-section shape. As mentioned, these are merely examples and other shapes, orientations and/or configurations may be implemented. For example, the roof vent members herein can be implemented without any screens.

A vent member with an integrated fan, such as vent member 1343, can be applied to other types of vents or other types of roofs. Examples of roofing technologies with which the present application can be implemented are disclosed in, for example, U.S. Pat. Nos. 8,608,533, 8,607,510, 7,618,310, U.S. Pat. App. Pub. No. 2010/0330898, and U.S. Pat. No. 7,101,279, the entire contents of each which are hereby incorporated by reference herein.

Figure 12:
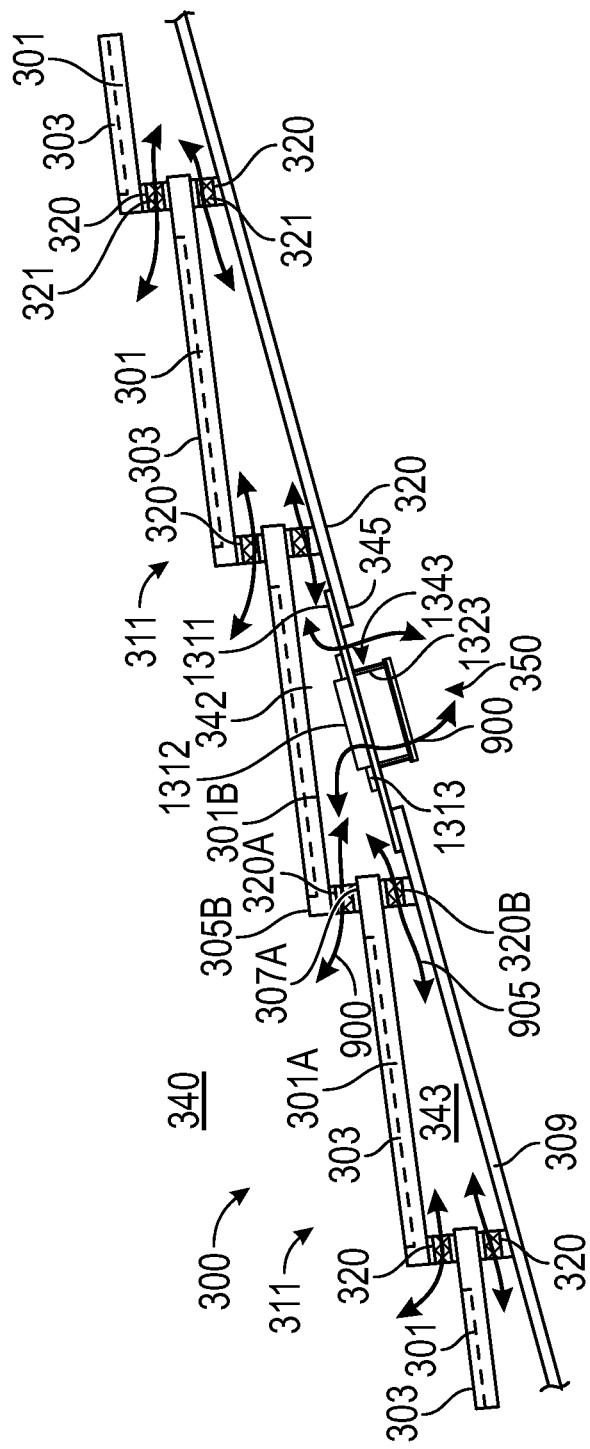
FIG. 12 is a side view of a solar roof with a roof vent member.

In some embodiments, vent member 1343 can be integrated with a solar roof, such as the solar roof 300 described herein. FIG. 12 illustrates vent member 1343 integrated with a solar roof 300. As shown in FIG. 12, a vent member 1343 can be installed on a roof deck 309 below a solar roof 300. The vent member 1343 can be positioned within the opening 345. In some embodiments, the vent member 1343 can be positioned at other locations on the roof deck 309, such as offset from the opening 345.

Installing a vent member 1343 underneath a solar roof 300 can increase the amount of air that circulates the surrounding solar tiles 301. For example, powering the fan 1328 within the vent member 1343 can result in increased airflow through the spacers 320 and vent member 1343, as indicated by the example airflow path illustrated by the arrows in FIG. 12. By increasing the airflow, the amount of air circulating the solar tiles 301 also increases.

Installing a vent member 1343 underneath a solar roof 300 can also increase the efficiency of the solar panels 303 installed within the solar tiles. The vent member 1343 can increase air circulation surrounding the solar tiles 301, and as a result, remove hot air surrounding the solar tiles 301. By removing the heated air surrounding the solar tiles 301, the temperature of the embedded solar panels 303 can be reduced, which can increase the efficiency of the solar panels 303. Additionally, given the increased temperatures associated with solar roof tiles in a solar roof, by including a primary vent, such as active primary vent (e.g., vent member 134)3, unexpected efficiencies in solar electricity generation can be realized.

Figure 13A:
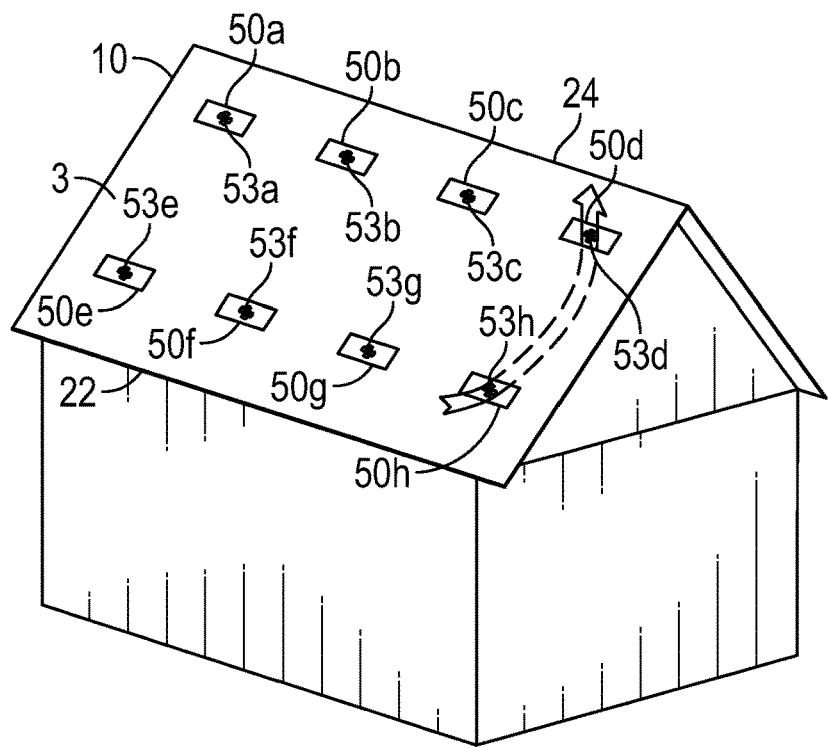
FIG. 13A is a perspective view of a roof ventilation system having a plurality of roof vent members.
Figure 13B:
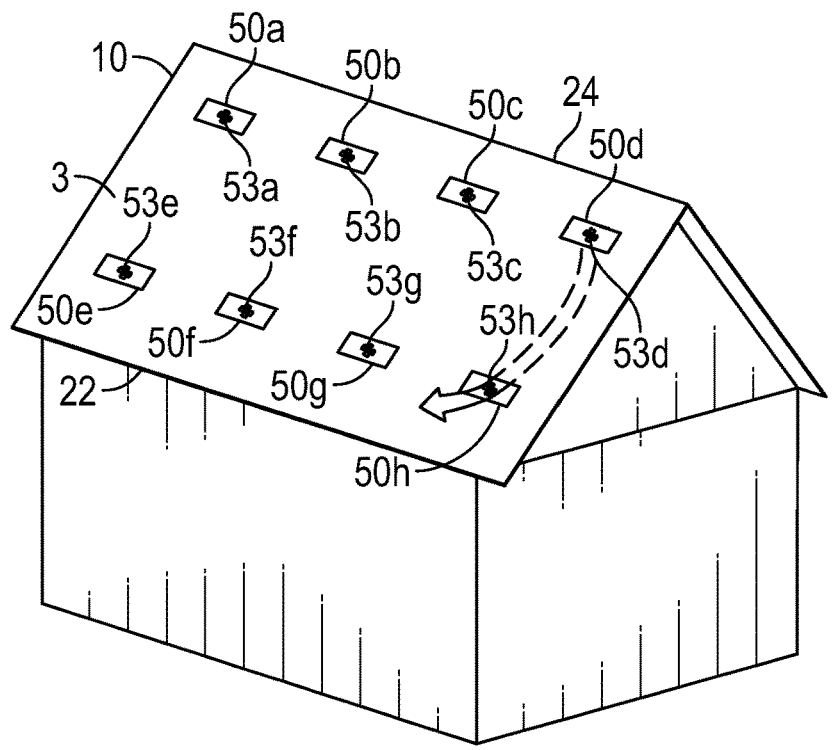
FIG. 13B is a perspective view of a roof ventilation system having a plurality of roof vent members.

FIGS. 13A and 13B illustrates a ventilation system including a plurality of vent members 50*a*-50*h*. Vent members 50*a*-50*h* can be different types of active or passive primary vents, such as active vent member 1343 (FIGS. 11A-11D). Vent members 50*a*-50*h* can be configured to allow and/or facilitate airflow from a region/volume underneath the roof deck to a region/volume above a roof deck. Ventilation members 50*a*-50*h* can be implemented with ventilation battens or spacers, to facilitate a flowpath between one or more roofing elements and the roof deck, and/or from an internal region to an external region, such as flowpaths 900 and 905, or other flowpaths, as described herein (e.g., FIGS. 3B, 3C, 5A, 8D, 8E, 8G). The illustrated ventilation system is suitable for a sloped solar roof 10 having a ridge 24 and an eave 22. The roof cover elements, including the solar roof tiles are not shown, for illustrative purposes. But it will be understood that a plurality of roof cover element, including a plurality of solar roof tiles, can be installed above the ventilation system to form a solar roof, with other embodiments of the solar roof tile ventilation systems described herein, for example, with reference to FIGS. 3A-10. The ventilation system includes a first plurality of vent members 50*a*-50*d* arranged generally linearly. The first plurality of vents 50*a*-50*d* are positioned within the roof 10 proximate the ridge 24. The ventilation system also includes a second plurality of vent members 50*e*-50*h* arranged generally linearly and positioned within the roof 10 proximate the eave 22. The second plurality of vent members 50*e*-50*h* are arranged generally along a line that is generally parallel to a line along which the first plurality of vent members 50*a*-50*d* are generally arranged. Although FIGS. 13A and 13B illustrate a ventilation system containing 8 vent members 50a-50h, the ventilation system can include a different number of vent members and can be scaled appropriately to the size of the roof or the airflow control needs. For example, the ventilation system can include 1, 2, 3, 4, 5, 6, 7, 9, 10, 11, 12, 13, 14, 15, 16, 17, 18, 19, 20, or more vent members. The vent members can be provided in quantities and grouped, as described in U.S. patent application Ser. No. 16/229,633. Such groupings, or the operational control and airflow of the multiple-vent member systems shown in FIGS. 13A and 13B can be particularly beneficial in the context of solar roofs, due to the increased operating temperatures, and the lack of spacing or cooling under solar roof tiles in conventional solar roof tile roofs.

Each of vent members 50a-50h includes an opening that permits airflow between regions above and below the roof. Each of the vent members 50a-50h can include a fan 53a-53h configured to generate airflow through the opening. In some configurations, some of the vent members 50a-50h contain fans 53a-53h while other vent members 50a-50h do not contain fans 53a-53h. Other configurations of the vent member 50a-50h are also possible.

As illustrated in FIG. 13A, the ventilation system is configured to generate airflow to enter the second plurality of vent members 50e-50h and to exit the first plurality of vent members 50a-50d, as denoted by an arrow in FIG. 13A. This configuration can be achieved by generating outward airflow using the fans 53a-53d of the first plurality of vent members 50a-50d. In some embodiment, the vent members 50e-50h do not include fans. In various embodiment, the airflow may be enhanced by generating inward airflow with fans 53e-53h associated with the second plurality of vent members 50e-50h. In this alternative, the fans 53e-53h of the second plurality of vents 50e-50h preferably either spin in an opposite direction to the fans 53a-53d or have an inverse curvature of the fan blades.

As illustrated in FIG. 13A, the vent members 50e-50h in proximity to the eave 22 have a fan 53e-53h, such that the vent members 50e-50h in proximity to the eave 22 can exhaust the air. Additionally, the vent members 50a-50d in proximity to the ridge 24 can supply the air to the attic.

Figure 14:
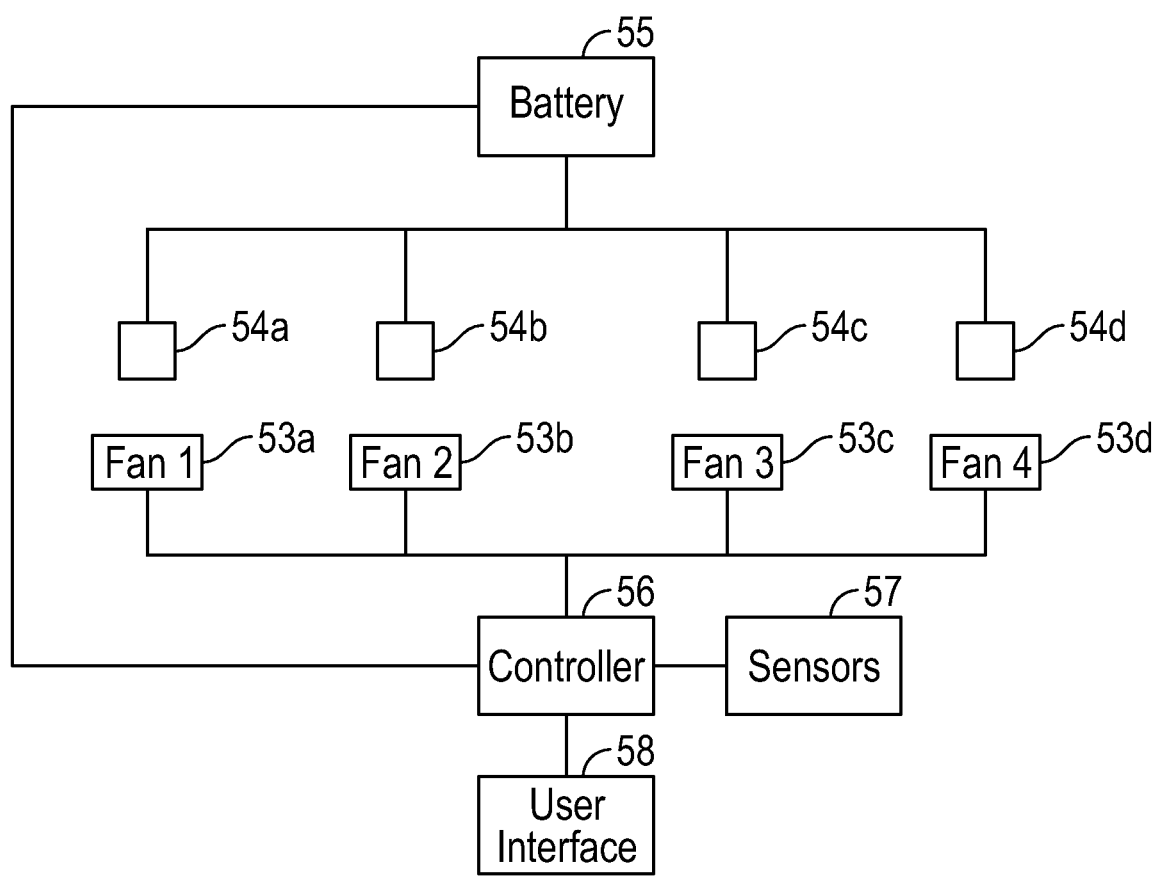
FIG. 14 illustrates a schematic diagram of the ventilation system of FIGS. 13A and 13B.

FIG. 14 illustrates a schematic diagram of the ventilation system of FIGS. 13A and 13B. The system in FIG. 14 can be implemented with other embodiments of solar roofs and solar roof tiles described elsewhere herein. The ventilation system can include one or more of the plurality of first vent members 50a-50d (not shown), fans 53a-53d, solar panels 54a-54d, a battery 55, a controller 56, sensors 57, and a user interface 58, or combinations thereof. In some embodiments, the ventilation system can include additional vent members 50e-50h, additional fans 53e-53h, or additional solar panels. In various embodiments, the plurality of solar panels 54a-54d can be replaced with solar panels embedded in solar tiles, such as solar panel 303 embedded in a solar tile 301 of a solar roof 300 (FIGS. 3A-3D). In some embodiments, the fans 53a-53d can correspond to fans within the vent members 50a-50d.

The battery 55 can be configured to supply power to the controller, and is electrically connected to the solar panels 50a-50d. In some embodiments, the battery 55 is electrically connected to the solar panels 303 embedded in the solar tiles 301 of a solar roof 300. The illustrated system includes only one battery. In certain embodiments, however, the system may have back-up batteries.

The controller 56 can include a CPU or microprocessor, a memory device, and other peripheral components so as to collect, process, store, and transmit electronic data The controller 56 is configured to be in electrical communication with the fans 53a-53d of the vents 50a-50d. The controller 56 can be configured to drive the fans based on at least one environmental parameter. Examples of environmental parameters include, but are not limited to, temperature, humidity, precipitation, toxicity, moisture, air flow, and ambient light level. In some embodiments, the controller 56 can be configured to drive the fans based on at least one parameter of the solar panels 54a-54d, such as the temperature of the solar panels 54a-54d. The controller 56 is configured to collect environmental parameter data or solar panel parameter data from the sensors 57, and drive the fans 53a-53d based on the data. The controller 56 can be configured to operate the fans to maintain the temperature of the solar panels 54a-54d, and/or the corresponding solar roof tiles that include the solar panels 54a-54d, within a desired temperature range. For example, the controller 56 can be configured to maintain one or more solar panel at or below an optimum operating temperature. The optimum operating temperature can be 40° C., 35° C., 30° C., 25° C., 20° C., or 15° C.

The sensors 57 can have means for measuring a respective environmental parameter. In addition, each of the sensors may further include a microprocessor, a memory, and peripheral components to collect, process, store, and transmit data to the controller 56. Examples of the sensors 57 include, but are not limited to, a temperature sensor, a humidity sensor, an air flow sensor, and a toxicity sensor. In certain embodiments, two or more of the sensors may be combined to provide measurements of multiple environmental parameters. The sensors 57 are all electrically connected to or adapted to communicate with the controller 56. The sensors 57 may be powered by the battery 55 via the controller 56 or by another power source. The sensors 57 can be installed at multiple locations, including, but not limited to, below a solar roof 300, above a solar roof 300, on a solar roof 300, or embedded in a solar tile 301. The sensors 57 can also be installed in locations as described in U.S. Pat. No. 8,608,533.

The user interface 58 is configured to display measurements of the at least one environmental parameter or solar panel parameter collected from the sensors 57. The user interface 58 may also be configured to allow a user to control the fan via the controller 56. The user interface 58 includes a display device such as an LCD or CRT screen. Optionally, the user interface 58 may include an input device such as a touch pad screen and/or push buttons. In certain embodiments, the input device may be a key board or key pad. The user interface 58 is electrically connected to or adapted to communicate with the controller 56. In certain embodiments, the user interface 58 and the controller 56 may be integrated into one device. The user interface 58 and/or the controller can be implemented within a mobile device, tablet, computer, smart home, or other similar device.

In one embodiment, the controller 56 is configured to operate on a software program for providing optimal ventilation. The program first determines whether the environmental parameters or solar panel parameters are within predetermined ranges. If not, the program instructs the controller 56 to drive the fans 53a-53d. In certain embodiments, the program may turn on some of the fans while turning off the others. In other embodiments, the program may control the speed of each fan.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as a subcombination or variation of a subcombination.

The features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A ventilation batten for a solar roof, comprising:
a body, comprising:
an upper surface configured to contact and support a downslope edge of a first roofing element; an upper spacer; and
a lower spacer;
a recess extending into a front surface of the body, the recess configured to receive and support an upslope edge of a second roofing element, such that the downslope edge of the first roofing element is spaced vertically apart from and horizontally overlaps with the upslope edge of the second roofing element;
wherein the upper spacer extends a first thickness measured between the upper surface and an upper portion of the recess;
wherein the lower spacer extends a second thickness from a lower portion of the recess to a bottom of the body, wherein the body comprises a single unitary construction; and
an opening extending through the body between the upper surface and the recess;
wherein the opening, the upper surface, and the recess are configured to provide ventilation through the opening between an external region above the first roofing element and the second roofing element, to an internal region below the first roofing element;
wherein at least one of the first roofing element and the second roofing element comprise a solar roof tile;
wherein the opening comprises a first opening, the ventilation batten further comprising a second opening extending through the lower spacer, the second opening comprising a third thickness; and wherein the lower spacer further comprises a first foot and a second foot extending along a length of the body, wherein the first foot is horizontally adjacent to the second foot, and the second opening is formed between the first foot and the second foot.

2. The ventilation batten of claim 1, wherein the body comprises a support member extending between and attaching the upper and lower spacers to each other, and forming the recess.

3. The ventilation batten of claim 2, wherein the upper spacer comprises:
   a first upper leg;
   a first lower leg; and
   a first middle leg extending between a portion of the first upper leg and a portion of the first lower leg, wherein the first opening extends through the first middle leg.

4. The ventilation batten of claim 3, wherein the lower spacer comprises:
   a second upper leg;
   a second lower leg; and
   a second middle leg extending between a portion of the second upper leg and a portion of the second lower leg, wherein the second opening extends through the second middle leg.

5. The ventilation batten of claim 4, wherein the support member extends between an opposing end of each of the first lower leg and the second upper leg to form the recess.

6. The ventilation batten of claim 5, wherein the batten comprises sheet metal.

7. The ventilation batten of claim 6, wherein the batten comprises a single integral piece of material.

8. The ventilation batten of claim 2, further comprising a clip extending from an upper portion of the upper spacer, the clip forming a groove configured to receive the downslope edge of the first roofing element, and secure the first roofing element to the spacer.

9. A solar roof, comprising the ventilation batten of claim 8, further comprising the first roofing element and the second roofing element.

10. The solar roof of claim 9, wherein the first roofing element comprises the solar roof tile, and the second roofing element comprises a roofing element different from the first roofing element.

* * * * *